United States Patent [19]

Neupauer

[11] Patent Number: 4,638,415

[45] Date of Patent: Jan. 20, 1987

[54] METHOD AND APPARATUS FOR RESUMPTION OF NORMAL OPERATION OF A HIGH-VOLTAGE D. C. TRANSMISSION LINE

[75] Inventor: Helmut Neupauer, Erlangen, Fed. Rep. of Germany

[73] Assignee: Siemens Aktiengesellschaft, Munich and Berlin, Fed. Rep. of Germany

[21] Appl. No.: 706,754

[22] Filed: Feb. 28, 1985

[30] Foreign Application Priority Data

Mar. 1, 1984 [DE] Fed. Rep. of Germany ....... 3407656
Sep. 26, 1984 [DE] Fed. Rep. of Germany ....... 3435305
Oct. 18, 1984 [DE] Fed. Rep. of Germany ....... 3438236

[51] Int. Cl.[4] ................................................ H02J 3/36

[52] U.S. Cl. ........................................ 363/35; 363/49; 363/51; 307/82

[58] Field of Search ...................... 307/82; 363/35, 49, 363/51

[56] References Cited

U.S. PATENT DOCUMENTS

| | | | |
|---|---|---|---|
| 3,648,147 | 3/1972 | Leete | 363/35 |
| 4,250,542 | 2/1981 | Bulakhov et al. | 363/35 |
| 4,263,517 | 4/1981 | Konishi | 363/35 |
| 4,429,357 | 1/1984 | Hausler et al. | 363/35 |
| 4,516,198 | 5/1985 | Liss | 363/35 |

*Primary Examiner*—Patrick R. Salce
*Assistant Examiner*—Sterrett
*Attorney, Agent, or Firm*—F. W. Powers; J. L. James

[57] ABSTRACT

Method and Apparatus for resumption of normal operation of a High Voltage Direct Current transmission line after a malfunction in one of two stations connected to a HVDC transmission line. A control angle of approximately 90 degrees is run up in the previously malfunctioning station in accordance with a given function, thus creating an indication quantity at the D.C. voltage connections of the other station, which is detected as the earliest possible information on the start of the external station and also enables the run-up of the control angle in accordance with a given run-up function, with the two run-up functions representing precalculated, compatible, actual substitute values for the fault indication quantity caused by the respective other station. At the end of the run-up, the run-up functions are switched over to measured values of fault indication quantities, thus attaining stable control with short run-up and control times.

26 Claims, 28 Drawing Figures

METHOD AND APPARATUS FOR RESUMPTION OF NORMAL OPERATION OF A HIGH-VOLTAGE D. C. TRANSMISSION LINE

CROSS-REFERENCES TO RELATED APPLICATIONS

This application is related to the following co-pending applications.

"Method and Apparatus for High Voltage D. C. Transmission With a Bypass Circuit for Malfunctions" by H. Neupauer, G. Wild and W. Kaufhold, U.S. Patent Office Ser. No. 706,755.

"Method and Apparatus to Operate a High Voltage D. C. Transmission System With Automatic Control of the Converters" by H. Neupauer, U.S. Patent Office Ser. No. 706,711.

BACKGROUND OF THE INVENTION

This invention relates to the field of High Voltage Direct Current (HVDC) transmission line apparatus and more specifically to a method and apparatus to resume normal operation of a high-voltage d.c. (HVDC) transmission line for power transmission between two a.c. systems.

In normal operation a first converter connected to the first a.c. system, NA, in a first station impresses a d.c. current into the HVDC transmission line, i.e., rectifier operation, while a converter in a second station connected to the second a.c. system takes the d.c. current from the HVDC transmission line and feeds it into the second system, NB, and thereby determined the d.c. voltage level of the HVDC transmission line converter inverter operation.

The inductance of the HVDC transmission line coupling the two converters thereby has the effect that any change of the voltage in the second station effects a disturbance or fault indication voltage for the current impression of the first station by a lag time determined by the transmission time or travel time of the HVDC transmission line, while any change in the current in the second station effects a change of the commutation times of the second converter with said lag time. Thus, an inverter shutdown of the second converter, in particular, occurs if, e.g., when resuming the power transmission, the HVDC transmission line current is run up rapidly by the run-up of the control angle in the first station and the control of the inverter is not reduced accordingly.

An inverter shutdown with a short-circuit of the HVDC transmission line voltage also occurs in the second station when the a.c. voltage collapses, thus interrupting the power transmission. A malfunction of normal operation with an interruption of the HVDC transmission line current also occurs in the first station in the event of a short circuit in the system or in the converter.

It is, however, economically important that in the event of said malfunction, during which both stations have to be disconnected or switched to emergency operation, normal operation is resumed as rapidly as possible. This requires that the previously malfunctioning station give a release signal to the continuously functioning station indicating the end of the malfunctioning as rapidly as possible. Both stations must then resume normal operation in a coordinated manner due to the mutual coupling via the HVDC transmission line, taking the transmission and processing times into account.

One method for the resumption of normal operation requires that both stations be synchronized taking the travel time of the synchronization signals into account. By that method normal power transmission cannot be approximately achieved until after a relatively long starting time.

It is an object of this invention to provide a method and apparatus for rapid resumption of normal line transmission.

SUMMARY OF THE INVENTION

The invention deals mainly but not exclusively with resumption of normal operation from the so-called bypass-operation. This type of emergency operation is caused by a malfunction in one station and leads to short circuiting the HVDC-connections at the malfunctioning station while the continuously running station is used as a rectifier to impress current on the HVDC-transmission line. The HVDC transmission line therefore performs as a reactive load for the continuously running station suitable for balancing the respective a.c. voltage.

The malfunctioning station causing the transition to bypass operation consequently also causes transition back to normal operation as soon as its normal working conditions are restored, the conditions of emergency operations being unsymmetrical. To distinguish the loading station, whose transition to normal working conditions causes the start of the normal operation at the end of emergency is called "the previously malfunctioning station" in opposition to the other "continuously functioning station".

Some emergency cases require complete deenergizing of the HVDC-transmission line, i.e. HVDC current and/or HVDC voltage being zero during emergency operation and both stations being blocked. Under such symmectrical emergency conditions resuming the normal operation may be attempted as well by the previously malfunctioning station at the end of the malfunction as also by the other station which is still under normal working conditions but blocked during emergency. In the latter case this other station can attempt the invented method at regular distances if its working conditions are normal, the attempts being successful only if the malfunction of the opposite station has ended. In the claims and the following description, even for symmetrical emergency operations, said one station where the normal operation conditions are monitored and lead to the attempt to start normal operation is called "the previously malfunctioning station" and the opposite station whose working conditions have to be normal for a successful attempt is called "the continuously functioning station", irrespective of where the original malfunction causing the emergency has occurred and whether said station has operated continuously during emergency or not.

The same symmetrical situation is valid after the first installation of the plant or after a complete shut down of the plant due to normal inspection or repair work of the plant. In all these cases a respective strategy of starting normal operation is needed.

The invention provides a strategy which needs no or only few few modifications of the starting method and the respective apparatus.

Using the above discribed destinction of the two stations according to the invention appearance of normal working conditions (that means, for instance, the disappearance of a previous malfunction) is monitored in the previously malfunctioning station and a leading release signal is generated. That release signal stimulates by a release pulse the control angle in said station to run up in such a way, that a voltage pulse is impressed across the HVDC transmission line and the control angle runs into the level preset for normal working conditions.

The other, so-called "continuously functioning station" detects the appearance of the impressed HVDC voltage pulse and therefore gets the information about the end of emergency operation at the earliest possible time. A derived release signal triggers the control angle of said continuously functioning station to run up in a preselected way into the correspondingly preset value for normal operation.

The detailed method for solving the above described task is defined in accordance with claim 1. The secondary claims further develop additional preferable modifications of this method, particularly taking into account the various types of malfunctions which could arise, as well as detailing the arrangement required along with additional preferable modifications.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DETAILED DESCRIPTION

Figure 1:
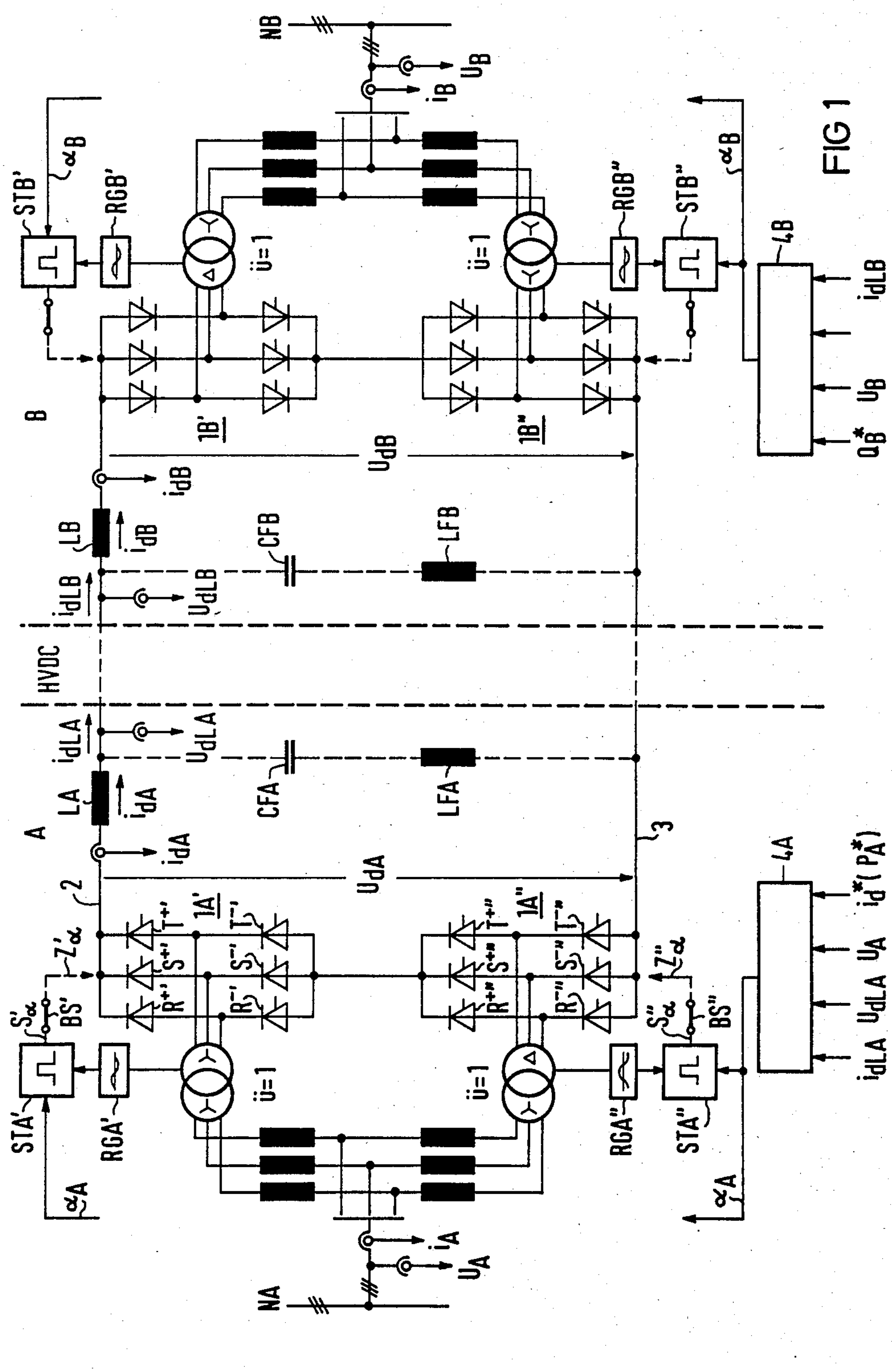
FIG. 1 shows the general design of a HVDC transmission line system

FIG. 1 shows an a.c. system, NA, connected to a HVDC transmission line via a station, A, and an a.c. system, NB, connected to the HVDC transmission line via a station, B. Both stations contain a converter. If using this arrangement d.c. current is to be transmitted from the first station, A, to the second station, B, then the current flowing through the HVDC transmission line will be preset by having the first converter located in the station, A, operating as a rectifier in order to draw from the first system, NA a current voltage $V_A$. The output d.c. current $i_{dA}$ of the converter of the station, A, is then impressed into the HVDC transmission line. The second converter located in the station, B, operates in this mode as the inverter in order to supply the input d.c. current $i_{dB}$ received via its d.c. connections into the second system, NB, with the inverter control angle used for the current feed controlling the input d.c. voltage $U_{dB}$ of the station, B, and thus the voltage level of the HVDC transmission line.

Generally, efforts are made to operate the converter with low levels of harmonics, for which reason the converters are designed as 12- and more-pulse converters containing numerous d.c. current side series-connected component converters, for example, connected to the HVDC transmission line using converter reactance coils LA or LB and/or filter circuits (CFA, LFA and CFB, LFB, respectively) and connected to the respective a.c. voltage system NA or NB, using converter transformers with differing circuits characterized by their transformation ratio ü where typically ü=1. Particularly for short couplings serving to link two closely adjoining systems and often containing only a high-voltage smoothing reactor, the use of the filter elements LFA, CFA and LFB, CFB respectively can often be omitted. The current appearing following the filtering elements is called the HVDC transmission line current and is designated with $i_{dLA}$. The corresponding HVDC transmission line voltage is designated $U_{dLA}$, while the quantities before the filter elements are designated by $i_{dA}$ and $U_{dA}$.

The actual values required for control purposes are generally obtained as close as possible to the HVDC transmission line connection point of the respective station, i.e., possibly behind the filter units; in other cases, e.g. to monitor the HVDC transmission line under operating conditions, it is irrelevant where the (not depicted) measurement units required to obtain the actual values are installed. The component current converters 1A', 1A" are series-connected on the d.c. current side to connect poles 2,3 of the HVDC transmission line and each contains one output phase R, S, T of the thyristor groups corresponding to their transformers designated by "+" or "−", if respectively their anodes or cathodes are connected to the transformer. Thus, for example, thyristor group $R^{+1}$ is located in the direction of current flow between the transformer and pole 2. A drive unit supplies the component current converter 1A' with the firing command sequence $S'\alpha$ which consists of the individual firing commands $R^{+'}\alpha$ .... $T^{-'}\alpha$ and is either disabled by a clamping circuit shown by switch symbol BS' or amplified to form a firing pulse sequence $Z'\alpha$ as individual impulses $R^{+'}$... $T^{-'}$ connected to the thyristors designated with the same symbols.

The drive unit $ST'_A$ contains a reference voltage system $U'_{Asyn}$ from a reference voltage generator $RG'_A$ connected to the a.c. voltage input of the component current converter, which forms the firing commands $S'_\alpha$ by comparing $U'_{Asyn}$ with a control quantity, e.g., a control voltage $U_{STA}$ or a control angle $\alpha_A$. System-synchronous operation is achieved when control angle equals $\alpha_A$.

The control quantity for example, control angle $\alpha_A$ is supplied by a control device 4A and according to the state-of-the-art is generally shared by all component frequency converters of the station. The component current converter 1A" with thyristor groups $R^{+''}$ ... $T^{-''}$ and its control devices RGA", STA", BS", is designed in the same way as the component current converter 1A'; similar quantities are designated accordingly. As in most cases it is obvious to those skilled in the art how to control the existing component frequency converters by using the control quantity of the station, A, the overall current converter is often designated as 1A in the following description and the differentiation of the quantities assigned to the respective component current converters suppressed.

The station, B, is designed analogously as far as possible; the component frequency converters 1B' and 1B", for example, are often treated as one single converter 1B. As many structural components and design features are identical for both stations, the differentiation using the letters A and B is omitted in these cases.

In the converter 1A operating as a rectifier, the control angle is preset near the wide-oppen setting ($\alpha_A \doteq 0$) and initially controls the output d.c. voltage $U_{dA}$. The output current $i_{dA}$ is then determined by the voltage drop $U_{dLA} - U_{dA}$ at the filter choke coil LA according to the following equation:

$$i_{dA} = 1/LA \int (U_{dA} - U_{dLA})dt \quad (1)$$

Thus, if a control quantity $i^*_{dA}$ is fed to the control and regulation unit 4A as a set value for a current control suppling the control angle $\alpha_A$, then the collapse of voltage $U_B$ or $U_{dB}$ as, for example, brought about by an inverter failure in the station, B, or any other change in the operation of the station, B, after the HVDC transmission line travel time, results in a change in $U_{dLA}$ resulting in a current change and excitation of the current controller.

For current control of the station, A, thus $U_{dLA}$ or with the lag time determined by the HVDC transmission line travel time $U_{dB}$ operates as the fault indicating quantity.

The situation is similar if the active power to be transmitted is used as the control quantity of the station, A. In this case an active power controller supplies, for example, the set value $i^*_{dA}$ in accordance with the active power nominal value $P^*_A$ coodinated with the energy balance of the system, NA.

Also, the d.c. converter 4B of the station, B, determines by its control angle $\alpha_B$ the output d.c. voltage $U_{dB}$. As the d.c. current $i_{dB}$ supplied as active and reactive current into the system, NB, is impressed by the station, A, the control and regulation unit 4B can control the reactive output into the system, NB, in accordance with a reactive power set value $Q^*_B$ which can be used as the control quantity to stabilize the system voltage. Thereby the station, B, determines which voltage levels will be established in the HVDC transmission line. The current $i_{dB}$ and the current flow in the system, NB, develop freely; it corresponds, except for slight resistance of losses to the conductor, to the impressed current $i_{dA}$ defined prior to the line travel time.

As particularly for a high active current component of the transmission a control angle normally near the inverter wide-open control setting ($\alpha_B$ near 180 degrees) is the goal, the time lapse during commutation from the firing of the succeeding thyristor (firing angle $\alpha_B$) until complete deactivation of the preceding thyristor (i.e., up to the extinction angle, $\gamma_B$) is relatively long and increases as the current $i_{dB}$ rises. During the commutation time the voltage $U_{dB}$ collapses by a so-called inductive d.c. voltage drop.

The inductive d.c. voltage drop brought about by the d.c. current $i_{dB}$, or the impressed current $i_{dA}$, thus functions as the fault indicating quantity for converter d.c. converter 4B.

This is particularly important since the extinction angle must not exceed a maximum value, the inverter step limit, which depends upon the release time of the converter thyristors so that no inverter failure with short-circuiting of voltage $U_{dB}$ arises. An increase of the impressed current $i_{dA}$ produces after the HVDC transmission line travel time, an increase of the commutation time in the station, B, and an increase of the inductive d.c. voltage drop which has to be dealt with by an advance of the firing time point of station, B, i.e., reduction of α B, if the maximum extinction angle or a preset extinction angle $\gamma^*$ used as the control variable of the station, B, is to be adhered to.

Due to these mutual control fault indicating quantities the controls of the converters coupled to each other using the HVDC transmission line have to be coordinated in their operation. Generally, information regarding the operating status of one converter, e.g., a marginal current signal or a malfunction signal derived from the respective control quantity, is transmitted to the other station using remote control lines. Due to the travel time of the HVDC transmission line as well as the processing time for this information transmission, stable operation of the HVDC transmission line can only be attained if the controllers of both stations are set relatively slowly, e.g., on/off control times of 200 ms.

The HVDC transmission line can thus stabilize the relevant a.c. voltage systems given rapid malfunctions to a limited extent only. Moreover, rapid startup of the HVDC transmission line, in particular given a transitory malfunction in a station and thus a temporary failure of the HVDC transmission line for example, is not possible. Thus, for example, provision of an adequate safety margin from the inverter step limit is intended primarily to avoid an inverter failure at the expense of a reduction in the active power transmission.

The operating procedure described below reduces these problems. It permits, given adequate protection against inverter failure, highly dynamic control and rapid startup after malfunctions.

Thus, initially the formation and transmission of the information specified is simplified and by suitable measures, namely automatic control of the control angle of one station using the fault indicating quantity or else a model value to be considered, the starting control times are substantially shortened. In the case of a HVDC transmission line short coupling in which, due to the close proximity of both stations, the information regarding the operating status of the other station is available without extended transmission times; a d.c. voltage detector for the HVDC transmission line voltage is no longer required.

In a HVDC line long-distance transmission the information required in one station regarding the other station is practically formed by the operating quantities only, particularly actual and set values, of the one station. Thereby remote control lines are omitted and the information is available at the earliest possible point in time, namely as soon as the status change of the other station is noticed in the former station. The automatic control apparatus thereby initiates very rapid closed loop control circuits, with startup times of less than 50 ms, e.g. 20 ms, becoming feasible.

If the operating uncertainty, due to the model fault indicator quantity used, occassionally leads to inverter failure or to another converter malfunction, the economic consequences of such a malfunction can be held to a minimum since the automatic control utilized permits a rapid restart of the HVDC transmission line following a malfunction. Thus the operating procedure can be coordinated primarily for optimum utilization of the HVDC transmission line. In particular, the HVDC transmission line can also be designed to stabilize dynamic processes, e.g., balancing processes in the system, primarily in order to stabilize the system voltage. Particular design features further permit this utilization of the HVDC transmission line even when due to a malfunction of a rectifier or inverter the active current transmission is interrupted.

THE INDUCTIVE D.C. VOLTAGE DROP AS THE FAULT INDICATION QUANTITY

The method in accordance with this invention is based upon an investigation of the effect that d.c. qunatities of a converter have on its operation.

Figure 2:
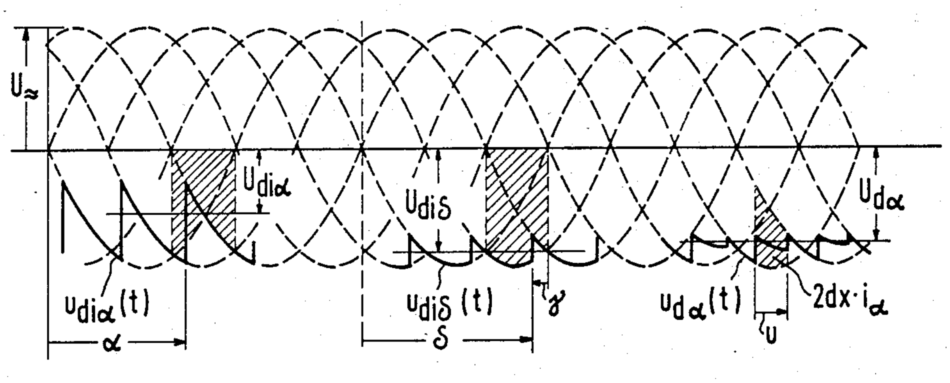
FIG. 2 shows the relationship between firing angle extinction angle $\gamma$, the inductive d.c. voltage drop, the d.c. voltage and the a.c. voltage when using a converter synchronous with the system.

FIG. 2 depicts in broken line the voltage patterns of the individual phases of an a.c. system, i.e., system voltage $U\approx$. Assuming that the current in the converter is commuted immediately and completely when the thyristor is fired, the voltage $u_{di\alpha}(t)$ dependent upon the firing angle $\alpha$ arises at the d.c. connections which is designated as the instantaneous value of the ideal unsmoothed no-load direct voltage.

The ideal-type assumption that the current is immediately commuted, so that the commutation time span is zero, is present only under no-load conditions in which the d.c. current itself becomes zero. Given wide-open control setting, the average value of the ideal no-load direct voltage under these ideal conditions is the voltage $U_{di}$ which is proportional to the momentary system voltage amplitude $U\approx$ or the effective system voltage in accordance with a definable ratio which is a pure numerical value for the respective converter type:

$$U_{di}=\text{const}\cdot U\approx \quad (2)$$

i.e., $$U_{diA}=\text{const}\cdot U_A,\ U_{diB}=-\text{const}\cdot U_B$$

The change in the value for the station, B, takes into account the reversed current orientation of the thyristors of converter 1B in contrast to the numerical orientation of voltage $U_{dB}$. $U_{di}$ responds to the voltage vs time waveform of the rectified system voltage.

The respective ideal unsmoothed no-load direct voltage $u_{di\alpha}(t)$ and $u_{di\delta}(t)$ correlate to the two firing angles $\alpha$ and $\delta$. Their integrated voltage vs time waveforms shown crosshatched are given as smoothed ideal no-load direct voltages by:

$$U_{di\alpha}=U_{di}\cos\alpha,\ U_{di\delta}=U_{di}\cos\delta$$

Turning now to actual conditions, it is assumed that the converter with firing angle $\alpha$ is fired and that the current $i_d$ actually flowing via the thyristors in the d.c. voltage supply requires a certain commutation time, e.g., corresponding to an overlapping angle u during which both thyristors are current-conducting, in order to pass out of the previously fired thyristor. The end of the commutation time is specified by the angle $\delta$, i.e., the extinction angle $\gamma=180°-\delta$ so that the following applies:

$$180°-\gamma=\alpha+u \quad (4)$$

whereby the positioning of the extinction angle $\gamma$, i.e., the value of the overlapping angle u, depends upon the magnitude of the commutating current $i_d$. The unsmoothed d.c. voltage $u_{d\alpha}(t)$ actually arising at firing angle $\alpha$ is also depicted in FIG. 2. It is practically the average value $\frac{1}{2}\cdot(u_{di\alpha}(t)+u_{di\delta}(t))$ which the voltage-commutation vs. time slot depicted crosshatched on the right divides in half. Thus, for the actual average value $U_{d\alpha}$ of the d.c. voltage $$U_{d\alpha}=\tfrac{1}{2}(U_{di\alpha}+U_{di\delta})=U_{di\alpha}-\tfrac{1}{2}(U_{di\alpha}-U_{di\delta}) \quad (5)$$

i.e., the actual d.c. voltage deviates from the ideal no-load direct voltage $U_{di\alpha}=U_{di}\cos\alpha$ corresponding to the firing angle $\alpha$ by a voltage differential. This so-called inductive d.c. voltage drop is proportional to the actual d.c. current $i_d$ via a converter-specific parameter dx:

$$\tfrac{1}{2}(U_{di\alpha}-U_{di\delta})=dx\cdot i_d=\tfrac{1}{2}U_{di}(\cos\alpha+\cos\gamma) \quad (6)$$

so that the following relationships prevail: $U_{d\alpha}=\text{const}\cdot U\approx\cos\alpha-dx\cdot i_d$, i.e., given suitable standardized measurement values $U_A$ and $U_B$ for the a.c. voltage amplitudes in both stations, the following equations apply for the HVDC transmission voltages $U_{dA}$ and $U_{dB}$:

$$U_{dA}=U_A\cdot\cos\alpha_A-d_{XA}\cdot i_{dA}$$

$$U_{dB}=-U_B\cdot\cos\alpha_B-d_{XB}\cdot i_{dB}$$

it should be noted that $d_{XB}$ is a negative quantity due to the defined polarity of $i_{dB}$ and $U_{dB}$.

As due to the existing inductances the d.c. current practically does not change during a commutation, equations 4 and 6 permit a precalculation for each firing time point based on the firing angle and the measurement values for the a.c. voltage and the d.c. current with regard to the values that the overlap angle, the extinction angle and the d.c. voltage will assume during firing.

NORMAL OPERATION WITH AUTOMATIC CONTROL

Figure 3:
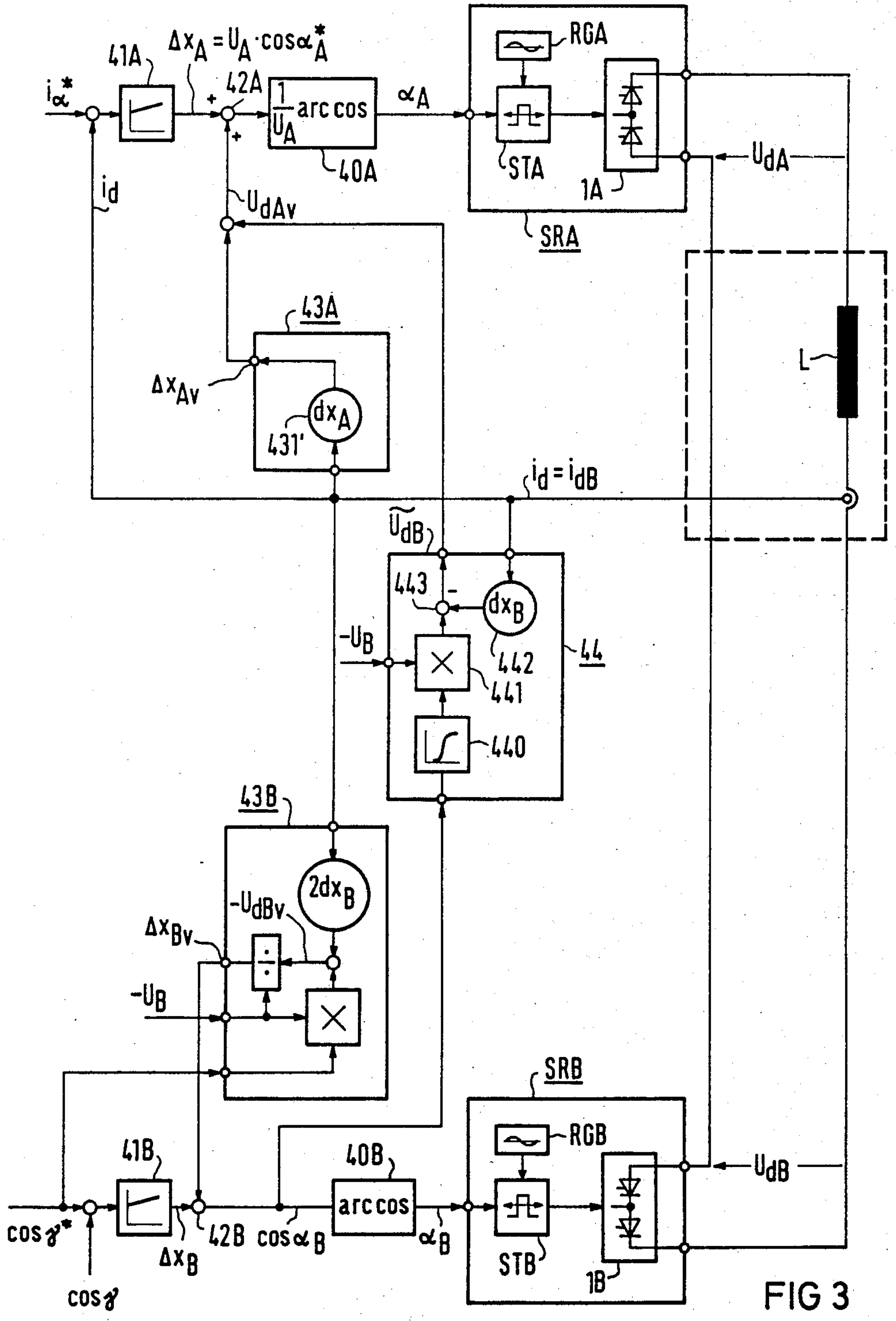
FIG. 3 is the schematic design of a HVDC transmission line short coupling with automatic control of the control angle for normal functioning operation.
Figure 4:
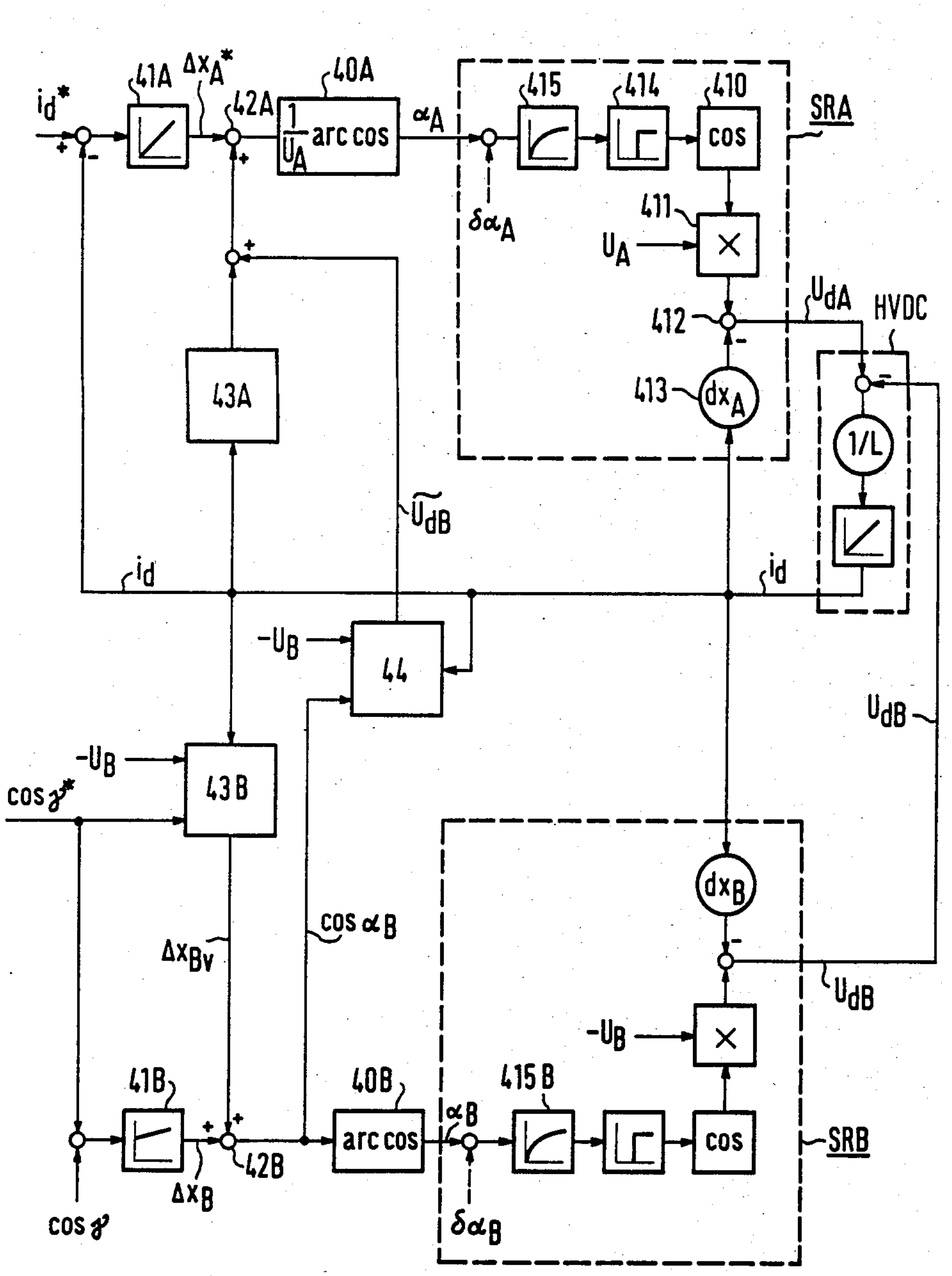
FIG. 4 shows the configuration of the HVDC transmission system in accordance with FIG. 3.

The first application of these relationships is depicted in FIG. 3 for a short-coupling arrangement, i.e., the HVDC transmission line consists in this case only of one inductance $L=LA+LB$, arranged without filtering circuits between the two converters 1A and 1B. FIG. 4 depicts the structure of this arrangement, whereby inductance L of the HVDC transmission line analogously to equation 1 is depicted by an integrator having integration constant L and with the input value $U_{dA}-U_{dB}$ and the output value $i_d \doteq i_{dA} \doteq i_{dB}$.

The action of converter 1A of drive unit STA and of the reference voltage generator RGA depicted as the current-impressing assembly SRA is determined by the fact that the set firing angle $\alpha_A$ given with incomplete synchronization of the reference voltage generator to the actual phase of the a.c. voltage of NA determines the voltage $U_{di\alpha A}/U_A=\cos(\alpha_A+\delta\alpha_A)$ except for an angle error $\delta\alpha_A$ (cos generator 410 in FIG. 4). By renormalizing (multiplier 411) and taking into account the inductive voltage drop $d_{XA}\cdot i_d$ of this converter (proportional element 413, subtraction element 412), one eventually obtains $U_{dA}=U_{di\alpha}-i_d d_{XA}$.

The lag time of the current impressing is symbolized by lag time circuit 414, while a dynamic circuit 415 shows the smoothing of the control angle in the drive unit or in a generally advantageous integral drive unit smoothing mechanism.

This demonstrates that the inductive voltage drop of converter 1A can be compensated in accordance with the principle of automatic control by the addition of a corresponding model control voltage $d_{XA}\cdot i_d$ to the control quantity for $U_A$ (in this case the signal $U_A'\cos\alpha_A^*$ supplied by a current regulator 41A). In many cases, e.g., if a $U_A$ normalized arcos-function network 40a is connected following the controller 41A to linearize the control characteristic function, the normalization of the automatic control voltage, model fault indication quantity, corresponding to the normalization of the control quantity is not even necessary so that computing circuit 43A only requires a proportional circuit 431' in order to form the model fault indicator quantity $i_{dA}\times d_{XA}$ from the available current-measurement value $i_{dA}$ (in this case $i_{dA}\doteq i_d\doteq i_{dB}$, i.e., a quantity available at the location of the station, A).

If one connects in addition or as an alternative to the automatic control device (additional element 42A) the voltage $U_{dB}$, then also the effect from the converter 1B on the current control will be compensated. The station, A, thus compensates, practically without any delay, jumps in the fault indication quantity, coming from the station, B, and the controller can be more rapidly adjusted since thereby the delaying effect of the HVDC transmission inductivity is obviated. Correspondingly, the controller can be optimized strictly in terms of the time behavior of the current impression (actual value and set value generation as well as smoothing and delay of the converter) without considering the time constants to be allocated to the transmission conductor and the operation of the station, B.

The HVDC current transducer basically required for this operation can, however, be omitted in accordance with the invention if the actual value $U_{dB}$ for the automatic control is replaced by a model fault indication quantity $\tilde{U}_{dB}$ computed by a computing circuit 44 from the measured value $i_D$, i.e., the HVDC transmission current or the input d.c. current of the converter 1B in accordance with equation (7):

$$\tilde{U}_{dB}=-U_B\cdot\cos\alpha_B-d_{XB}\cdot i_{dB}$$

from the actual value $i_{dB}$, the system voltage $U_B$, and the firing angle control angle $\alpha_B$. In accordance with the circuitry symbols (FIG. 3) a proportional link 442 and multiplier 441 and a summation point 443, for example, serve that purpose.

In this context, however, the time behavior of both converters with their drive units and the HVDC transmission line itself must be taken into account. This is handled by a dynamic element 440 which is preferrably designed as several smoothing links connected in series and therefore permits, in particular, adequate consideration to be given to the resulting lag times.

In summary, the converter 1A is operated with a control angle $\alpha_A$ forming part of a control voltage $U_{STA}=U_A\cdot\cos\alpha_A^*+U_{dAv}$, automatic control voltage $U_{dA}$ can take into account the inductive d.c. voltage drop $\Delta X_{Av}=i_{dA}\cdot d_{XA}$, but particularly contains the following fault indication voltage $U_{dLA}$ (for short-circuit coupling: $U_{dB}$ or else $\tilde{U}_{dB}$) as shown in equation (1).

In the station, B, one must also take into account that the inductive d.c. voltage drop also functions as a fault indication quantity on the voltage $U_{d\alpha}$ determined by the control angle $\alpha_B$, in addition to the fault indication voltages caused by a synchronization error $\delta\alpha_B$. This fault indication variable has to be eliminated by the control quantity controller.

The station, B, shown in FIG. 4 contains the same structural components for block SRB with a drive unit smoothing component 415B (if necessary designed as an integral smoothing circuit) and a automatic control device comprising a summing point 42B and, depending upon the nature of the $\Delta_{XB}$ signal and the $\Delta_{XBV}$ automatic control signal, a linearizing circuit 40B.

Figure 8:
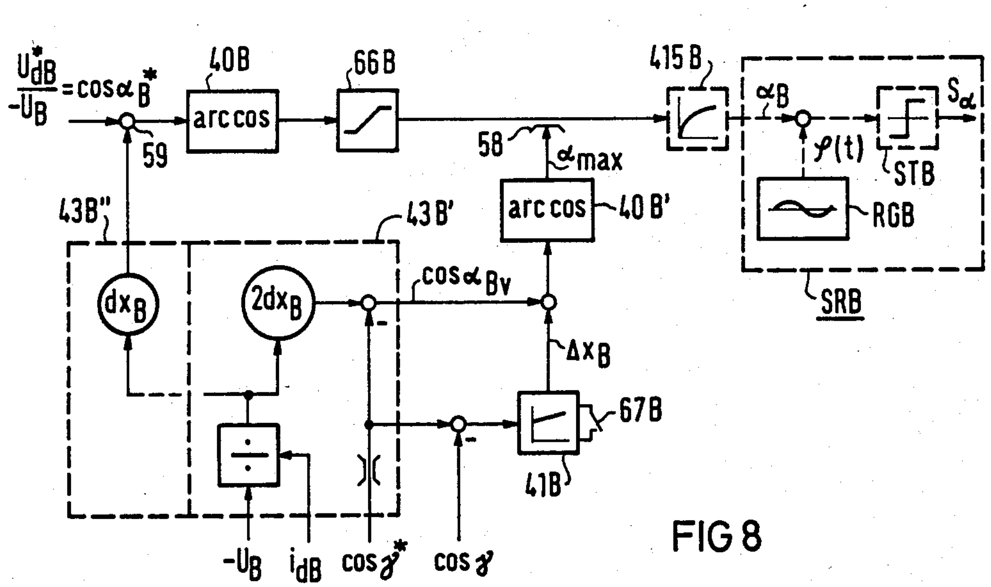
FIGS. 8 and 9 are modified designs of a station, B, in contrast to FIG. 6.

As FIG. 8 shows, initially a signal which determines a set value of the HVDC transmission voltage $U_{dB}^*=-U_B\cdot\cos\alpha_B^*$ using a preset angle $\alpha_B^*$, can be taken from a control device which computes this voltage set value from a control quantity or other operating values of the station B (controlled operation). In particular, however, $\alpha_B^*$ (or $\cos\alpha_B^*$ if a linearizing circuit 40B is also connected) can be obtained as the output signal of a control quantity controller.

The corresponding model fault indication quantity is then connected to the automatic control device (summing point 59, FIG. 8) as an inductive d.c. voltage drop $d_{XB}\cdot i_{dB}$ (or as the corresponding automatic control angle) and onto this preset angle in such a way that the control angle $\alpha_B$ is determined by $\alpha_B=\alpha_B^*+\alpha_{Bv}$, with $\cos\alpha_B=U^*_{dB}+d_{XB}\cdot i_{dB}/(-U_B)$. In the circuit component SRB, the control command for the inverter thyristors is generated by a reference angle $\Phi(t)$ of the reference voltage generated by the reference voltage generator $RG_B$ which is defined by the condition $$(U^*_{dB}+d_{XB}\cdot i_{dB})/(-U_B)=\cos(\alpha^*_B+\alpha_{Bv})=\cos\Phi(t)$$

or $$\alpha^*_B+\alpha_{Bv}-\Phi(t)=0$$

Thereby a jump in the fault indication quantity can be largely and virtually immediately compensated even if the control quantity controller 41A generating the fault quantity is adjusted very rapidly, e.g. time constant less than 50 ms, particularly approximately 10 ms or less. Here as well the controller can be optimized strictly in terms of the time response of its own station without taking into account the time constants to be attributed to the HVDC transmission line and the other station.

Although this does permit stable stationary operation with rapid control functions, it does not assure the maintenance of a corresponding minimal extinction angle or safety angle corresponding to the inverter step limit.

However, to avoid inverter failure, the commutation always has to be completed at a certain, i.e., minimum extinction angle $\gamma^*$. Therefore the thyristors must always be fired at a phase position $\phi(t)$ of the inverter defined by:

$$\Phi(t)=180^\circ-\gamma^*-u$$

In the ideal instance in which the thyristor firing takes place without switching delay and with ideal synchronization at the phase position $\Phi(t)=\alpha_B$, with the voltage drop being exactly obtained by the model value $d_{XB}\cdot i_{dB}/(U_B)$, the control angle $\alpha_B$ then must be limited to $(\alpha_B)_{max}=180^\circ\ \gamma^*-u=\text{arcos}\ (-\cos\ \gamma^*-2d_{XB}\cdot i_{dB}/(U_B)$.

In operating conditions in which said firing angle limitation prevails, the firing condition $$\Phi(t)=180^\circ-\gamma^*-u,$$

$$180^\circ-\gamma^*-u-\Phi(t)=\text{arcos}\ (-\cos\ \gamma^*-(2d_{XB}i_{dB})/U_B-\Phi(t))=0$$

$$-\cos\gamma^*-2d_{XB}\cdot i_{dB}/(U_B)-\cos\Phi(t)=0$$

accordingly applies in the drive unit with $\gamma^*$ or else cos $\gamma^*$ being a value for the extinction angle which is preset. This presetting of the maximum control angle $\alpha_{Bmax}$ can be handled by a limiting device 58 (FIG. 8) at the input channel for the control angle $\alpha_B$ of the drive unit, with $\alpha_B$ being preset by a control function and, as was just explained, capable of being set by automatic control. The limitation thereby also functions as an automatic control with an automatic control angle $\alpha_{Bv}=(\alpha_A)_{max}$ computed from $\gamma^*$.

If equation 7 applies strictly and a set angle $\gamma^*$ is calculated and limited to $\gamma_{min}$ from the voltage set value $U^*_{dB}$ by $U_B\cos\gamma^*=-U^*_{dB}+d_{XB}\cdot i_{dB}$, then the angle $\gamma^*$ formed in computing 43B' (FIG. 8) equals $\alpha_{Bv}=\text{arcos}$ $(-\cos\ \gamma^*-2d_{XB}\cdot i_{dB}/U_B)$ or, if no linearization is performed, the corresponding voltage $U_{dBv}=-U_B\cdot\cos\gamma^*-2d_{XB}\cdot i_{dB}$ provides a limit value for the angle $\alpha^*_B$ or a corresponding control voltage which can be preset in any desired fashion, e.g., by a reactive current controller or another control quality controller.

Said control quality controller can then simply cause the control angle $\alpha_B$ and thus the voltage $U_{dB}$ in contrast to the automatic control angle $\alpha_{Bv}$ to be retracted while with given $U_B$ and $i_{dB}$ the values $U^*_{dB}$ and $\gamma_{min}$ will not be exceeded. If the angle $\gamma^*$ can be calculated from the control quantity set value as takes place in computing element 47 of FIG. 6 or 7, then the angle $\alpha_{Bv}=180^\circ-\gamma^*-u$ can be directly connected to the drive unit in a controlled arrangement without any further adjustment.

In the drive unit the following always applies: $\alpha_{Bmax}=180^\circ-\gamma^*-u$ wherein u is the computed overlap angle from $\gamma^*$ and the inductive d.c. voltage drop (model fault indication quantity).

The model value $2d_{XB}\cdot i_d/(U_B)$ can thereby be determined from momentary values for $i_d$ and $U_B$ for each phase position of the system. This means that for each momentary phase position of the system the respective inductive voltage drop and thus the overlap angle will be precalculated. By monitoring the specified firing conditions, therefore, a thyristor firing will be initiated if in accordance with the precalculated overlap angle the still remaining time period until the set time point of a thyristor extinction (predetermined by $\gamma^*$) suffices to complete the commutation.

In actual converter operation a control angle controlling signal $\alpha_{Bv}$ calculated from a set extinction angle $\gamma^*$ in accordance with $180^\circ-\gamma^*=\alpha_{Bv}+u$ causes at the reference angle $\Phi(t)$ a thyristor firing which, however, takes place at the actual phase position $\Phi(t)=\Phi(t)+\delta\Phi_\alpha$ of the a.c. voltage system and, due to a possible imprecision $\delta u$ of the computed overlap angle leads to the actual value $180^\circ-\gamma=\Phi(t)+\delta\Phi_\alpha+u+\delta u$ Thus, there is a set/actual value differential $\Delta\gamma=\alpha_{Bv}-\Phi(t)-\delta u-\delta\Phi_\alpha$.

For that reason, the differential $\Delta\gamma$ is preferrably eliminated using an extinction angle controller 41B shown in FIG. 8, to whose output signal $\Delta X_B$ the precalculated automatic control angle $\alpha Bv$ is added so that for the drive unit we have the following condition:

$$\Delta X_B+\alpha_{Bv}=\Phi(t)\ \text{with}\ \alpha_{Bv}=\text{arcos}\ (-\cos\ \gamma^*-2d_{XB}\cdot i_{dB}/(U_B)$$

A controller can, however, be used for another control quantity whereby the set extinction angle $\gamma^*$ to calculate $\alpha_{Bv}$ will be determined from the control quantity set value (compare item 47 in FIG. 5 or 6) and the control output signal $\Delta X_B$ will correct the extinction angle to maintain the control quantity set value.

Here as well, the overlapping angle or the inductive d.c. voltage drop belonging to $\gamma^*$ will be precalculated from momentary values for $i_{dB}$ and $U_B$ at each phase position $\Phi(t)$.

Thereby one attains a controlled presetting of the extinction angle which is used in FIG. 8 to limit the either controlled or regulated preset angle $\alpha^*_B$. In the preferred design example of FIGS. 3 and 4 the controlled preset automatic control angle $\alpha_{Bv}$ is connected directly to the control quantity controller 41B output as the model fault indication quantity $\Delta X_{Bv}$ whose output quantity $\Delta X_B$ serves to control the control quantity preset extinction angle in terms of cos $\gamma^*-\cos\gamma=0$. The automatic control device 42B, 40B is thus in this case connected to the automatic control voltage $\Delta X_{Bv}=-\cos\ \gamma^*-2i_{dB}\cdot d_{XB}/U_B$ to generate $\alpha_B=180^\circ-u+\Delta X_B$. This automatic control voltage serves thus to take into account the inductive d.c. voltage drop and is computed by the 43B computation circuit which can be handled, for example, by the computation components with the computation circuits shown in the circuitry symbols.

Said taking into account of the relationships here indicated can, of course, also be handled in accordance with deduced relationships in modified computation circuits which those skilled in the art can develop as required.

Thus, in the case of a short-circuit coupling one develops an arrangement coordinated for rapid elimination of operating status changes of both converters which requires only simple mechanisms; particularly the high-voltage component only requires a current transducer as a detecting unit.

Figure 5:
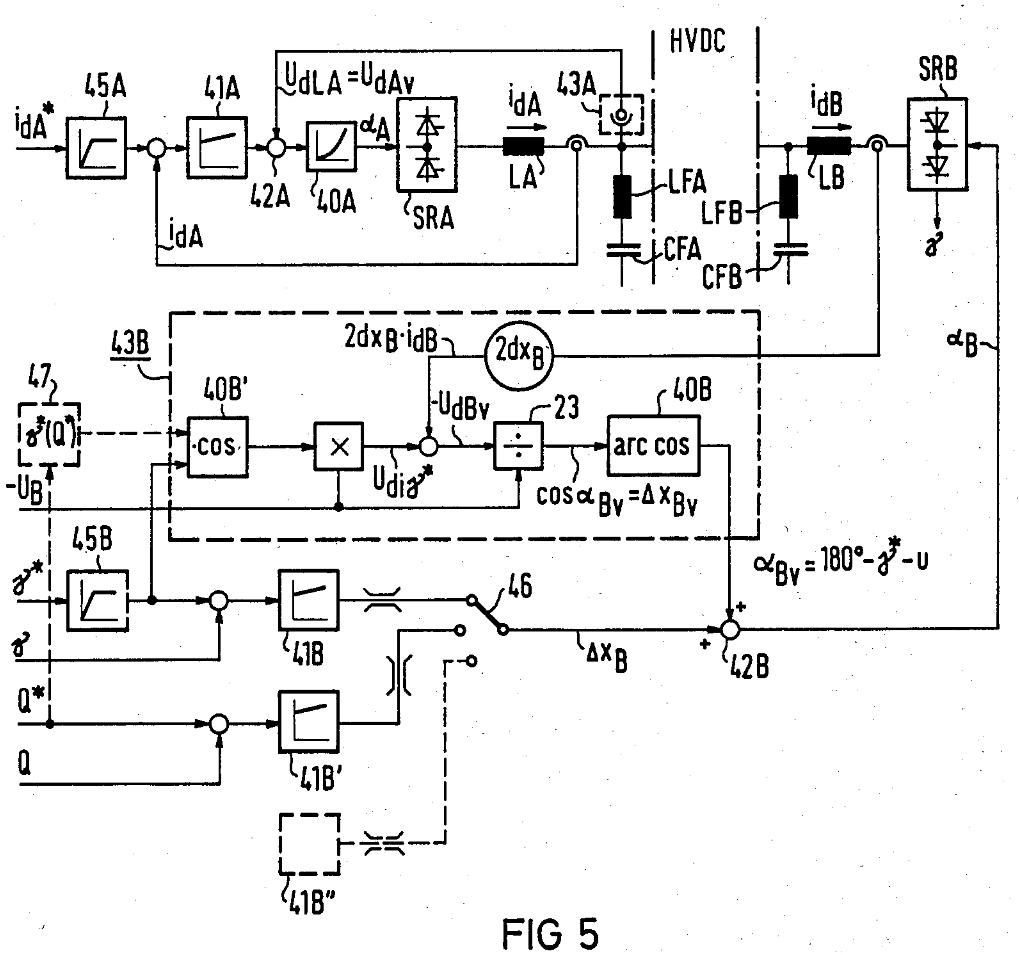
FIG. 5 shows a modified design of a HVDC transmission system with automatic control.

In FIG. 5 these relationships are applied to the system in which the converters are connected via converter reactance coils LA and LB and filter circuits LFA, CFA as well as LFB, CFB to the HVDC transmission line (short-circuit coupling or remote transmission line).

This arrangement dispenses with any compensation of the slight control angle shift brought about by the inductive d.c. voltage drop of the converter 1A. Furthermore, to take into account the fault proceeding from the station, B, the HDVC transmission input voltage $U_{dLA}$ is used in place of the model fault indication quantity $U_{dB}$ as the automatic control voltage $U_{dAv}$ in the station, A.

In normal operation the station, A, requires no remote action signals which influence its operation similarly to information transmitted over remote control lines regarding the status of the station, B. Rather, in the station, A, all the required actual or set value quantities required for normal operation are available. The same applies to the station, B. The automatic control of both stations thereby takes into account the mutual coupling of both stations in such a manner that stable operation with short control cycles is attained.

In the design according to FIG. 5, the linearizing circuit 40B is integrated into the computing circuit 43B since an extinction angle controller is used as the control quantity controller 41B, whose output signal $\Delta X_B$ already defines an angle. The cos $\gamma^*$ required in the computing circuit 43B is the formed using a function generator 40B'.

The design also foresees that given sudden irregular changes in the respective control quantities in both stations, the respectively change rate of the control quantity set values can be limited by run-up function generator 45A or 45B. The other components already familiar from earlier figures are identified with the old reference symbols.

In the station, B, optionally either the extinction angle $\gamma$, the reactive power Q, or another suitable control quantity can be used to maintain constant voltage, to dampen balancing processes or for other dynamic controls. This is indicated by the selector switch 46, whereby the input of the automatic control device 42B can be switched between the extinction angle controller 41B and other control quantity controllers 41B', 41B". For this switchover the design foresees that an auxiliary computing circuit 47 will supply the relevant extinction angle set value $\gamma^*$ or else the cos ($\gamma^*$) obtainable from the function generator 40B based upon the control quantity set values utilized in the particular case.

The converter parameters $d_{XA}$ or $d_{XB}$, respectively, required to generate the model fault indication quantity which corresponds to the inductive voltage drop of the converter, can be automatically reset in the relevant computing circuits since always during each thyristor extinction the actual inductive voltage drop is determined from the measured firing and extinction angle and compared with the computed value in accordance with the following relationship:

$$U_B(\cos\alpha_B - \cos\gamma) = 2d_{XB} \cdot i_{dB}.$$

Figure 6:
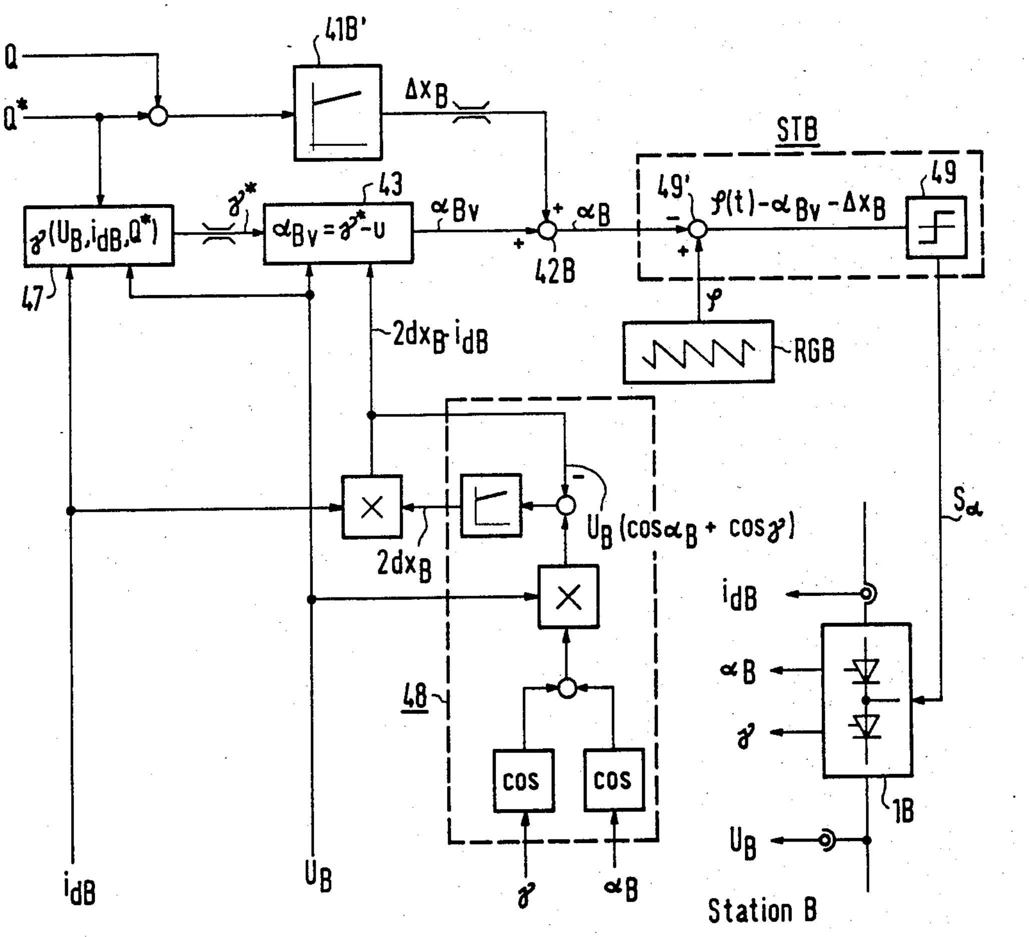
FIG. 6 shows another schematic design of a station, B, with automatic control.

In accordance with this comparison the parameter $2d_{XB}$ can then be adjusted as indicated by the parameter feedback device 48 in FIG. 6.

In addition, FIG. 6 symbolically shows that the drive unit STB generates the control signals $S_\alpha$ by monitoring the above-specified firing condition.

Figure 7:
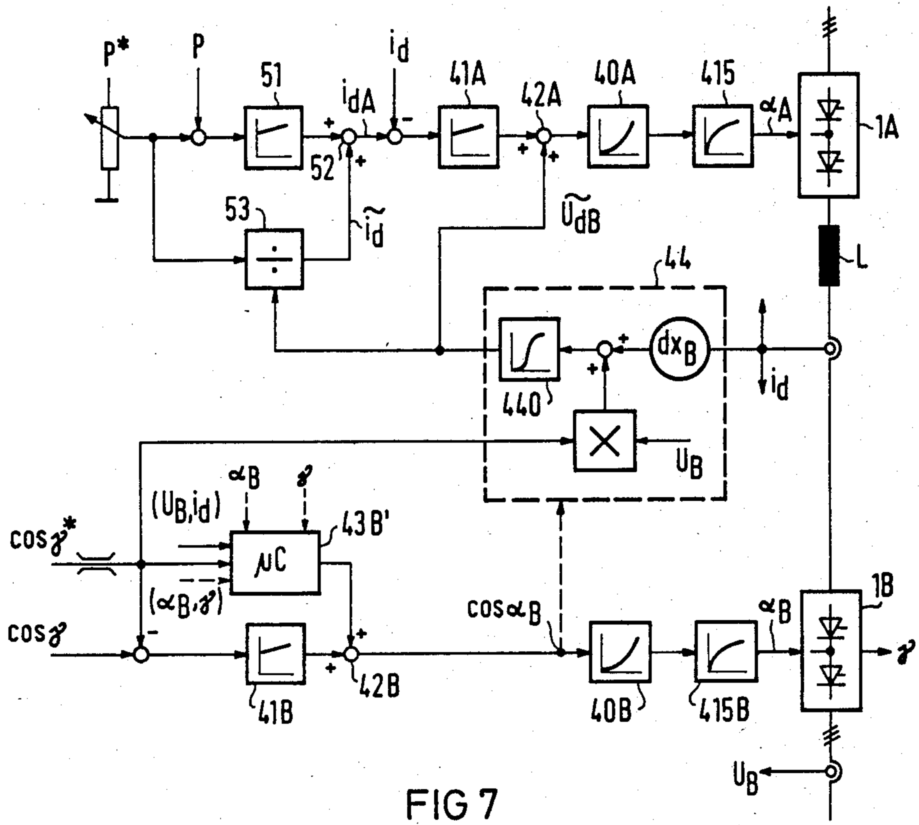
FIG. 7 is a design modified from FIG. 3.

The precalculation of the overlap angle which at the momentary phase position $\Phi(t)$ of the system always belongs to the set extinction angle $\gamma^*$ as well as the momentary values of $i_{dB}$ and $U_B$ can, for example, proceed within a millisecond-frequency in a microcomputer 43B as shown the case of a short coupling (inductivity L) in FIG. 7. Here as well, use is made of the model fault indication quantity $\tilde{U}_{dB}$ as the automatic control voltage $U_{dAv}$ of the station, A, whereby the computing circuit 44 can be further substantially simplified if one starts not from the control angle $\alpha_B$ itself, but from the preset extinction angle $\gamma^*$ or related quantities generated in the microcomputer itself. In particular, for example, in place of $\tilde{U}_{dB}$, the quantity $U_B$ cos $\gamma^* - d_{XB} + i_{dB}$ can be connected by a dynamic circuit which imitates the transmission behavior of converters and the HVDC transmission line to the automatic control device 42A. In addition, FIG. 7 shows that preferrably the effective output P of the HVDC transmissions line is used as the control quantity of the station A. From the control differential $p^* - p$ a superimposed active power controller 51 generates the set value $i^*_d$ of the current regulator 41A. This set value $i^*_d$ can also preferrably be regulated by a fault indication quantity $i_d$ at the addition circuit 52 whereby $i_d = p^*/U_{dB}$ is supplied by the divider 53.

FIG. 8 depicts a design for the station, B, in which the run-up function generator 66B initially supplies a control quantity which (if necessary via a drive unit smooting circuit 415B) presets the control angle $\alpha_B$ of the converter. The quantity $\alpha^*_B$ can be preset from a non-depicted control quantity controller, e.g., an active power controller or a controller for the HVDC transmission voltage $U_{dB}$ or can be preset in accordance with the already discussed controlled operation by computational means. An automatic control device 59 is shown which compensates the inductive d.c. voltage drop influencing on the set angle $\alpha^*_B$ which is supplied by a computing unit 43B". The microcomputer 43B" previously shown in FIG. 7 also determines the cosine of an automatic control angle $\alpha_{Bv}$ which takes into account both the voltage difference brought about by the inductive d.c. voltage drop between the ideal no-load direct voltage relative to $\gamma^*$ and the voltage $U_B$ as well as the angle shift brought about by the inductive d.c. voltage drop between the angle $\alpha_B$ and the ideal firing angle belonging to voltage $U_B$.

The linearization circuit 40B' provides a maximum extinction angle $\alpha_{max}$ for a limiting circuit 58 calculated from $180° - (\gamma^* - U + \Delta X_B)$, whereby $\Delta X_B$ is prepared at the output signal of an extinction angle controller 67B.

As long as the limiting circuit 58 is not in operation, the converter is regulated by the preselected value of $\alpha^*_B$. If, however, the compensated angle $\alpha^*_B$ attains the preset limit angle $\alpha_{max}$, the extinction angle control intervenes and the converter is operated with the controlled extinction angle. If the extinction angle controller 41B is deactivated for example, by a short-circuit switch 47B, then only the automatic control angle $\alpha_{Bv}$ determines the limit angle $\alpha_{max}$. By the action of the angle limitation 58, the station, A, is then operated with a regulated extinction angle.

As a rule, the incorporation of the inductive d.c. voltage drop described assures that the inverter step limit is observed as long as $i_{dB}$ and $U_B$ do not change all too drastically during a commutation process so that the precomputed transmission angle u coincides adequately with the actual overlap angle. This permits operation with maximum firing angle (maximum active power transmission or minimum reactive power). A greater safety margin to the inverter step limit is thus not required as long as it is assured that even in an extreme case in which sudden changes of $i_{dB}$ or $U_B$ can lead to a failure of the inverter, the converter switches over to malfunction operation and after the termination of a malfunction can rapidly resume normal operation.

In the preferred design of the control and regulating device 4B in FIG. 9, a monitoring and programming switch 62B is included which contains a memory circuit 63B (for example, a programmed microprocessor) and a monitoring device 64B which will be described later.

Figure 9:
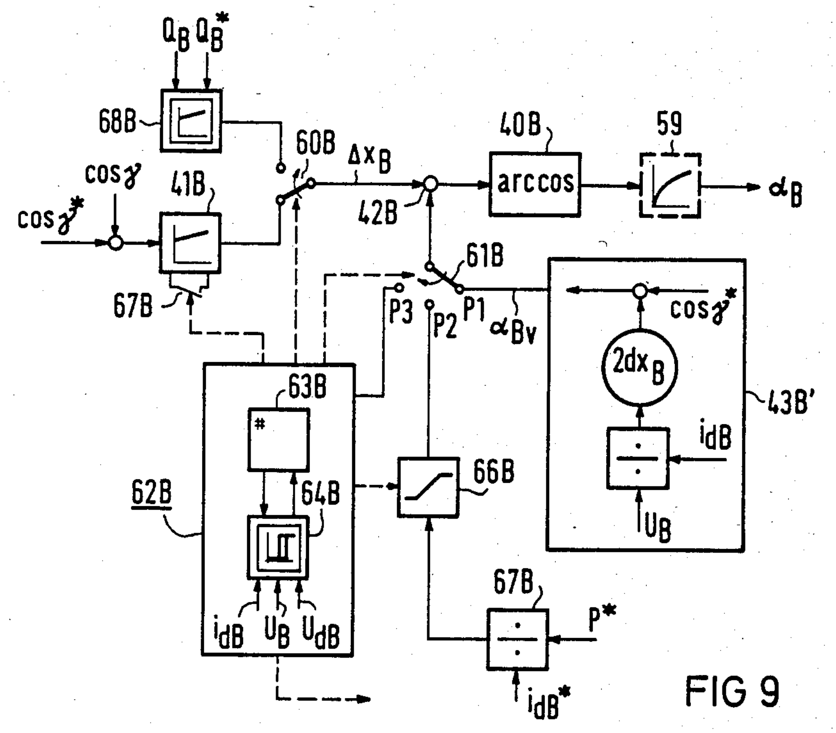

Device 62B activates two selector switches 60B and 61B whose position as shown in FIG. 9 corresponds to normal operation. In this normal operation the automatic control voltage (automatic control angle $\alpha_{Bv}$) generated by the microcomputer 43B' is connected via switch position P1 to the automatic control device 42B and added to the control quantity $\Delta X_B$ of firing angle $\alpha_B$ which is generated by a control quantity controller, particularly an extinction angle controller 41B. A control device 68B not shown in detail can, by repositioning switch 60B, be connected to the automatic control device so that, for example in emergency operation, the control angle will be generated in accordance with the requirements of the system, NB, (for example, in accordance with a reactive output set value $Q^*_B$) required to approximately maintain a constant voltage.

In switch position P2 another model value is supplied to the input of the automatic control device 42B in place of the model value for the model fault indication quantity $\alpha_{Bv}$. Said model value is supplied by a run-up function generator 66B. The end value of this run-up function generator is determined by values preset in terms of the normal power transmission of the HVDC transmission line in trouble-free operation. For example, in accordance with a normal value $U^*_B$ for the HDVC transmission line voltage computed by a divider 67B as the quotient of the nominal active power P* and the nominal HVDC transmission line current $i^*_{dB}$ for normal operation.

Switch position P3 is reserved for a case in which the control angle $\alpha_B$ has to be temporarily shifted due to the surging hookup of an additional set value (i.e., to shut down the HVDC transmission line or to pass into normal operation).

Figure 10:
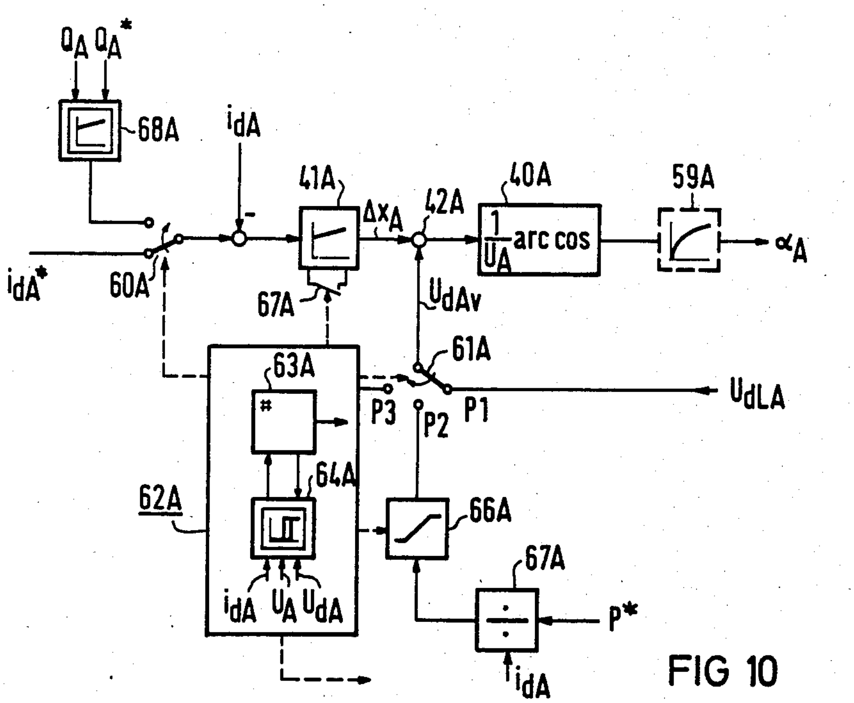
FIG. 10 shows another schematic design of a station, A, with automatic control.

The station, A, is very similar in design with identical components having the same coding numbers along with the letter A as shown in FIG. 10.

Aside from a possibly somewhat different operation of the linearizing circuit 40A, the station, A, is designed so that the selective switch 60A switches the current set value $i^*_{dA}$ projected for normal operation for the current regulator 41A to a current set value which is supplied by a superimposed control device 68A in accordance with the requirements of the system, NA, in case of a malfunction. Moreover, in position P1 of selective switch 61A the voltage $U_{dLA}$, i.e., the d.c. voltage obtained when using filtering circuits between the filter circuits and the HVDC transmission line connection of the station, A, is connected to the automatic control device 42A as the model fault indication quantity $U_{dAv}$ in normal operation.

In both stations, however, the startup generators 66A, 66B as well as the control variable controllers 41A and 41B can be deactivated by the control and programming circuits. In addition, the design foresees that in the event of a malfunction the devices 62A and 62B transmit relevant malfunction signals to shut down the converter, e.g., by triggering the clamping circuits BS from FIG. 1.

MONITORING MALFUNCTIONS

In the normal operation described there are no complications due to delay times and processing times of remote control signals which often necessitate a slow adjustment of the HVDC transmission line operation.

Normal operation of the stations is, however, possibly only if both the system, NA, and system, NB and both converters are intact. Should one system or converter fail, the operation has to shift into emergency mode. For that reason both stations require a monitoring device which monitors the correct operation in both stations.

Figure 11:
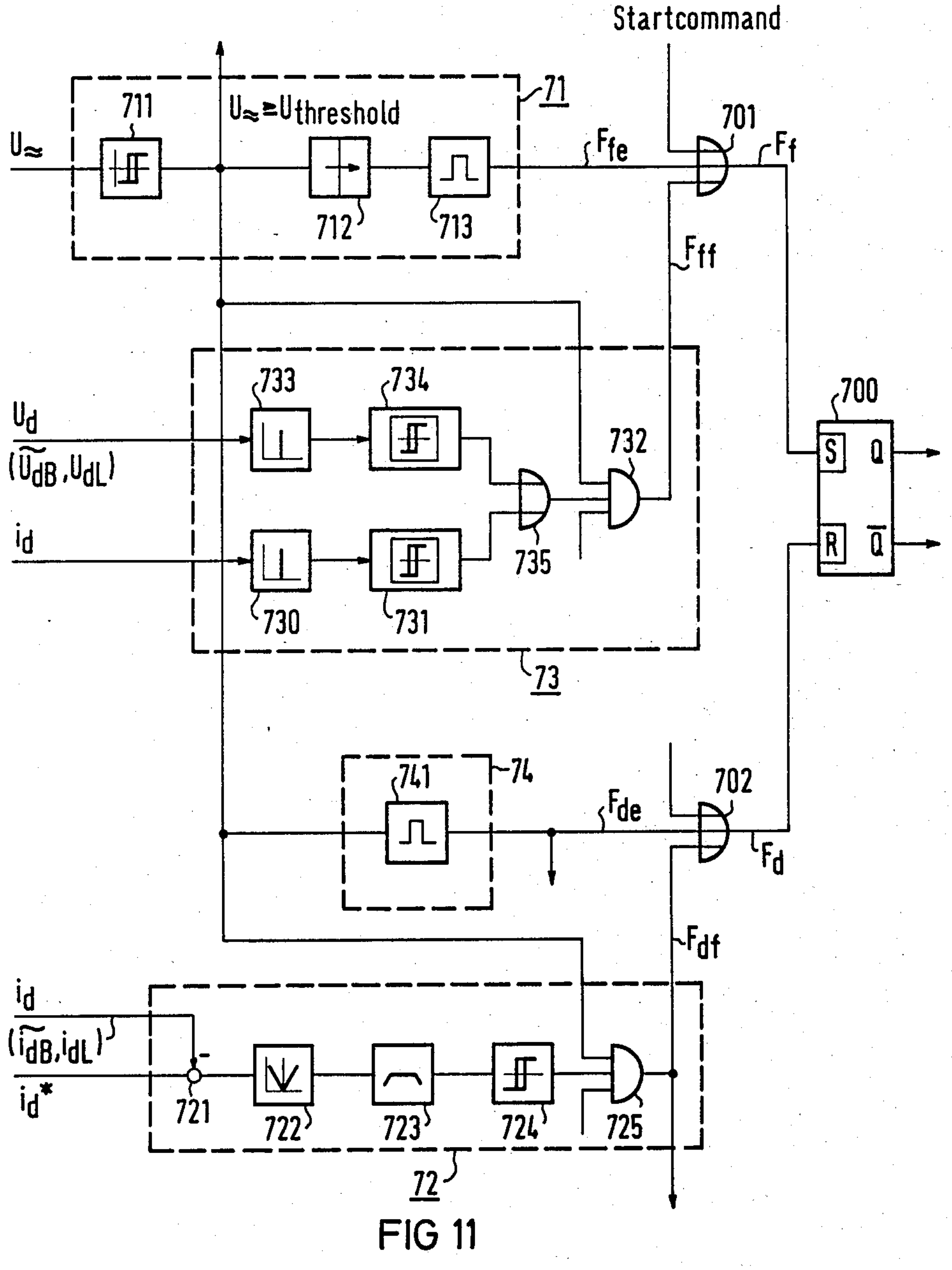
FIG. 11 is a design of a monitoring device for either a station, A, or a station, B.

Said monitoring device is depicted in FIG. 11 and will initially be explained in its operation in converter A. Said monitoring and the alternating transition between normal operation and emergency operation given malfunctions should also, as far as possible, be operative without remote control signals. Rather, based upon a further fundamental concept of this invention, the required information regarding interrupted or resumed normal operation in the other station should be recognized from the effects of said operation in the former station. It would therefore be advantageous to generate clearly recognizable signals that the transition in the other station proceed in a certain fashion. While these measures for the transition from and into normal operation will be described later, first the design of the monitoring arrangement based on FIGS. 11 through 14 will be explained.

In these figures the design for the monitoring arrangement of one station only is shown. The other station contains an identical arrangement and the signals $F_{de}$ generated in such an arrangement are, if necessary, to be supplemented by the identifying letter of the station in which they are generated, e.g., $F_{deA}$, $F_{dfA}$, in the station, A.

The advantage of this monitoring device is that it does not require remote control signal lines. The start or the end of a malfunction in the other station is recognized on the d.c. current side input of the first station at the earliest possible moment. If for safety reasons signal lines connect the two stations, then the signals transmitted thereby do not normally directly initiate measures to shut down or start up the first station. Rather, this mode of operation is in the last analysis initiated by the HVDC transmission line currents, e.g., in the station, A, by measured values $i_{dA}$ and/or $i_{dLA}$; and the HVDC transmission line voltages, e.g., $U_{dA}$ or $U_{dLA}$; and the logical combination of the measurement variables, particularly the logical combination of the measured values for amplitude and, if necessary, phase location of the first station's a.c. voltage system.

The monitoring device is moreover also in the position to notify the sound or malfunctioning status of its own station and to store the relevant notification.

The system voltage amplitude $U_{\approx}$ (in case of the station, A, this means voltage $U_A$) is monitored using a limit value warning device 711 to determine whether the preset minimum value required for proper operation has been exceeded; the output signal $G_{711}$="1" shows that the a.c. voltage system is intact.

The monitoring signal $G_{711}$ can be used, in particular, to set the output signal Q of a malfunction memory 700 to the Q=1 signal corresponding to proper normal operation. The memory is designed, for example, as a flipflop whose setting input is set by an OR gate 701 using a releasing signal $F_f$ which releases normal operation. Said release signal is initially generated when ending the malfunction of its own system by having the resumption of the limit value $U_{grenz}$ impact a time circuit 713 via a delay circuit 712, time constant $T_{syn}$, which thereupon generates a pulse, internal release pulse, $F_{fe}$, of a preset length following the preset delay defined by the delay time $T_{syn}$. The delay time $T_{syn}$ takes into account that upon resumption of the first system voltage a certain time is required until its own reference voltage generator can generate the system-synchronous reference voltage required for normal operation of its own converter from the returning system voltage.

If, however, during a system malfunction, the system's own voltage drops below the limit value, then from $G_{711}$="0" a pulse $F_{de}$ (internal malfunction warning pulse) is generated using assembly 74 which as its key element contains a further time circuit 741, which passing through an OR gate 702 activates the reset input of the malfunction memory 700 with the corresponding malfunction signal $F_d$=1. The OR gate 701 and 702 can also receive other suitable malfunction or release notifications using further inputs whereby other critical quantities of its own a.c. voltage system, e.g., impermissible changes of frequency or phase, are monitored. The limit value warning device 711 and the other monitoring circuits to detect and monitor its own a.c. voltage can be accommodated thereby particularly in the reference voltage generator utilizing the signals generated therein anyway. For example, the proper operation of its own converter can thereby be monitored or, using a start command, the system can be brought on line from a standstill.

The signal status Q=1 set by the release signal $F_f$ indicates not only the undisturbed status of its own station, but also of the entire system. Correspondingly, the signal status $\overline{Q}$=1 indicates a malfunction and is set by the malfunction signal or defect signal $F_d$.

For that purpose the output of components 71 and 74 which monitor their own station are logically combined with an external release pulse $F_{ff}$ or an external malfunction warning pulse, $F_{df}$ using the OR gates 701 and 702 to the release signal $F_f$, or to the malfunction signal $F_d$. These impulses $F_{ff}$ and $F_{df}$ are generated by the component 73 or 72 integral to their own station and notify by monitoring the electrical variables at the d.c. voltage connections of their own station that the other external station has respectively gone into normal operation or a malfunction-reflecting emergency operation. Insofar as its own system is operating properly, the pulses $F_{ff}$ and $F_{df}$ thus initiate the suitable operation of their own station depending on the functioning or malfunctioning status of the other station.

An external malfunction, for example, always exists if in the external station a short circuit of the system or of the converter occurs and therefore the d.c. current passes through this short circuit as fault current. Said fault current is noticable in its own station after a delay reflecting the travel time of the HVDC transmission line in that the d.c. current $i_d$ deviates substantially from the current set value defined for normal operation; the deviation $i_d^*-i_d$ exceeds critical values. This also occurs if given long-term malfunctions the line is dead and therefore the current at the d.c. voltage side connections of the station in question no longer reacts to the control.

For that reason, in component 72 detecting the external malfunction the design incorporates a subtraction circuit 721 to generate the difference $i^*_d-i_d$ in its own station as well as a connected rectifier 722. A connected bandpass filter sees to it that short-term power deviations, particularly those arising during the commutation times of its own converter, are suppressed in the same way as constant or relatively long-term deviations. Said long-term deviations arise, for example, when starting up to normal operation before the HVDC transmission line can transmit the complete d.c. current $i^*_d$ following a malfunction. A suddenly appearing increase or drop of the d.c. current extending for several milliseconds is noticed at the output of filter 723 and registered by a limit value warning device 734. Since said malfunction also arises if the local station itself is malfunctioning, the output signal of the limit value warning device 724 is only released to an AND gate 725 if, for example, using the limit value warning device 711, the normal status of the local station has been reported.

If, on the other hand, the external station has resumed normal operation after eliminating an external malfunction, then this becomes noticable in the station in question after a delay due to the travel time of the HVDC transmission line by means of a sudden change of voltage and/or current at the d.c. current connections. Therefore, for example, the input d.c. voltage $U_d$ or $U_{dL}$ (for example $U_d=U_{dA}$, $U_{dL}=U_{dLA}$ for the station A is differentiated using a differentiation circuit 733 in order to generate subsequently an external release pulse in a limit value warning circuit 734 as soon as the voltage change has exceeded a certain limit value. The output signal of this limit value warning circuit 734 can, in turn, be connected to an AND gate 732 if assembly 71 reports a malfunction of its local system.

In this connection it can be advantageous to generate the required external release pulse $F_{ff}$ also by a corresponding monitoring of the current by elements 730, 731, 735.

Figure 12:
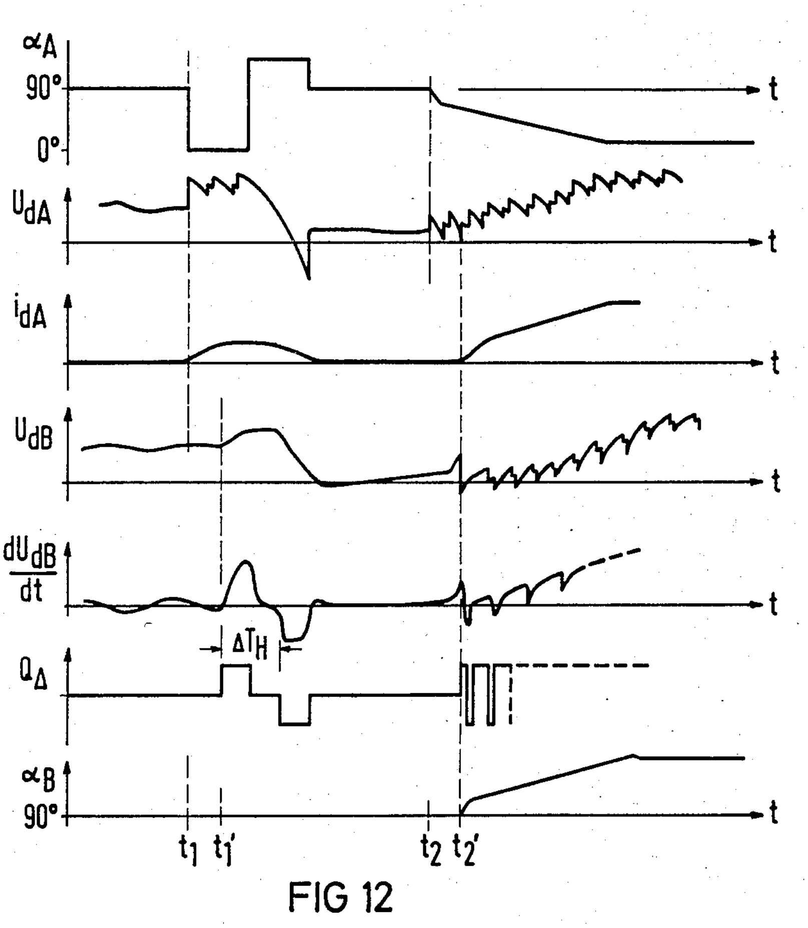
FIG. 12 or 28 are signal patterns and design of a type of limit value warning device for the monitoring unit in accordance with FIG. 11.
Figure 28:
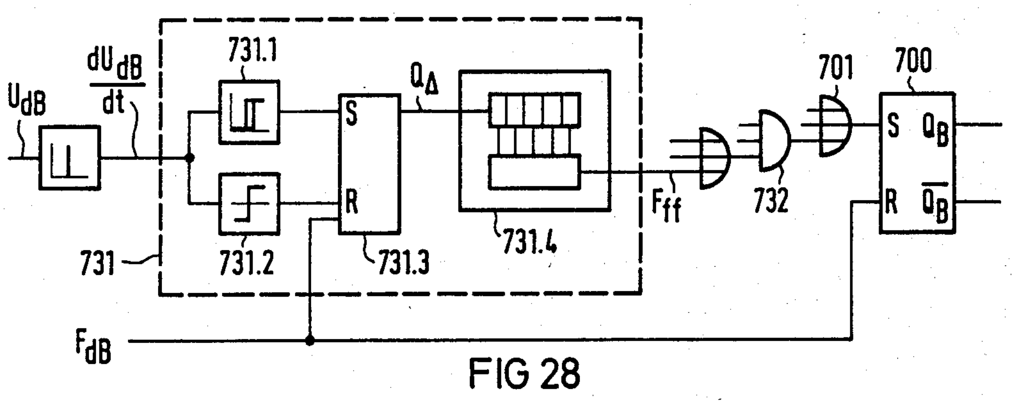

A limit value warning circuit 734 can be designed in accordance with FIG. 12 to increase the reliability for the detection of resumed operation in the external station. The changes in the electrical quantities (e.g., $U_{dB}$) brought about by a resumption of normal operation by the external station (in the example of FIG. 12: the station, A) at the d.c. voltage connections of the station in question (in FIG. 12: the station, B) indicate a typical curve function from which pulse $F_{ff}$ is derived.

FIG. 12 assumes that the line has become deactivated during a malfunction and converter 1A thus blocked or has been regulated to zero d.c. voltage $\alpha_A$=90°. In order to recognize in the station, B, that the station, A, started normal operation, the commencement of rectifier operation is introduced by a pulsating shift of control angle $\alpha_A$ at time $t_1$. At time $t_2$ a smooth running up of the control angle to an operating value near to full-open control proceeds. This leads to the depicted pattern of $U_{dA}$ and $i_{dA}$ with $t_2$, in particular being preset so that $i_{da}>0$ can be maintained.

With a delay reflecting the line travel time, a typical voltage pattern $U_{dB}$ appears in the station, B, whose differential in the station, B, monitoring device is monitored for possible exceeding of either a positive or a negative limit value. The limit vaue warning devices 731.1 and 731.2 designed for that purpose therefore set a flipflop 731.3 for a time period $\Delta T_H$ which is reset from the start of the malfunction, e.g., malfunction signal $F_{dB}$. Circuit 731.4 monitors the time period $\Delta T_H$ or its significance, for example, by entering the output signal of the flipflop monitor in a shift register which generates an external release impulse $F_{ff}$ if the output signal $\Phi_D$ shows the typical stored period $\Delta T_H$. The station, B, after a preset lag time then also resumes its normal operation by a smooth running up of the control angle $\alpha_B$ at time $t'_2$.

Similarly, further monitoring arrangements and logical combinations of the respective release signals or malfunction signals can be designed in order to clearly handle any special operating cases. The design and installation of such logic circuits can be additionally installed at any time by those skilled in the art using circuitry such as depicted in FIG. 11 as soon as it is detected in the course of investigating the possible operating statuses and operating malfunctions, any conceivable ambiguities in the generation of the external release signal, the external malfunction signal, the internal release signals, and the internal malfunction signal.

The particularly simple monitoring device shown in FIG. 11 can be supplemented or expanded by further monitoring elements which permit a more precise recognition of the operating status of the external station, with the information obtained from the HVDC transmission line connections regarding the operating quantities of the external station also being usable to control the former station in normal or emergency operation.

Figure 13:
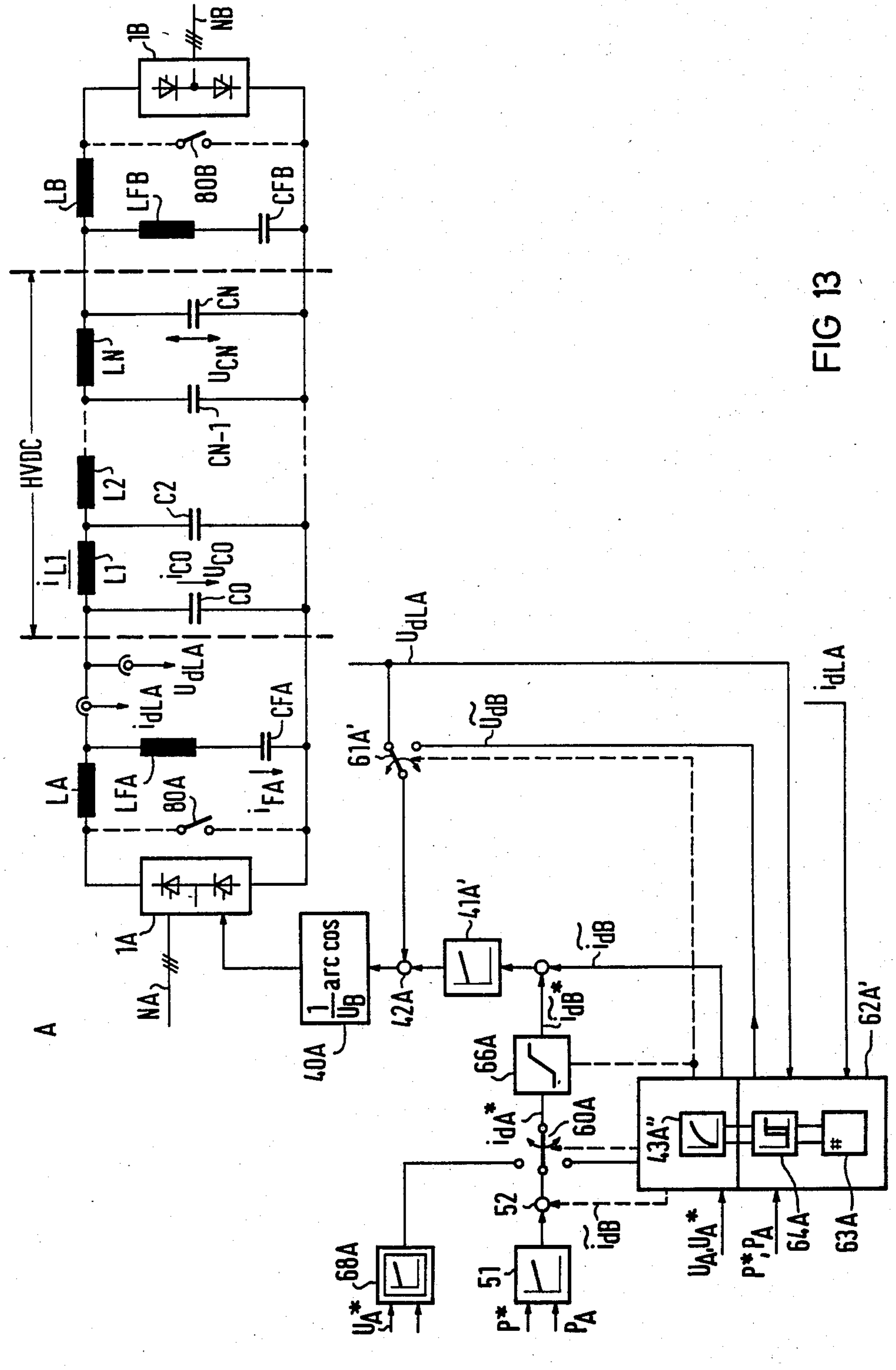
FIG. 13 shows the use of a network model in a station with a HVDC remote transmission line.

This is demonstrated in FIG. 13 for the station, A, using a HVDC transmission line whose converter 1A and 1B are respectively connected to the HVDC transmission line using converter reactance coils and filtering circuits in accordance with FIG. 1. The HVDC transmission line voltage itself is depicted in the replacement circuit as the sequential connection of series inductances L1 through LN and parallel capacitances CO through CN.

In the station, A, the automatic control device can be recognized by the summation point 42A and linearization device 40A, which aside from the output signal of the control variable controller 41A' to which can be connected via a selector switch 61A' the fault indication voltage i.e., HVDC transmission line voltage $U_{dLA}$ or a model value $\tilde{U}_{dB}$ for the fault indication voltage to function as the automatic control voltage $U_{dAv}$.

The computing circuit to generate the model value $\tilde{U}_{dB}$ is installed here in the monitoring and programming circuitry 62A' as an additional computing component 43A" which in part also has a monitoring function, as will be explained in FIG. 14. At the same time it supplies also a model value $\tilde{i}_{dB}$ for the HVDC transmission line current $\tilde{i}_{dB}$ of the external station which serves as a replacement actual value for the control variable controller 41A'. The corresponding set value $i^*_{dB}$ is supplied by the run-up function generator 66A which optionally by selector switch 60A, is connected either to the output signal of a superimposed controller 68A (e.g., for amplitude $U_A$ of the a.c. voltage system, NA) designed for emergency operation, or the output signal of a superimposed controller 51 designed for normal operation. For controller 51, in particular, the same automatic control can be designed as shown in FIG. 7.

Figure 14:
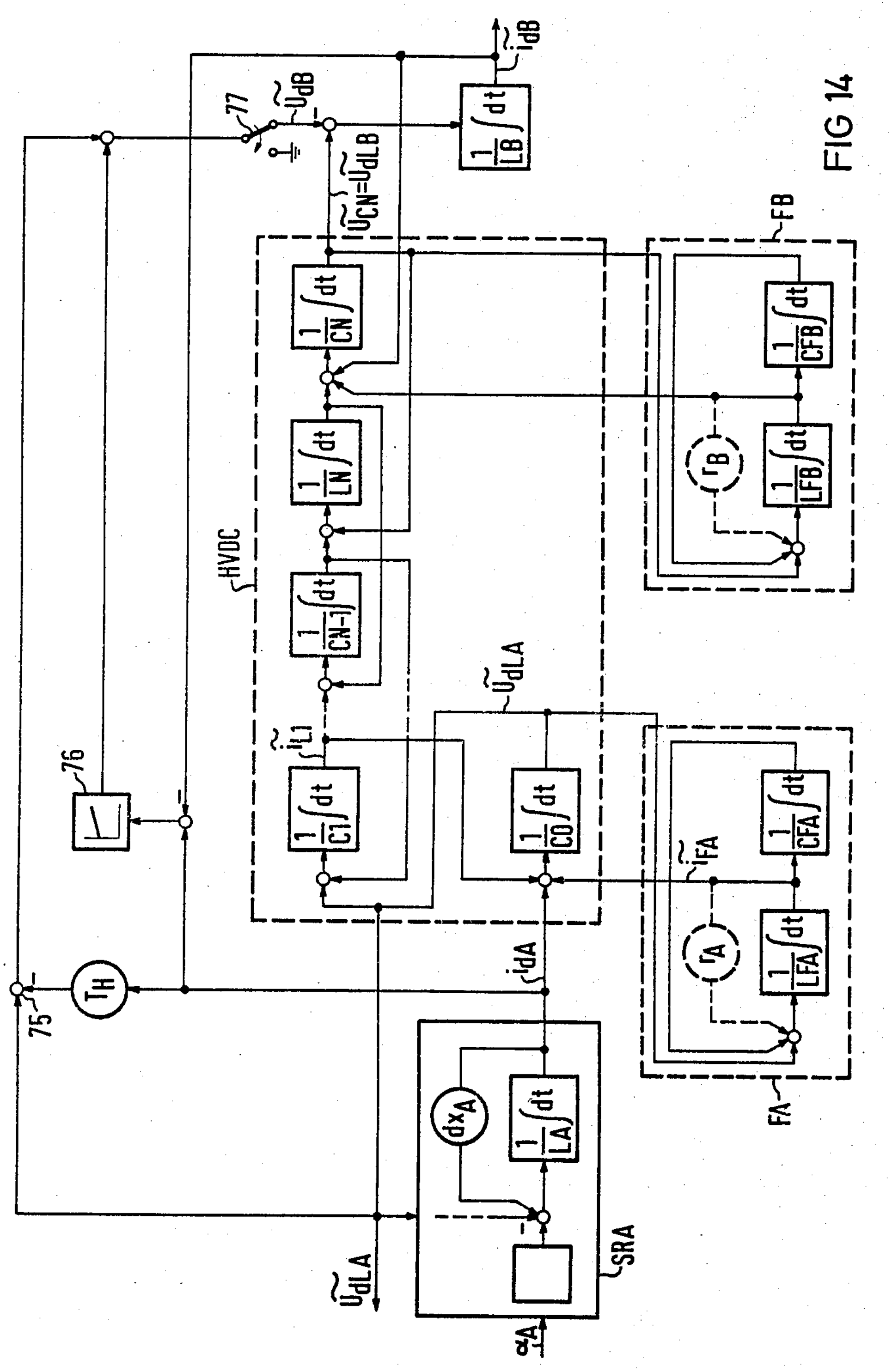
FIG. 14 shows the design of the network model of FIG. 13.

Computer component 43A" simulates the structure of the HVDC transmission line as shown, for example, in the manner of FIG. 14. For that purpose the actual value of the converter output d.c. current $i_{dA}$ is obtained at the SRA block and supplied to the HVDC transmission line simulating circuit. The filter circuits of both stations are simulated by these circuits FA and FB.

Thereby model values $\tilde{i}_{FA}$, $\tilde{U}_{dLA}$, and $\tilde{U}_{CN}=\tilde{U}_{dLB}$ for the electrical values $i_{fA}$, $U_{dLA}$, and $U_{dLB}$ of the HVDC transmission line are generated using the designations of FIGS. 1 and 13. Only the converter reactance coil LB has to be simulated as the integrator from the filter circuit of the, B, which supplies, based on $U_{dLB}$ and model value $\tilde{U}_{dB}$, the model current $i_{dB}$. To generate $U_{dB}$, first using the subtraction point 75 one can subtract the ohmic voltage drop $r_H \cdot i_{dA}$, which corresponds to the resistance $r_H$ of the HVDC transmission line, from the model value $\tilde{U}_{dLA}$. In addition, however, one has to consider that the external converter controls its HVDC transmission line voltage $U_{dB}$ by drawing current from the HVDC transmission line. Said current $i_{dB}$ is, however, determined by the current $i_{dA}$ impressed before the HVDC transmission line travel time.

Therefore the control differential $i_{dA}-\tilde{i}_{dB}$ can be eliminated by a reset controller 76 whose output signal corrects the $\tilde{U}_{dB}$ and eventually ensures that the model current $\tilde{i}_{dB}$ in normal operation corresponds to the actual current $i_{dB}$ of the foreign station.

A failure of the foreign converter can be as easily recognized by the differential $U_{dLA}-\tilde{U}_{dLA}$ or the control differential $i_{dA}-\tilde{i}_{dB}$ at the comparison circuit 721 of the monitoring device of FIG. 11. In said malfunction the d.c. voltage $U_{dB}$ namely is short-circuited and the HVDC transmission line discharges itself through the short circuit. Given an initially unchanged control angle $\alpha_A$ in the station in question, the current $i_{dA}$ therefore rises following a lag determined by the HVDC transmission line travel time. As the simulation in FIG. 14 has, however, not yet taken said short circuit into account, the differential $i_{dA}-\tilde{i}_{dB}$ reaches high values.

If in the model circuit of FIG. 14 following said malfunction warning, the voltage $\tilde{U}_{dB}$ is now short-circuited by selector switch 77, then the malfunction situation of the short-circuited external station, i.e. inverter failure, is also simulated. In this condition the model circuit is in a position to recognize from a renewed sudden change of $i_{dA}-\tilde{i}_{dB}$ when the external converter resumes its normal operation and the HVDC transmission line impresses a voltage $U_{dB}$ not equal to zero. The selector switch 77 is then repositioned and once again the resumed normal operation is simulated.

In a model circuit in FIG. 14 one has therefore the first form of a system observer which determines simulated values for the electrical quantities of the external station exclusively from the electrical quantities available in its own station. Remote signal lines are also not required in this arrangement, and the information regarding the operating status of the external station is available following the shortest possible delay, namely the travel time of the HVDC transmission line itself.

Naturally this principle, whereby the foreign station by simulating the HVDC transmission line and several circuitry components of the external station is monitored in the station in question, can be further improved and modified if required. The advantage in this connection is that with $\bar{i}_{dB}$ and $\bar{U}_{dB}$ model values are available for the electrical quantities of the other station, both for normal as well as malfunctioning operation.

Therefore, as already discussed, the model current $\bar{i}_{dB}$, in particular, can be used as the substitute actual value for the current controller 41A' in FIG. 13, which thereby permits control of the current flowing through the short-circuited external station in the event of a malfunction.

This principle of system monitoring also permits recognition of the end of the malfunction in a malfunction situation and, depending upon the type of malfunction, transition into normal operation with high power transmission within a few milliseconds, e.g., 10 ms approximately.

TRANSITION TO NORMAL OPERATION: THYRISTOR SELECTION AND SYSTEM-SYNCHRONOUS FIRING

In the normal operation described above the HVDC transmission line can also be used due to its capability of rapid control of power transmission to dampen balancing processes, to position the systems for reactive load, and for other tasks. For that reason it is advantageous for users of such systems that following failure of the HVDC transmission line normal operation resumes as soon as possible.

In this context various types of malfunctions must be differentiated.

If in the first station operating as the rectifier, the system NA, breaks down or a converter malfunctions, then a short circuit of the d.c. voltage $U_{dA}$ arises. If the HVDC transmission line has fully discharged during the first station's breakdown via a short circuit line or, for example, even via the converter of the second station, and if the second station is switched off to avoid an energy flow reversal, without, however, there being a malfunction either in the a.c. voltage system or in the converter in the second station e.g., functioning sttion, B, then following the end of the malfunction the task is to run up the currentless HVDC transmission line from the now recuperated station, A, when the system voltage $U_A$ returns.

The same task is also at hand if after initial installation or after maintenance work the HVDC transmission line is placed into operation.

The invention also deals with the case in which following a rectifier malfunction the HVDC transmission line has not been fully discharged. For example, the rectifier operation could have been interrupted only for a short period or the converter 1A could have been bridged by a bypass circuit without converter 1B being shut down. In this bypass operation the HVDC transmission line serves only as a reactive load for the system NB, and remains charged. The current flowing through the bypass line functions as reactive current for the functioning station.

Such bypass operation has the advantage that the HVDC transmission line does not have to be run up from a fully discharged level, but the current rather has to be raised only to the level designed for normal energy transmission, thereby reducing the startup time. In addition, even during the malfunction, the HVDC transmission line can be used to stabilize the system in the functioning station.

The bypass circuit can thereby be closed over its own bypass switch (switch 80A in FIG. 13) of the station, A; preferably, however, the bypass circuit is routed via thyristors lying in series of converter 1A, e.g., thyristors R+, R−, R+", R−" of FIG. 1. In both instances, though U=0, the bypass circuit results in $i_{dA}\neq 0$, $U_{dLA}\neq 0$, $U_{dB}\neq 0$.

In this case, thus, one must take into account that the functioning station, B, is current-conducting and that the increasing HVDC transmission current arising during resumption of normal operation must not lead to any inverter failure in that station.

In the station, B, a drop of the a.c. voltage $U_B$ results in a sudden rise of the current flowing into system, NB, with the current commutation exceeding the decisive maximum extinction angle, i.e. the (protective angle, for the inverter step limit. The inverter therefore fails and short-circuits the voltage $U_{dA}$. Here as well the design can foresee shutdown of the converter 1A of the functioning station based upon a malfunction warning so that the HVDC transmission line discharges via the short-circuited station, B.

Here as well, it is advantageous to continue operating the station, A, and recharge the HVDC transmission line with the station, B, being short-circuited by a bypass circuit. For this bypass circuit also a bypass switch (80B shown in FIG. 13) or specific thyristors preselected by programming and arranged in series in converter 1B can be used, or directly the thyristors of converter 1B which reflecting their phase position of the a.c. voltage system, NB, happen to conduct current during the malfunction and initiate the failure. Due to the already described advantages of bypass operation a bypass circuit in the station, B, itself could be desired, even if, depending upon the type of malfunction, no inverter failure arises necessarily or the operators permit a punctual shutdown of converter 1B.

Particularly in the event that the bypass circuit of the station, B, is routed over the thyristors which during the failure happen to be current-conducting, the thyristors with which the system-synchronized normal operation is to be resumed have to be dealt with depending upon the system beat on the one hand, i.e., on the phase length of the returning a.c. voltage $U_B$, and depending upon the thyristors already conducting current in bypass operation, on the other hand.

The required phase position for the system-synchronous startup of the a.c. voltage returning to the recuperated station can, however, initially only be incompletely detected by the reference voltage generator because this a.c. voltage usually has superimposed on it a combination of back-electromotive-force and harmonics which only decline gradually. The invention permits synchronization errors up to 30 degrees and permits resumption of normal operation in the recuperating station as early as a few milliseconds afterwards in such a fashion that the functioning station can recognize this operating condition rapidly and for its part respond by resuming normal operation as well.

For resumption of normal operation in accordance with this invention it is important that the recuperated station sends a signal over the HVDC transmission line when the malfunction is corrected that is unmistakably recognizable in the functioning station. Preferrably the recuperated station impresses a voltage pulse into the HVDC transmission line. Since, however, the impressing of a voltage pulse is particularly difficult after a malfunction in the inverter, it is desirable to initially describe the impressing of the voltage pulse in the station, B, based upon FIGS. 15 through 22, whereby the required mechanism in the station, A, will be seen to be merely a simplification of the mechanism already described for the station, B.

Figure 15:
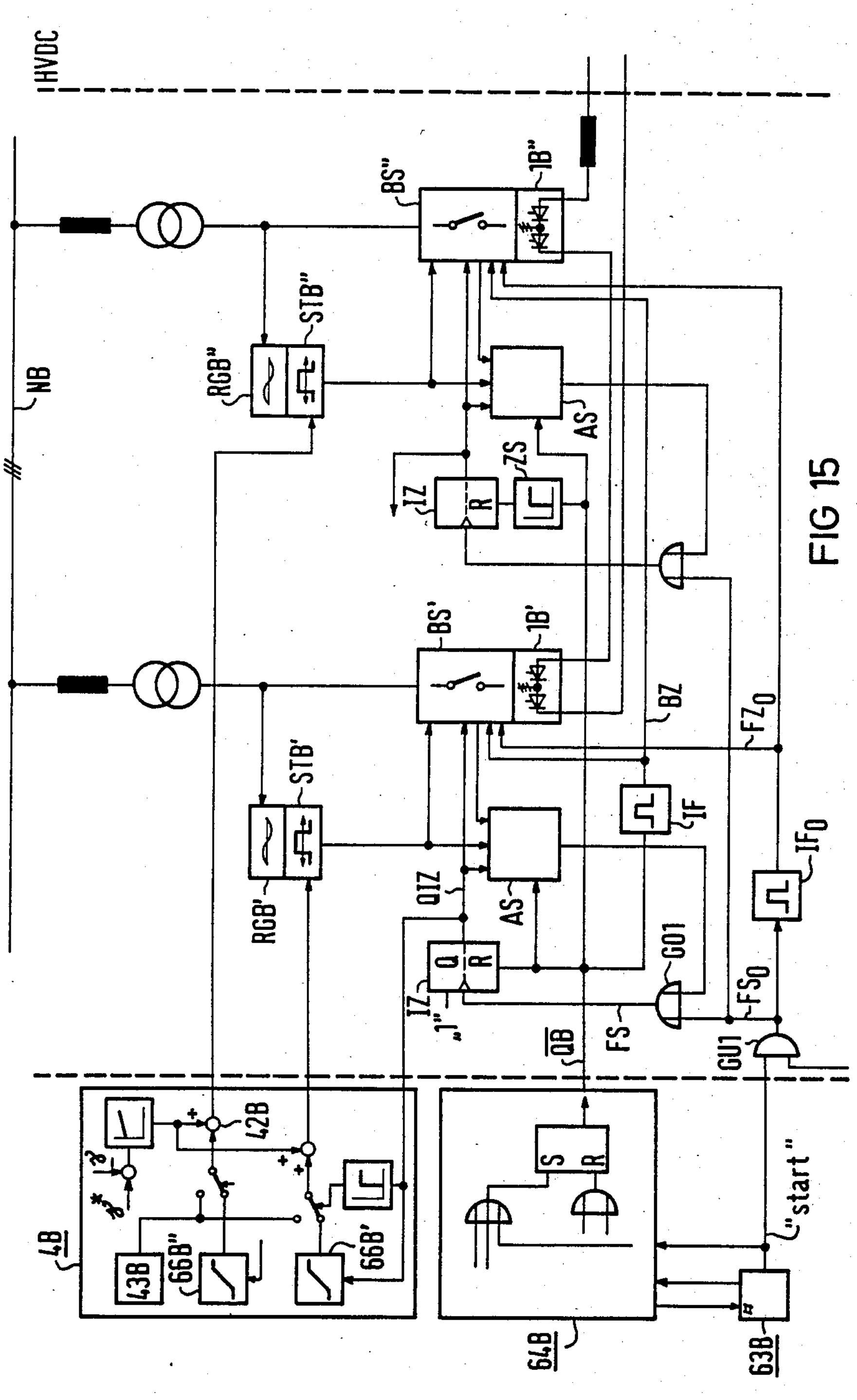
FIG. 15 shows the detailed design of a station using a station, B, as an example.

In the left-hand portion of FIG. 15 the already known configuration of regulation and control mechanism 4B, the monitoring mechanism 64B and the memory circuit 63B are shown. As this figure refers to a converter 1B comprising component current converters in accordance with FIG. 1, the design incorporates two run-up function generators 66B' and 66B'' in the run-up function generator 66B already familiar from the 4B unit in FIG. 8. These two run-up function generators can be started at different times by firing pulse release signals QIZ and can be connected to the automatic control device 42B following a time lag which can be set using a delay circuit ZS.

The monitoring device 64B is only symbolically depicted by the malfunction memory 700 and the gates 701 and 725, whereby gate 701 issues the release signal $F_{fB}$ to the malfunction memory even in the event of a start pulse start command such as one obtained from the memory circuit 63B being inputted.

To explain the circuit, we will start with the case in which the HVDC transmission line is started up with such a start command from the de-energized condition in which all thyristors will be clamped by the clamping circuits. In the left-hand portion of FIG. 16 said clamped status is depicted. For $T_0$ the control angles $\alpha'_{B'}=\alpha_B''=90°$ are preset corresponding to the zero output voltage of the converter. The drive unit STB' then supplies, for example, a system-synchronized firing command R+'α corresponding to $\alpha_B=90°$ which along with the start command is passed to an AND gate GU1 as shown in FIG. 15, generating only at time $T_{0'}$ an output signal $FS_0$. The firing command R+'α is selected from the firing command sequence S'α in accordance with the automatic programmed operation mode specified for this case because the system-synchronized firing cycle of converter 1A' is to begin with thyristors R+' and S−'.

The signal $FS_0$ is passed through an OR gate GO1 as a synchronous startup release signal FS on the dynamic input of a dynamic flipflop IZ. There it generates the firing pulse release signal QIZ=1, whereby the run-up function generator is triggered if there is no system malfunction, e.g., if QB=0.

Figure 16:
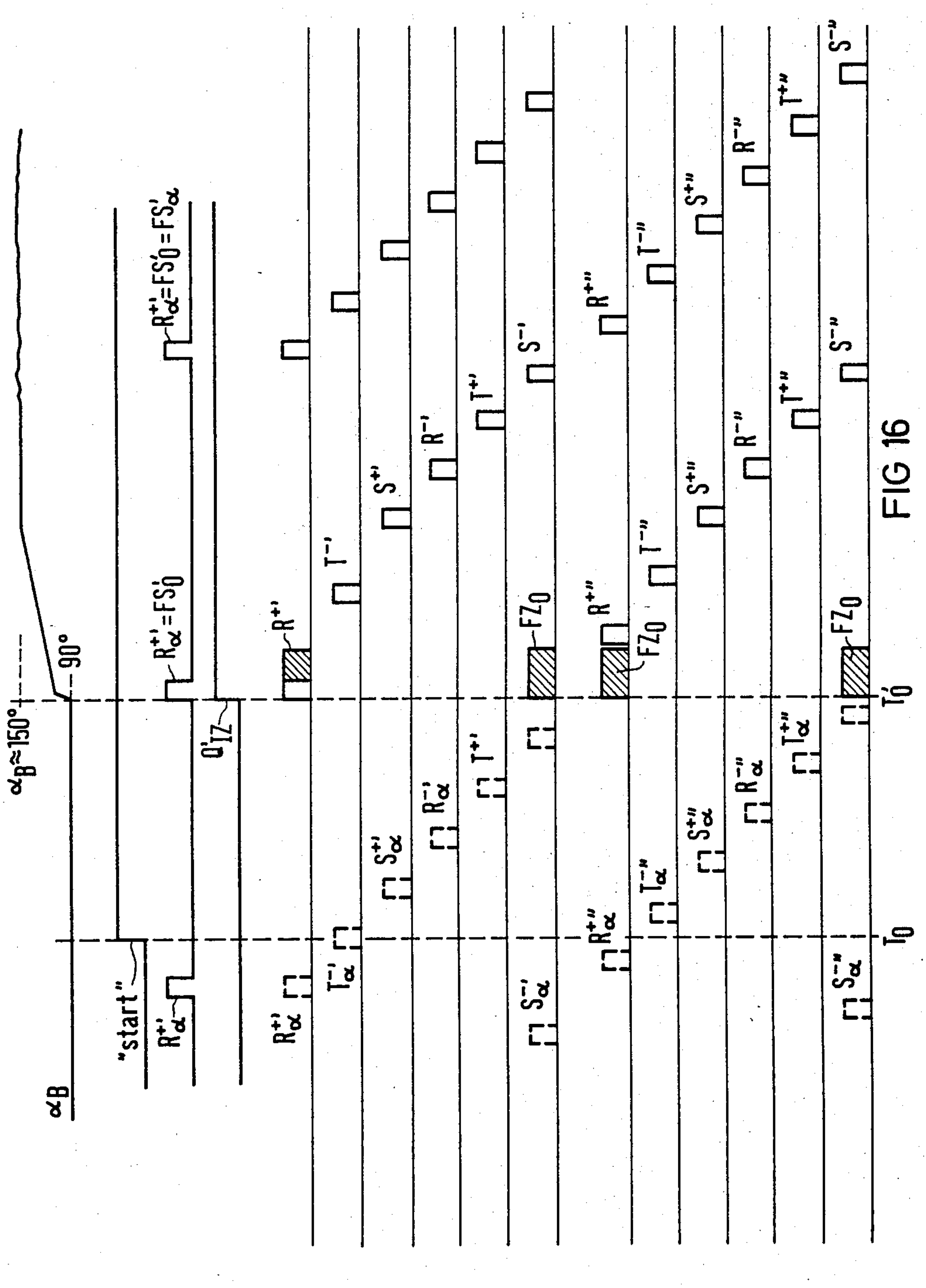
FIG. 16 are signal patterns for operation of a station, B, in accordance with FIG. 1 when resuming the system-synchronous operation after a shutdown of the HVDC transmission line.

FIG. 16 also shows the firing commands R+α' through S−α' generated by the drive unit STB' for the component current converter 1B' as well as the commands R+α'' through S−α'' generated by STB'' for the component current converter 1B'', whereby to simplify the process it is assumed that $\alpha_B'=\alpha_B''$. These firing commands generated by the drive units are, however, inhibited before time $T_0$, and thus shown only by broken lines.

Figure 17:
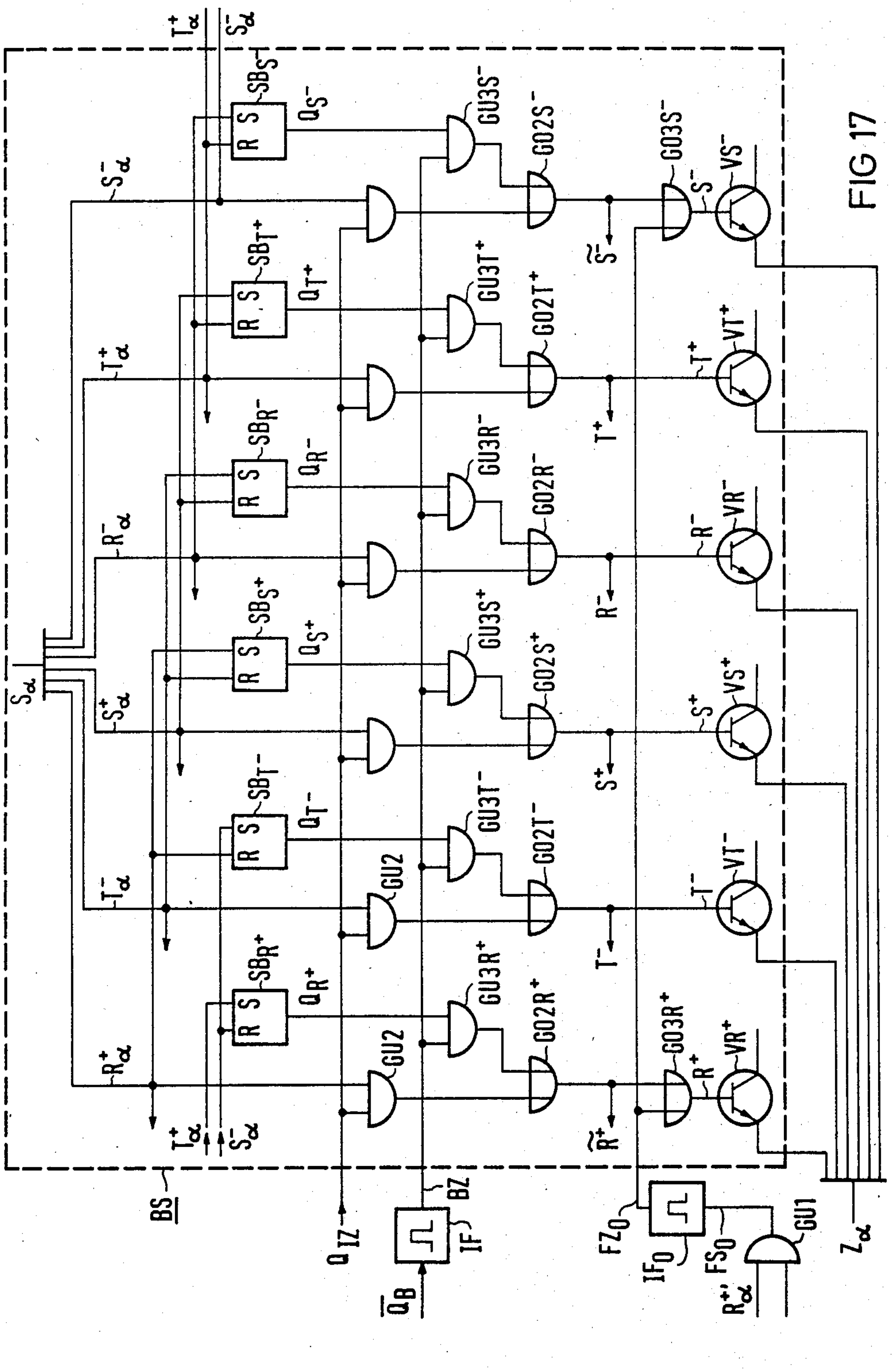
FIG. 17 shows the circuitry of a clamping circuit for the arrangement as shown in FIG. 1.

This inhibiting takes place in the clamping circuits BS', BS'' triggered by QIZ through AND gate GU2 as indicated in FIG. 17. By the coincidence of the start signal and the firing command $R+_{\alpha}'$ at AND gate GU1 finally QIZ=1 is set and the inhibiting of the firing commands removed so that now the firing commands can be passed through the corresponding amplifiers VR+ through VS−, thereby firing the thyristors R+ and S− in the respective component current converters.

These thyristor firings proceed reliably since the signal $FS_0$ at the same time generates an impulse $FZ_0$ via a pulse generator $IF_0$ which via OR gates GO3R+ and GO3S− regulates the amplifiers VR+ and VS−. This means that the firing pulse R+' in contrast to the firing command R+α' issued by the drive unit is extended by the crosshatched surface marked in FIG. 16, while the crosshatched surfaces for the firing pulses S−α', R+α'' and S−α'' show the pulses $FZ_0$ coupled over GO3R+ and GO3S−.

If a control angle $\alpha \leqq 90$ is preset for each relevant component current converter, then thyristors R+ and S− fire and pull the voltage to the HVDC transmission line poles 2 and 3 (station, A: $U_A \geqq 0$, station, B: $U_{dB} \leqq 9$ in accordance with the preset symbols) which thereupon by a change in the control angle can be run up to the operating value designed for normal operation, which in the example of FIG. 16 represents increasing the control angle to $\alpha_B=150°$ in the station, B.

This even applies if the preset control angle α in contrast to the reference voltage of the reference voltage generator due to an angle error $\delta_A < 30°$ of the reference voltage generator in contrast to the actual phase position of the system corresponds to an acutal firing angle of a maximum of 120 degrees. Only at this limit angle does the coupled system phase voltage $U_{RS}$ which is to be coupled by R+,S− become negative and the coupled firing pulses R+,S− have no impact.

This does not change even if at time $T'_0$ the thyristor combination R+,R− and/or S+,S− are already current-conducting, as is foreseen, for example, for a bypass operation during a system malfunction. Since even then $R^+$ and $S^-$ will lead to the fact that the current commutates on the thyristor combination $R^+$, $S^-$.

If the bypass thyristor combination also includes the thyristors T+,T−, then the firing pulse leads to a current flowing via R+,T−, and the coupled pulse S− remains similarly ineffective as does the next T− pulse which normally follows in the firing cycle on the R+ pulse at time $T_0$, in the firing pulse release signal QIZ=1. Only the subsequent firing pulse in the firing cycle, i.e., S+ will then bring about the normal current conductance over S+,T−. The voltage, which until then was connected to the HVDC transmission line by the commencement of the system-synchronous normal operation, thus presents a voltage pulse which corresponds to a temporary rectifier operation with $U_{dA} >> 0$ or else $U_{dB} << 0$.

The circuit portion described thus far can therefore not only be used for startup of the de-energized HVDC transmission line using the start command, but also for the commencement of system-synchronized converter operation in other operating conditions. If, for example, following an internal malfunction the dynamic flipflop IZ is set to the output signal QIZ=0 over the reset input due to a corresponding output signal $\overline{QB}=1$ of the malfunction memory 700, then the converter is inhibited. If given a longer malfunction the HVDC transmission line voltage has dissipated, then a release signal $F_{fe}$ can now call up the signal status $\overline{QB}=0$ so that the dynamic flipflop IZ' can state up again with a startup command and a consequently derived pulse $FS_0=1$.

With an internal malfunction it can, however, also be designed so that a bypass circuit closes when the current $i_{dB}$ in the station, B, dissipates, in which, for example, the thyristors T+ and T− are fired.

This thyristor firing takes place if the signal $\overline{QB}$ set by the internal malfunction is coupled to memories SBT− and SBT+ which in this bypass thyristor combination are set to 1, using a bypass supplemental pulse BZ generated by a pulse shaper IF using the AND gates GU3T− and GU3T+ through a firing pulse VT− and VT+. If now the bypass operation is ended by a start command, then when the firing command $R+\alpha'$ appears, the gate GU1 again issues a signal $FS_0$ which clears the firing command inhibit by the flipflop IZ in the clamping circuit BS of FIG. 17 and moreover circuits the corresponding firing pulses to VR+ and VS− using the pulse generator $IF_0$.

Figure 18:
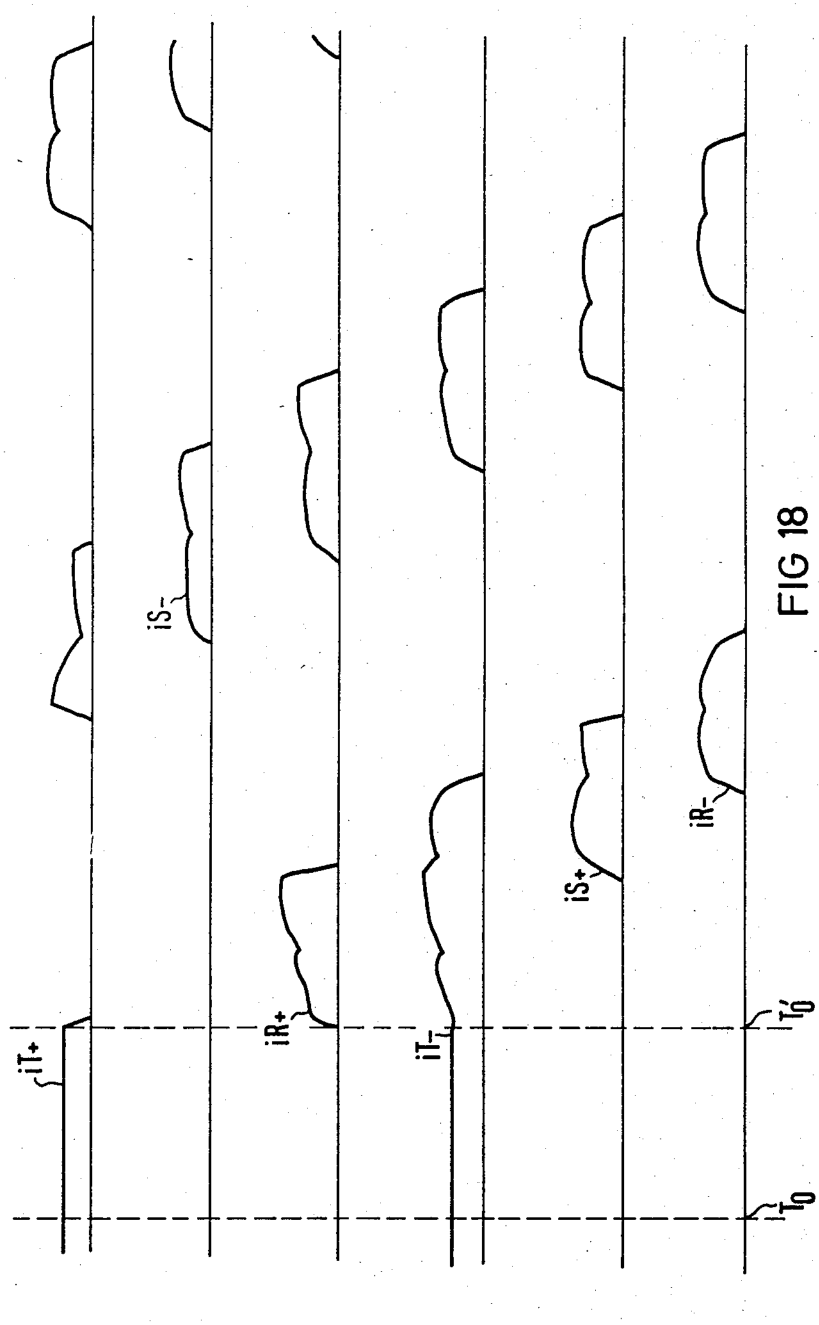
FIGS. 18 and 19. show the patterns of currents and voltages as well as current transit times for the converter thyristors when operating according to FIG. 16.
Figure 19:
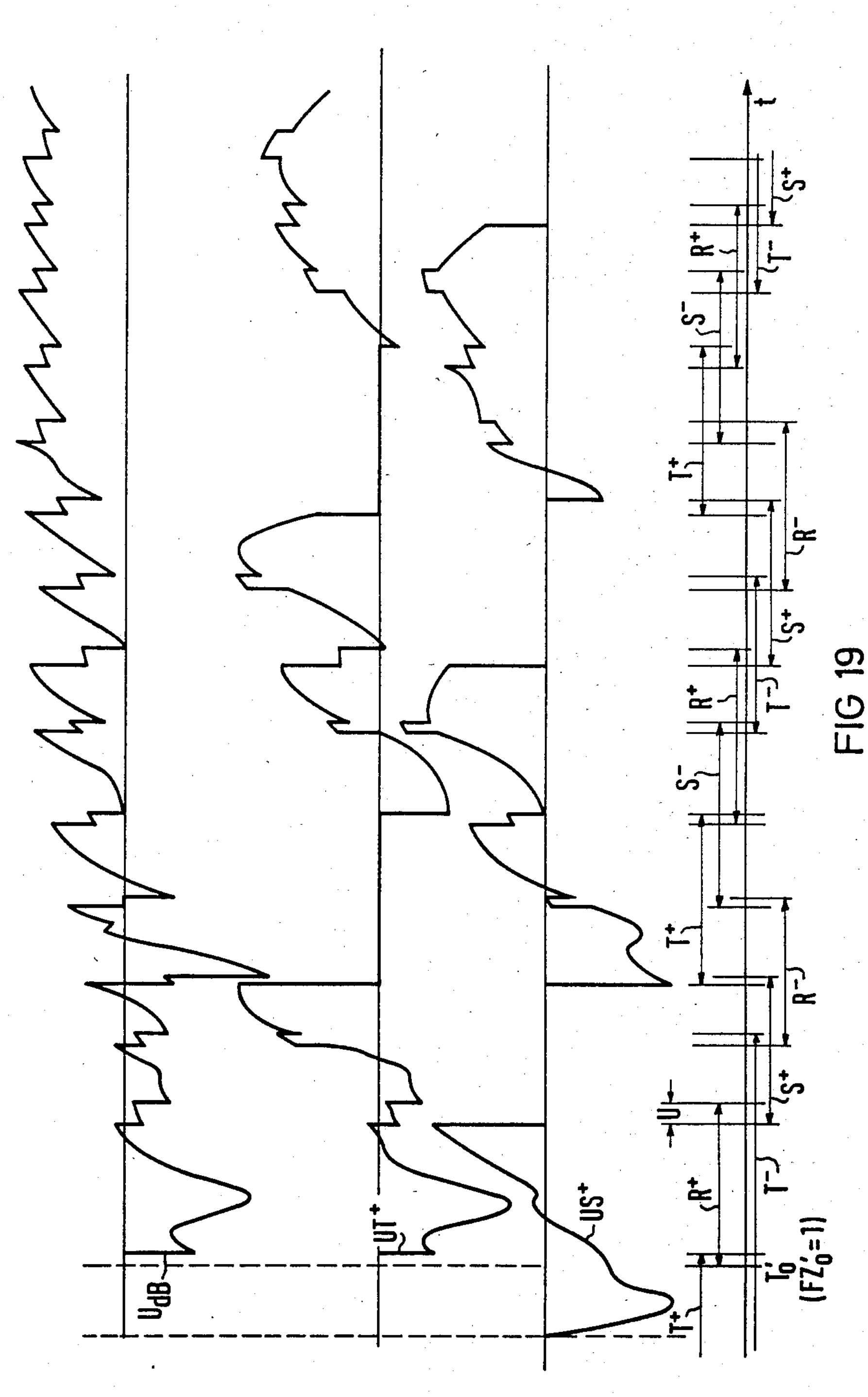

FIG. 18 shows the pattern of the thyristor currents iR+ through iT−, whereby initially during bypass operation iT+ and iT− flow until due to the described normal firing pulse sequence R+,T−,S+,R−—initiated by $FZ_0$, the above-described current commutations discharge. Using as an example a non-symmetrical system with strong harmonic signals when the system resumes operation, whose pattern is shown in detail in FIG. 22. FIG. 19 displays the resulting thyristor voltages UT+ and US+ for thyristors T+,S+ and the resulting HVDC transmission line voltages and current conductance periods which are indicated by arrows. The impressed voltage pulse is shown crosshatched and the reference polarity change is negative corresponding to the transient rectifier operation of the station, B.

Should the transient voltage pulse be more pronounced, it can easily be corrected by the control angle being shifted to rectifier operation in the respective station, with this shift being prior to the running up of the control angle of FIG. 16 or being superimposed on the start of the running up.

The same applies to the regulation of the second component current converter 1B″, whereby simply the use of a lag circuit ZS which through $\overline{QB}$ regulates the corresponding dynamic flipflop IZ at a certain time lag, assures that the startup of the second component current converter takes place following a certain time lag. The design of the other components marked by a double line is identical with the device described for the component current converter 1B′ so that in the following discussion both component current converters will be dealt with and explained largely as one single converter.

With this variant it is assumed for transition from bypass operation to normal operation that the HVDC transmission current $i_d$ had dissipated before closing the bypass circuit and that the bypass circuit was closed by a preprogrammed selection of thyristors connected in series. The memories SBT+ and SBT− can thereby be included in the memory circuit.

In the case of inverter failures, the series thyristors are also current-conducting; however, the thyristors which form the short circuit route depends on the instantaneous phase position of the system during the failure. In order to rapidly transfer to bypass operation, these thyristors can be retained as long as their combination is established and then in accordance with this combination those thyristors are selected among the converter thyristors that are suitable for restart of normal operation.

Memories SBR+ through SBR− depicted in FIG. 17 serve for that purpose. They are also regulated by the firing commands $S\alpha$ and determine at each phase position of the system, thus at each moment within the cycle of the control command S, over which converter thyristors at that point an inverter failure could occur. This would at least be the respective thyristor group which due to the exceeding of the maximum extinction angle, in contrast to the normal commutation sequence, still carries current and the thyristor groups connected in series thereto.

Figure 20:
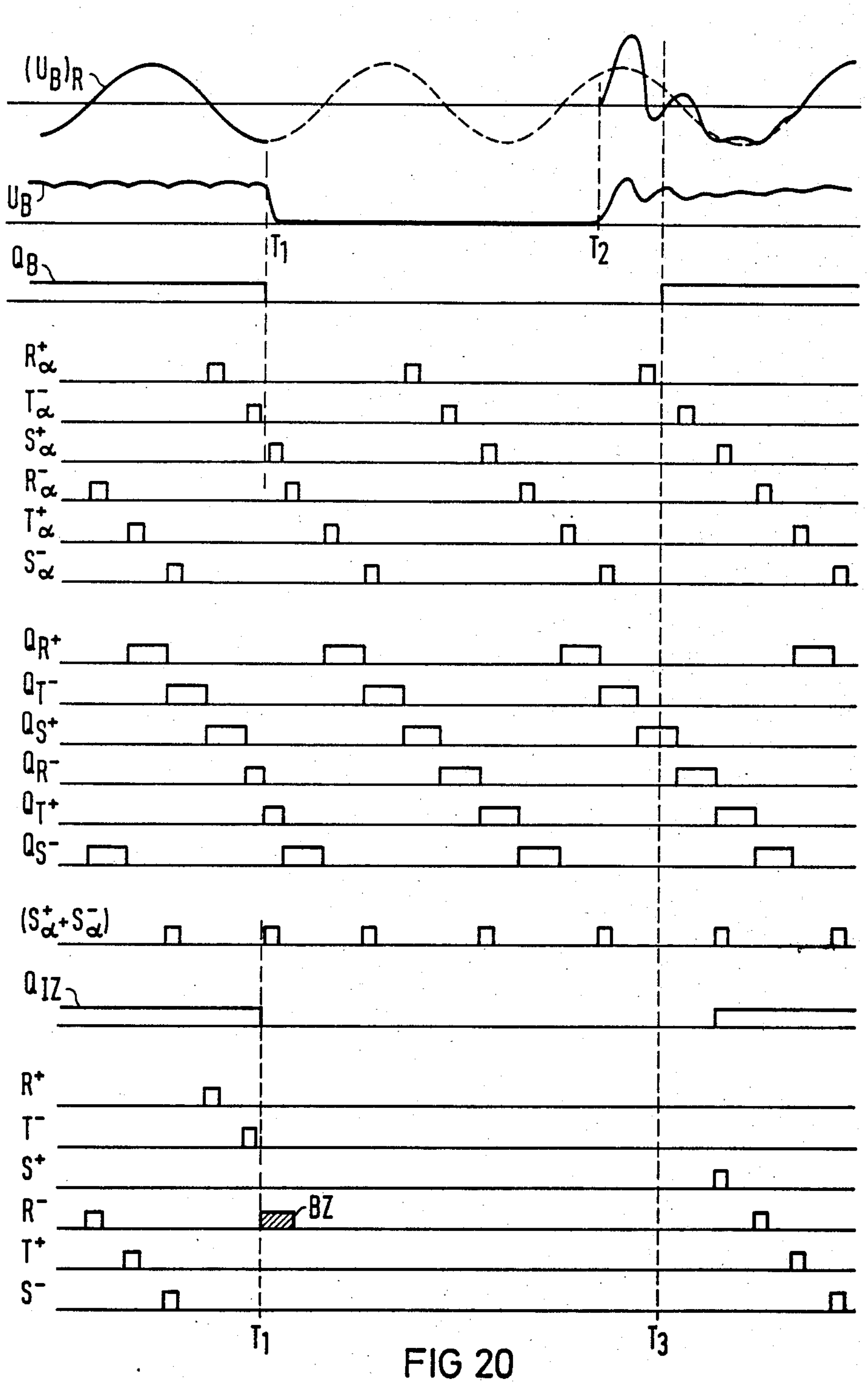
FIG. 20 shows signal patterns for operating a station, B, in accordance with FIG. 1 in case of a temporary malfunction, i.e., transition from normal operation and into normal operation.

FIG. 20 assumes that the internal malfunction warning pulse triggered by the failure occurs before the drive unit issues the next firing command S+ (time $T_1$,) so that lastly thyristor T− was regulated with thyristor R+ conducting. Therefore a memory SBR− which can be reset by $S+\alpha$ is set to the value 1 using the command $T-\alpha$ and indicates that thyristor R+ is involved in the inverter short circuit. While by QIZ=0 at GU2 the regular command S+, generated by the drive unit is inhibited, at GU3R− the bypass supplemental pulse, shown marked by crosshatching in FIG. 20, is given to thyristor R− via memory SBR− and the command BZ. This thyristor R−, along with thyristor R+, which is not deactivated, now brings about a safe closing of bypass route R+, R−.

If the failure arises after another firing command, then memories SBR+—and gates GU3R+—bring about the relevant selection, storage and regulation of the possible bypass thyristor combination. The design can, however, also foresee, particularly in the station, A, not to make the bypass thyristor selection so dependent upon the operation, but routed always to establish a preprogrammed combination, as required several or all converter thyristor groups in series, in the memory circuit and to couple them in the event of a short circuit by regulating gates GU3 or GO2.

To generate the desired voltage pulse when proceeding according to FIG. 16, it is, however, necessary to select the required initial cycle in accordance with the preset and operation-dependent bypass thyristor combination to commence the system-synchronous operation. For bypass thyristors R+,R− the system-synchronous firing should now start by a commutation of thyristor S+ or S− which is the function of the selector circuit, AS, of FIG. 15.

Figure 21:
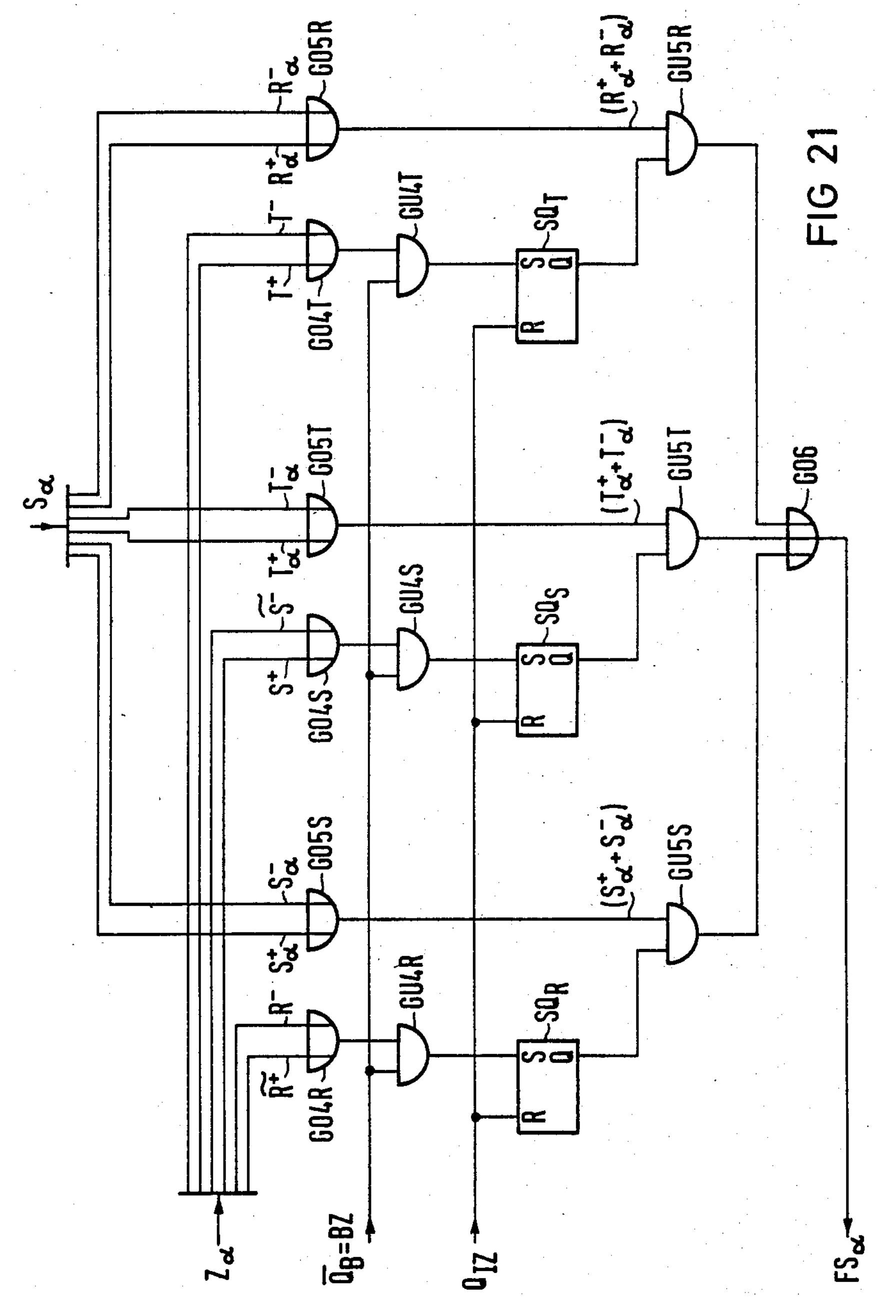
FIG. 21 shows the circuitry of a selector switch in the design according to FIG. 15.

Therefore, in accordance with FIG. 21, a pulse, e.g., pulse S+,S−, is always generated in the sequence SZ from the firing pulses obtained following the interlock GO2 and issued regardless of whether the system is in normal or bypass operation which is allocated (OR gate GO4R, GO4S, GO4T) to two series thyristor with one potential thyristor forming a bypass pair. This potential bypass combination is clamped by the AND gate GU4R . . . GU4T until in the event of a malfunction using the bypass supplemental pulse BZ the bypass thyristor firing actually occurs and the bypass combination is stored in the memories $SQ_R \ldots SQ_T$ which can always be reset at the end of a malfunction by the firing pulse release signal QIZ.

While thus the memories $SB_R+ \ldots SB_T-$ of the clamping circuits always determine the possible bypass thyristors from the firing command sequence of the drive unit and in case of malfunctions bring about their firing, the gates GO4 select from the actual firing pulses issued the possible bypass thyristors which are only stored in case of a malfunction.

Further OR gates GO5S, GO5R, GO5T unite the firing commands, e.g., for bypass combination R+,R−, thus the firing command combination S+,S− contained in the firing sequence $S\alpha$ and required always to decommutate the current from one of the selected bypass thyristors. These firing commands then, by coincidence with the stored combination determined by gates GU5S, GU5R, GU5T, lead to a synchronized signal FSα.

The OR gate GO1 then issues as the startup release signal the synchronized signal FS instead of the previously discussed start signal "start" which in flipflop IZ generates the firing pulse release signal QIZ if IZ is released after the end of the system malfunction ($\overline{Q}B=0$).

Thereby the desired startup of the system-synchronous normal operation starts by itself after the termination of the system malfunction.

To summarize, FIG. 20 thus shows the following: In normal operation signals QR+ through QS− always indicate a thyristor which in case of a commutation malfunction could be used during the next firing as the bypass thyristor and should be fired by the bypass supplemental pulse $FZ_0$ in order to close the bypass. The system malfunction induces a drop in the system voltage $U_B$ at time $T_1$ below a preset limit value which via QIZ=0 leads to the inhibiting of the normal firing command Sα or Zα and to the coupling of the crosshatched bypass supplemental pulse to R−. During the malfunction, therefore, only the thyristor combination R+,R− is current-conducting and this thyristor combination is stored in the selector circuit. After the system voltage resumes, at time $T_2$, and the release signal occurs, also at time $T_2$, setting the malfunction memory to $Q_B=1$, memories SQR, SQS, SQT of the selector circuit choose a thyristor to resume normal operation and the selector circuit then generates the startup release signal if the system-synchronous converter operated by the control angle issues the firing command corresponding to this selected thyristor. The normal firing cycle is then released by the startup release signal FS commencing with the firing of this thyristor and leading to the decommutation of the current from one of the bypass thyristors.

The a.c. voltage system starts, as FIG. 20 for the phase voltage $(UB)_R$ and as the voltage amplitude UB indicates, very irregularly. The malfunction memory supplies a signal QB=1 only after a certain time required by the reference voltage generator to determine a relatively reliable phase position of the system. A rapidly working reference voltage generator is described in the German patent application No. P 33 46 291.7 and assures that thereby the phased position of the system is determined down to less than a 30 degree precision level. A lag circuit contained in the pulse generator 713 in FIG. 11 can assure that the self-release pulse Ffe in the station, B, and thus the release signal and QB=1 are only generated after the minimal time required for synchronization.

Figure 22:
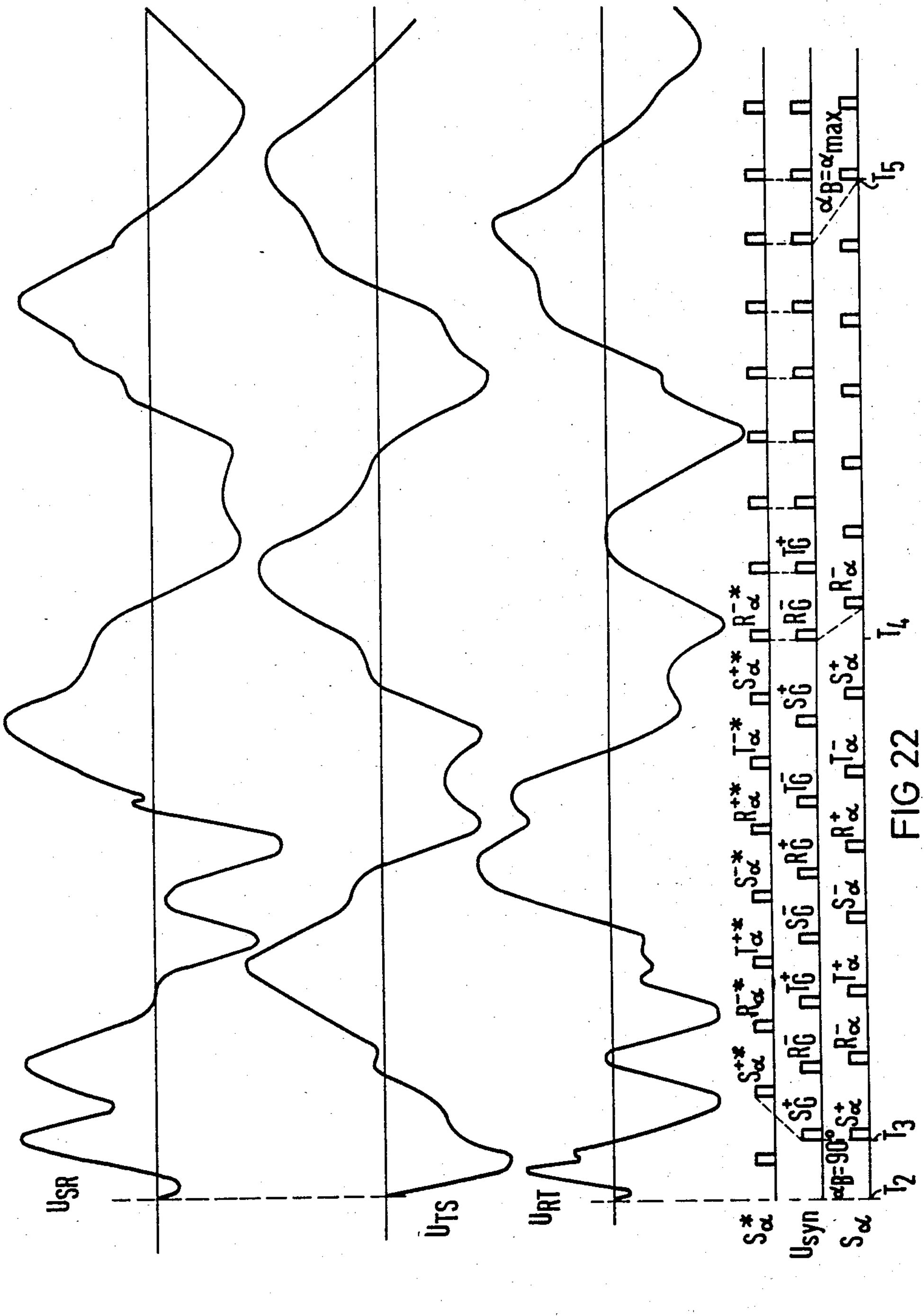
FIG. 22 shows the pattern of a returning a.c. voltage following a system malfunction and the system-synchronous firing pulses of the station as shown in FIG. 15.

FIG. 22 depicts the overlaying of the sine-shaped fundamental frequency by counter voltage and harmonic oscillations as occurs typically for returning connected phase voltages USR, UTS, URT of the a.c. voltage system. S* shows a hypothetical set of firing pulses associated with the zero degree of modulation, i.e; control $\alpha_B=90$, and the fundamental frequency of the recovering system.

This set S*α is hypothetical, i.e., cannot be realized since the fundamental frequency at time $T_2$ cannot yet be detected. Rather the reference voltage generator generates a reference voltage $U_{Bsyn}$ associated with the similarly hypothetical firing pulse sequence S+G,R−G, etc. at the hypothetical control angle $\alpha_B=90°$. This pulse sequence is also only hypothetical because in order to implement the procedure according to this invention, no constant control angle $\alpha_B=90°$ is preset. However, a comparison of both hypothetical pulses S+* and S+G shows that at time $T_3$ a reference voltage $U_{Bsyn}$ can deviate from the undetectable fundamental frequency by a phase difference which can reach up to 30 degrees. Only at time $T_4$ (typically $T_4-T_3=8$ msec) has the reference voltage generator built up to a point that the reference voltage $U_{Bsyn}$ is practically synchronous with the fundamental frequency of the system, which still has superimposed on it harmonic oscillations, and the equation $R-\alpha^*=R-G$ applies.

In order to resume normal operation as soon as possible after the system resumes, the design does not have a provision to wait till time $T_4$ for the release of the firing pulse. Rather, it suffices if the synchronization error of the reference voltage is less than 30 degrees, i.e., the firing pulses are released already as early as time $T_3$.

FIG. 22 assumes that for the resumption of normal operation with the control angle ($\alpha_B=90°$) (i.e., control angle at initial setting of 0 corresponding to a d.c. voltage set value $U_{dB}^*=0$ the system can begin and run up to a maximum value $\alpha_B=\alpha_{max}$ within approximately two system cycles which corresponds to the nominal value projected for normal operation. Consequently thyristor S+ is fired at time $T_3$ by the firing pulse S+α=S+G, while at approximately time $T_4$ the actual firing command R−α, in contrast to the hypothetical command appertaining to R−G, $\alpha_B=90°$ is displaced by $(\alpha_{max}-90°)/2$. At time $T_5$, $\alpha_{max}\doteq 150°$ is attained.

TRANSITION TO NORMAL OPERATION; PRESETTING THE CONTROL ANGLE

In accordance with the previous explanations it is thus possible that after a malfunction has ended, one station issues a pulse to the HVDC transmission line, particularly a voltage pulse, which can be detected by the other side and initiates an internal release pulse whereby normal operation is resumed in that station as well. The arrangement shown in FIG. 15 as hardware, can also be partially realized in software, and incorporated with the memory circuit 63B. The memory circuit 63B basically only has to determine which mode of emergency operation, e.g., bypass operation or shutdown of the line, are to be selected for the particular malfunction in question. The methods described below for the various types of emergency operating modes for resuming normal operation will provide those skilled in the art with adequate information as to how the individual signals of the monitoring device are to be combined in the memory circuit for each individual case in order to execute the relevant startup program in conjunction with the design of the stations shown in FIGS. 8, 9, 10 and 13.

In the following discussion, that particular station whose malfunction has caused an interruption of normal operation will always be designated as "the former station." In case of a rectifier malfunction this would be the station, A, and in case of an inverter malfunction it would be the station, B. In this context, depending upon the energy flow direction chosen for normal operation, the design can foresee that the station arranged at one end of the HVDC transmission line once plays the role of the station, A, and another time the role of the station, B, since the task and design of the monitoring device and the memory circuit both for rectifier as well as for inverter operation are largely the same so that both stations are designed to be as identical as possible.

After overcoming the malfunction in the former station, the corresponding monitoring station, designated as "the former station monitoring unit;" generates an internal release pulse which in this former station produces the release signal, described as the "leading release signal", whereby the startup is initiated.

This startup is then obtained after the HVDC transmission line travel time at the d.c. voltage side connections of the latter, undisturbed, station or of the latter converter, thereby initiating in the other monitoring device an external release pulse which produces the derivative release signal.

The basic concept for startup is then that when a non-problematic or recuperated status of the previously malfunctioning former station is established, a leading release signal is generated, initiating the resumption of system-synchronous normal operation in the former station converter. In the latter station, on the other hand, the effects of this change at the d.c. voltage side connections are converted into a derivative release signal which in that station similarly initiates the system-synchronous normal operation which thus begins after the shortest possible delay upon recuperation of the former station. Remote signal lines are not required.

This assumes on the one hand that the electrical processes brought about in the former station are clearly recognized in the latter station and, on the other hand, that the processes in both stations must be coordinated with each other.

Both prerequisites are met by having the HVDC transmission line in the former station be impressed initially by a voltage surge with the control angle of the former station converter being run up in accordance with a preprogrammed run-up function approximately to the value projected for normal operation whereby, as shown in FIG. 22, the voltage surge is either necessarily generated by the run-up of the control angle or, if required by the situation, can be generated by a separate and temporary pulsating shift of the control angle. The control angle is then similarly run up in the latter station starting from an initial value of approximately zero corresponding to an angle of approximately 90 degrees in accordance with a preprogrammed run-up function to the value projected for normal operation.

Both run-up functions are coordinated with each other. Preferrably their run-up time would be approximately two a.c. voltage cycles.

During the malfunction the malfunctioning converter of the former station is either totally shut down or short-circuited using the bypass route. Thereby during emergency operation the model fault indication voltage in the automatic control device in the control channel of the former station drive unit does not have to be switched on. On the other hand, the relevant control angle at the end of the run-up cycle has to attain the control angle projected value projected for steady state operation at the end of the run-up cycle or at least attain this steady state value, if possible without substantial jumps. If therefore a smooth run-up is generated by a run-up generator at the input for the preset angle, then this preset angle which generally is generated by a superimposed control quantity controller, e.g., the current controller 41A or the extinction angle controller 41B, would have to be retracted to the extent that now the automatic control model fault indication quantity determines the control angle.

The preferred arrangement is therefore that the run-up generator 66A generating the run-up function be located, at least in the station, A, as shown in FIG. 10, at the entry to the automatic control voltage of the automatic control device in order to connect using the selector switch 61A the model fault indication quantity of the output signal of the run-up generator as a substitute value during emergency operation and the run-up cycle. Only after attaining the run-up function final value does the system switch over to the measured value $\bar{U}_{dLA}$, or the corresponding model value $U_{dB}$, by switching the selector switch 61A. Once steady state normal operation has been resumed, then also the preset angle will be obtained from the current controller 41A as designed for normal operation, but which can be deactivated during the malfunction.

In the station, B, the model fault indication quantity serves to set the extinction angle and to maintain the inverter step limit. If during emergency operation the system dispenses with the automatic control with the corresponding automatic control angle $\alpha_{Bv}$, no danger arises regarding any possible inverter failure, since even in case of bypass operation the control angle is still far from the inverter step limit. This also applies, if after a rectifier malfunction, the station, A, starts to increase the current. If therefore the station, B, resumes inverter operation after a derivative release signal, then the preset run-up function in that station generates a controlled model substitute value for the model fault indication quantity which can also replace the model fault indication quantity obtained from the actual inductive d.c. voltage drop and lead to a limitation of the extinction angle. Therefore here as well the run-up generator can be arranged at the automatic control angle input of the automatic control device and be switched by the selector switch between the requlated preset model value supplied by the generator and the model fault indication quantity whose value is computed from the inductive d.c. voltage drop if or when the run-up value has approximately been obtained.

The two run-up functions thus provide substitute values for the relevant automatic control quantities. It thus seems initially necessary that both run-up functions coincide, i.e. are identical in terms of their curve and plateau level. Such rigid coordination of both run-up functions is, however, not required. For example, the run-up end value of the run-up generator of the station, A, can generally be somewhat higher and lead to a HVDC transmission current which could, with regard to the preset control angle in the run-up function of the station, B, lead to an extinction angle beyond the inverter step limit. The extinction angle control of the station, B, is, however, in a position to retract the control angle $\alpha_B$ in accordance with the inverter step limit.

For the various types of emergency operation the following possible variants resulted:

(a) Startup from a deactivated line:

In this case, after the malfunction arises, both converters are inhibited whereby the discharge of the line, e.g., during a short circuit of the voltage $U_{dB}$, could be handled by the short circuit in the station itself or also, for example, given a rectifier malfunction in the station A, by a forced temporary firing angle shift in the other functioning station.

When the malfunctioning system goes back on line, the corresponding internal release pulse in the former monitoring station initiates the leading release signal. The resuming normal operation in the former station initiates the derived release signal in the latter station, which there, too, initiates the startup in accordance with the preprogrammed run-up function. Both run-up functions starts at an initial value of approximately zero, i.e., control angle approximately 90 degrees.

As a supplement, the design can foresee that the control angle of the former station is determined from the run-up function and a temporary additional shift in the direction of the rectifier wide-open control, wherein this additional shift can either be set before or superimposed upon the run-up function.

Given a malfunction of the inverter operation in the station, B, this means that the already described negative voltage pulse, which is impressed when resuming normal operation, is reinforced. This simplifies both the generation of the derived release pulse as well as the start of rectifier operation in the station, A. Even after a malfunction of rectifier operation in the station, A, such a pulse is advantageous since it means that current $i_{dA}$ and voltage $U_{dA}$ rise rapidly and charge up the HVDC transmission line so that both the run-up of the power transmission to the value projected for steady state normal operation can take place more rapidly and the derived release signal of the station, B, can be generated more easily.

(b) Emergency operation with bypass circuit:

In case of longer malfunctions the operation can proceed using the bypass circuit, whereby in the malfunctioning former station, when the internal malfunction warning pulse arises, the system-synchronous firing commands of the converter in the former station are inhibited and the bypass circuit closed. As already explained, this bypass circuit can best be closed by the firing of selected converter thyristors in series. In the latter station using the external malfunction warning pulse, the control angle is shifted to such an extent to rectifier operation as required to feed bypass current into the HVDC transmission line to meet the requirements of the latter system.

The transition from this bypass operation to normal operation takes place when the system of this former station has recuperated and generates the leading release signal which initiates resumption of system-synchronous converter operation with the control angle running up to the proper operating degree of control. Simultaneously the bypass circuit is extinguished which generally no longer requires any special measures to be taken if no specific bypass switch or bypass thyristor, but rather a series of converter thyristors required for normal operation, were being utilized.

In the latter station the derived release signal then initiates resumption of normal operation whereby the control angle runs up to the control angle steady state value in accordance with the run-up function from the control angle determined by the bypass current.

If the bypass operation resulted from a malfunction of the the station, A, then it is not necessary to undertake an internal pulse shaping displacement of the control angle at the start of the run-up cycle, and the system-synchronous firing at the start of the run-up cycle, i.e., the introduction of normal rectifier operation, poses no problems. Rather, in accordance with FIG. 16, the rectifier operation can begin with the synchronous operation of specific preprogrammed thyristors. Even the selection of the bypass thyristors is preferrably programmed whereby the bypass current can be routed not just over one bypass circuit formed by thyristors in series, but rather over several or even all the converter thyristors. This is possible and under given circumstances advantageous if, for example, suitable measures are taken in the station, A, to ensure that after a malfunction the returning system, NA, will not immediately discharge again via the bypass circuit.

During bypass operation wherein the bypass circuit is closed by thyristors in series of the converter of the station, B, the selection of the bypass thyristors for the duration of the malfunction is stored. In accordance with this stored thyristor combination one of the thyristors is selected by the selector circuit as described in FIG. 15 for resumption of the system-synchronous normal operation. In the cycle of the system-synchronous firing commands this thyristor then corresponds to the decommutation of the current from one of the bypass thyristors.

FLUCTUATION BETWEEN NORMAL OPERATION AND EMERGENCY OPERATION

The normal operation described permits, in accordance with the automatic control principle, rapid control of the HVDC transmission line without, however, being able to exclude a malfunction altogether. The principle of programmed run-up without the use of initiating remote control signals permits transition into normal operation both given a deactivated HVDC transmission line as well as in case of bypass operation within very short startup times. The bypass operation principle described below thus permits, given a malfunction of one of the two stations, the operation of the HVDC transmission line even during the malfunction as the reactive load for the a.c. voltage system of the normally functioning station and to be regulated or controlled in accordance with the requirements of the normally operating system.

Each of the three principles: automatic control, programmed run-up, and bypass operation can, in conjunction with other operating procedures of a HVDC transmission line, be advantageously used separately or in conjunction with another one of these principles. The combination of all three principles described below permits rapid control of the HVDC transmission line, both in normal as well as in emergency operation, in order thereby, for example, to dampen sub-synchronous resonance occurances or other dynamic balancing processes in the systems, to minimize the economic effects of a malfunction, particularly of a voltage drop in one of the a.c. voltage systems and always to be able to complete the transition between normal operation, bypass operation and occasional, unavoidable operation with deactivation of the HVDC transmission line, within the shortest possible time.

Figure 24:
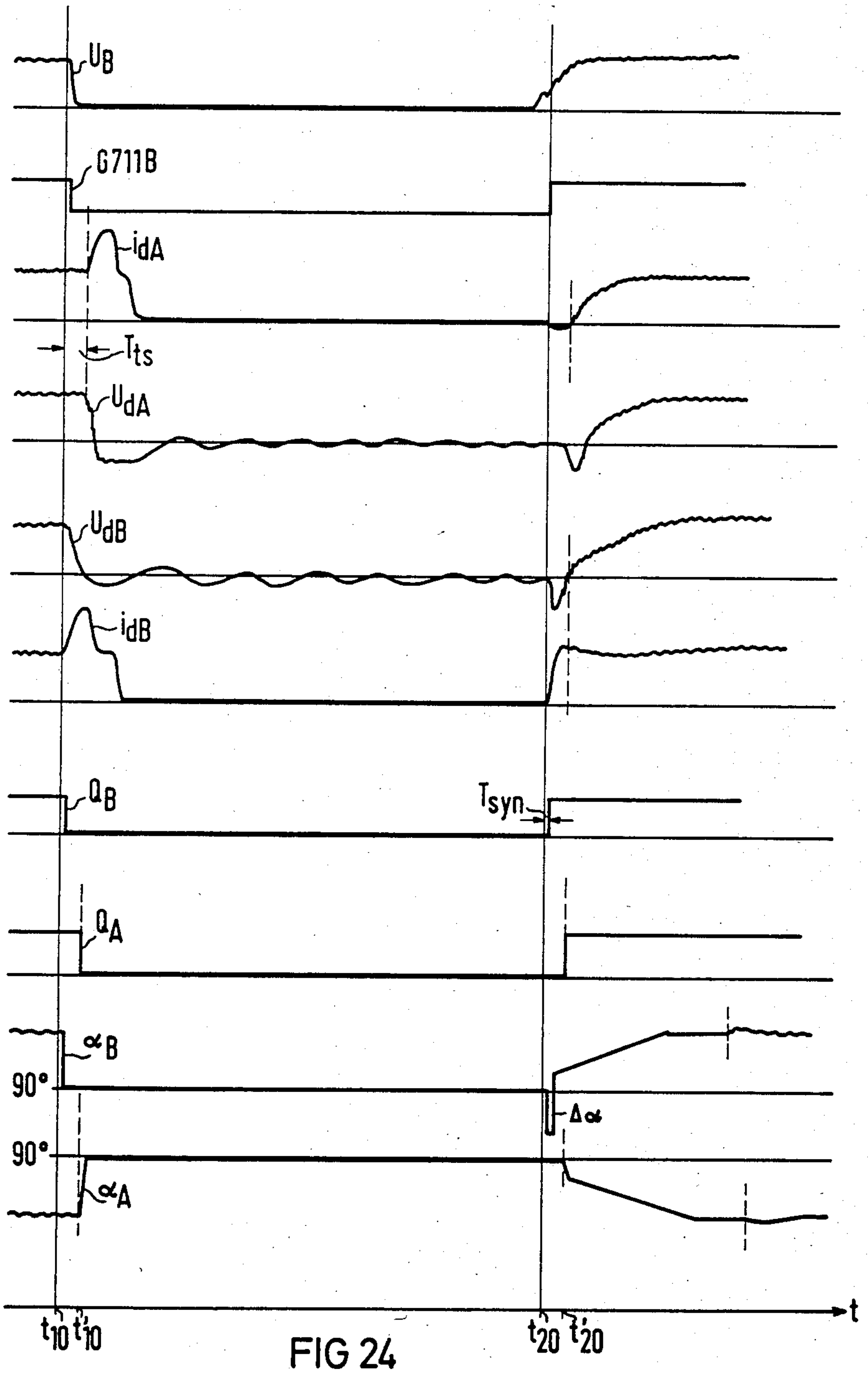
FIG. 24 and 25 show the patterns of voltages, currents and signals when operating a HVDC transmission line with a de-energized length during a malfunction of a station, B, or a station, A.
Figure 25:
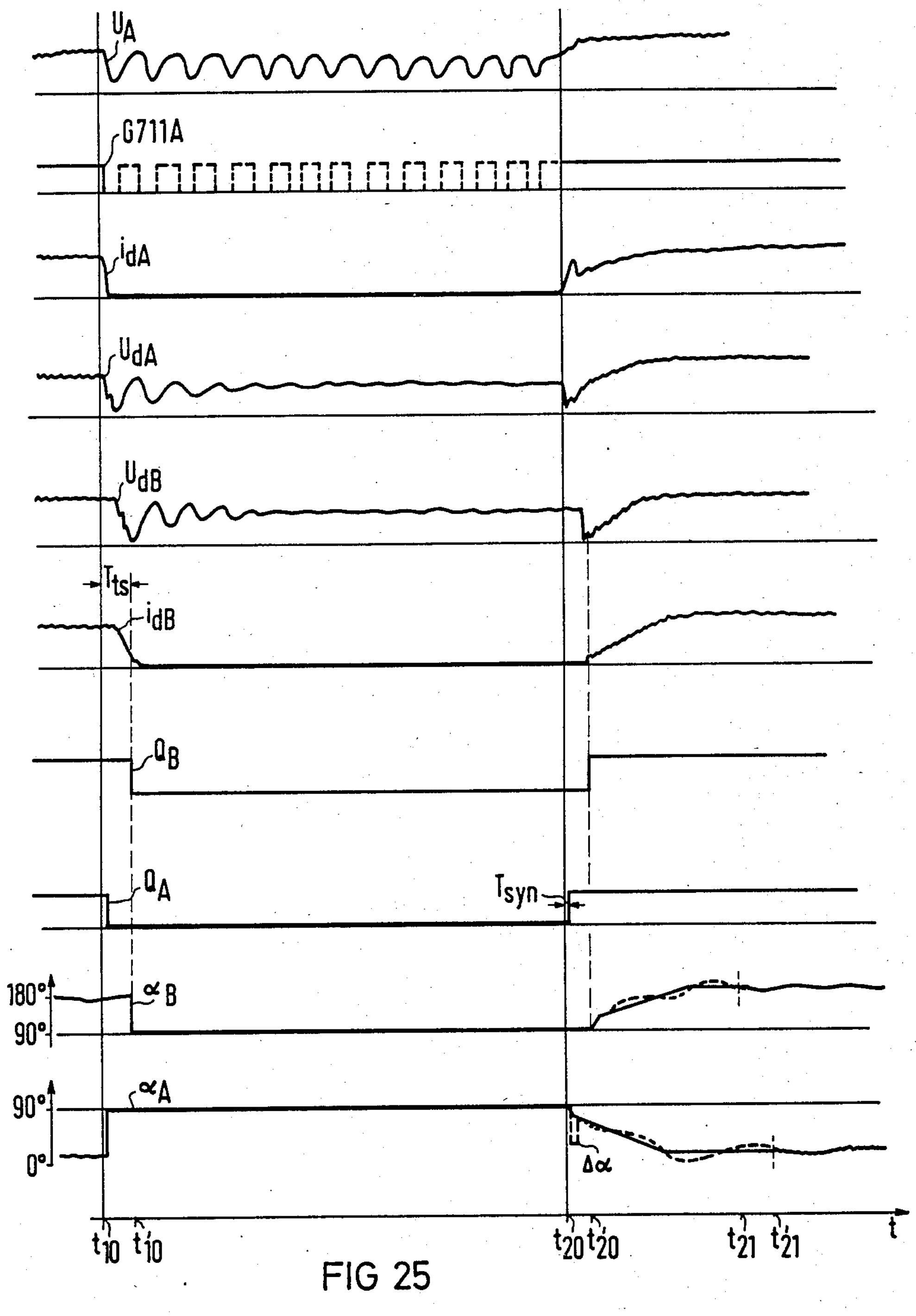
Figure 26:
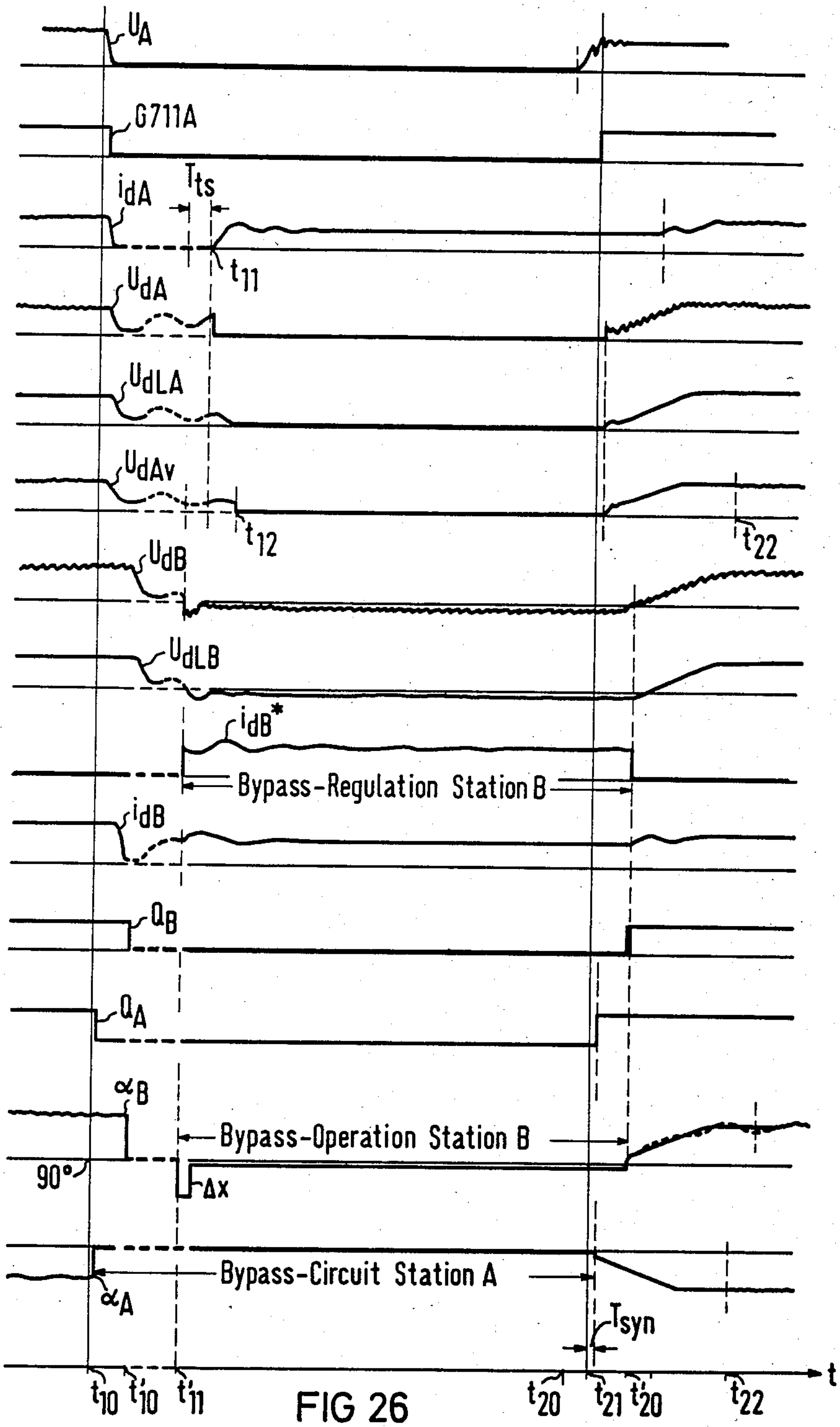
FIG. 26 and 27. The same patterns in the event of emergency bypass operation during a malfunction of station A or a station, B.
Figure 27:
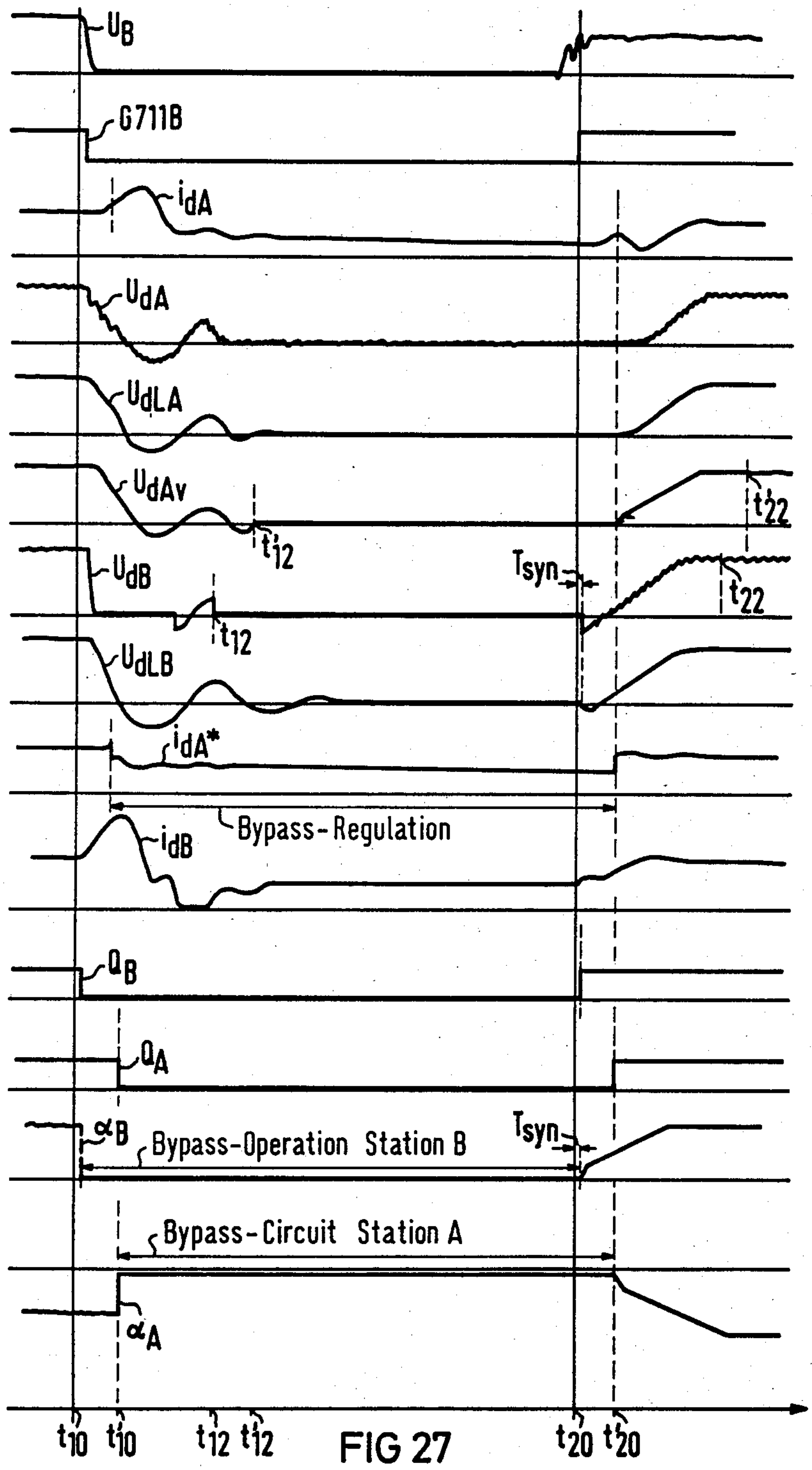

The principle of bypass operation, including the transition into bypass operation in case of a malfunction, is explained in further detail based upon the signal patterns in FIGS. 26 and 27 and the design models of the two stations shown in FIGS. 9 and 10. Aside from this bypass operation it should be necessary, depending upon the type of malfunction, to deactivate the HVDC transmission line during the malfunction; this type of emergency operation is shown in FIGS. 24 and 25. To resume normal operation, it could be desirable, as already explained, both for a HVDC transmission over long distance as well as for a short coupling that, for example, the transition from bypass operation to normal operation be designed so that the malfunctioning system primarily carries reactive current when the voltage resumes.

This transition can be influenced not only by the d.c. current itself which has to be run up, but also from the number of available component current converters simultaneously participating in the transition. Thereby the possibility arises of decoupling the desired gradations in the d.c. current rise from the rise of the system reactive current in discrete steps so that thereby the requirements made of the system and of the current control can be handled separately to a certain extent in accordance with the number of separately connected component current converters.

This can be done in accordance with FIG. 15 by having the timer circuit ZS, which releases the generation of the firing pulse release signal to disable the clamping switch BS'' of the component current converter IB'' at the reset input of the dynamic flipflop, delay the start of the system-synchronous converter operation against the component current converter 1B'. The pulse release of the individual component current converters selected and dependent upon the combination of bypass thyristors, thus proceeds in steps including time delays, whereby the upswing of the system-reactive load also proceeds in steps.

In the following discussion, a run-up function is selected for the increase of the control angle in general which drives the control angle from a value which, if necessary, deviates slightly from 90 degrees in a linear fashion till it attains the steady state condition. Although initially it seems essential that the two run-up functions, which as regulated values substitute for the preset operating model value of the model fault indication voltage when transitioning into normal operation, be practically identical, such tight coordination of both run-up functions is not in fact required. It can in fact be advantageous to preset the two run-up functions to run in opposite directions insofar as, for example after a malfunction in the station, B, the control angle of the rectifier can be run up initially with a larger slope and later with a declining slope, while the inverter control angle initially mounts slowly and later mounts more rapidly.

Thereby the functioning station is to be recharged by active current as quickly as possible so that the HVDC transmission line can be recharged quickly. For the initially malfunctioning station whose returning voltage often displays marked switch-on peaks, the HVDC transmission line initially functions as a voltage reducing reactive load while at the same time attaining reliable commutation.

(a) Example with different run-up functions

Figure 23:
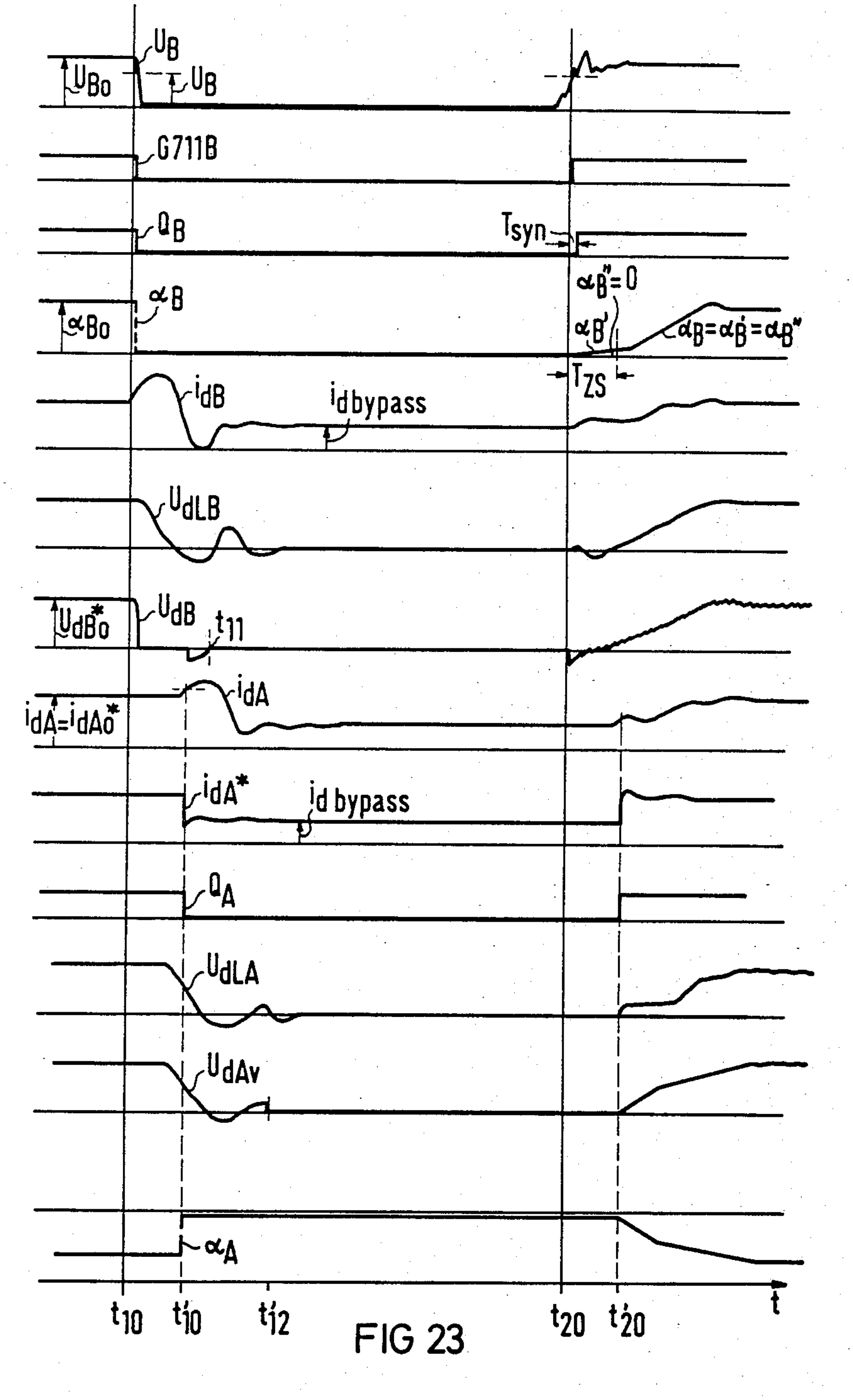
FIG. 23 shows the patterns of control angles, voltages and currents in a preferred example.

FIG. 23 shows this run-up variant using as an example a system shortcircuit in system, NB, and a bypass operation during the malfunction.

At time $t_{10}$ voltage $U_B$ breaks down and the limit value warning output signal G711B indicates a shortfall of the limit voltage $U_{Bgrenz}$ and sets the controlling malfunction signal QB=0. This initiates a commutation lock in the clamping device of converter 1B, whereby all regular firing commands of the drive unit are suppressed while simultaneously the bypass circuit is fired by a supplemental bypass pulse; this condition is symbolized by a control angle $\alpha_B=90°$ in accordance with the output d.c. voltage $U_{dB}=0$.

Using the bypass circuit, the charge in the HVDC transmission line and the filter of the station, B, is reversed as can be recognized by a current flow $i_{dB}$ (which often does not even attain the condition $i_{dB}=0$) whose extent is exaggerated in the depiction of FIG. 23, and the oscillation of voltage $U_{dLB}$ at the end of the converter reactance coil LB facing away from the converter. The voltage $U_{dB}$ which during normal operation, for example, was held constant at an operating value $U^*_{dBo}$ and was short-circuited during the current surge takes on a negative value, if the current $i_{dB}$ due to the charge reversal becomes zero and the bypass thyristors extinguish. The control quantity control 41B, as shown in FIG. 9, already made line-ineffective due to the disabling of commutation and which would only display irregular values during the malfunction by a defined value $\Delta x_B=0$.

Similarly, switch 61B can be switched to the temporarily inactive run-up function generator 66B at the same time or after the appearance of the malfunction signal QB=0 from the circuit 43B' which computes the model fault indication quantity from actual values $i_{dB}$ and $U_B$.

The current $i_{dA}$ of the station, A, which during normal operation is controlled to the operating set value $i^*_{dAo}$, i.e. normal value, similarly shows, following the transmission travel time, an increase wherein the difference $i^*_{dA}-i_{dA}$ attains a limit value which leads to the derived malfunction signal $QA=0$ ($t'_{10}$). Thereby the control angle will no longer be preset in a normal fashion wherein the corresponding nominal value $\alpha^*_{Ao}$ (e.g., $\alpha^*_{Ao} \doteq 150°$) respectively. $\Delta x^*_A$ is generated by current controller 41A, FIG. 10, adjusting the $i^*_{dAo}$ parameter and whereby the fault indication voltage $U_{dAv}$ is generated by a measurement circuit as the automatic control quantity $U_{dAv}$. Rather by reversing the switch 60A at time $t_{10}$ the system switches from the set value for the operating current to a new set value supplied by a bypass controller, i.e., a controller for the voltage $U'_A$.

As in the case under consideration only a bridging circuit of converter thyristor groups in series was selected and fired as the bypass circuit and as this bridging circuit has to be capable of bearing permanent current, its thermal load bearing capability is lower than for normal system-synchronous operation. Therefore the bypass current set value supplied by the bypass controller is throttled back in contrast to the nominal value $i^*_{dAo}$.

The control angle supplied largely by the bypass controller 68A is symbolically assumed to be a constant in FIG. 23. Until the end of the bypass operation it can be pre-regulated by the measured voltage $U_{dLA}$ or even by the substitute $\tilde{U}_{dLA}$ or $\tilde{U}_{dB}$ generated according to FIG. 14; according to FIG. 23, at time $t'_{12}$ the automatic control is switched onto the initially inactive run-up generator 66A in order to prepare for a normal start.

The d.c. current $i_{dbypass}$ now supplied by the functioning the station, A, flows, after the voltage $U_{dB}$ passes to the zero point at time $t_{11}$, over the bypass thyristors until voltage $U_B$ returns at time $t_{20}$ possibly with substantial voltage spikes.

The limit value warning signal G711B supplies at a delay $T_{syn}$ in accordance with the synchronizing time of the reference voltage generator the leading release signal QB=1 used to start the component current converter 1B' with control angle $\alpha_B' \doteq 90°$, whereby the component current converter 1B' is shifted at a low increment of, for example, 10 degrees into converter operation. Following a delay $T_{ZS}$ supplied by the timer circuit ZS, as shown in FIG. 15, the component current converter 1B'' is also released.

Thereby initially, as already discussed, a negative voltage time waveform arises in $U_{dB}$ and the system, NB, is charged with reactive current which leads to the desired voltage decline and a reduction of voltage spikes in $U_B$.

As the component current converter is switched on after a delay, the reactive load also rises in steps. Preferably the control angle $\alpha'_B$ of the component current converter started first is left in the area near 90 degrees by having the HVDC transmission current function primarily as a reactive load, and is run up to the operating inverter degree modulation only after all the other component current converters commute fully. Thereby, as FIG. 15 indicates, a distinct run-up function can be selected for each component current converter. According to FIG. 23, however, one single run-up function generator ususally suffices for $\alpha_B$, whereby the slope of $\alpha'$ initially impacts only on 1B' and starts at a low increment to continue at a higher increment to the nominal value $\alpha_{Bo}$ only after time $t_{20}+T_{Zs}$ after the last component current converter is started with $\alpha''_{Bo}=\alpha_B$.

The voltage pulses impressed by the station, B, lead following the transmission line travel time Tts to a motion of $U_{dA}$, in other words, $U_{dLA}$; and $i_{dA}$, in other words, $i_{dLA}$, which is detected in the station, A, and initiates the derived release signal QA=1 at $t'_{20}$. There the control angle $\alpha_A$ is run up to $\alpha_A \doteq 0$, with the increment initially being preferrably large and later being throttled down. Since initially only the fault voltage $U_{dB}$, in other words $U_{dLA}$, impressed by the initially slight increment of $\alpha_B$ impacts on the station, A, $i_{dA}$ rises rapidly to the nominal value $i_{dAo}$, and converter 1A is soon in a range in which the current $i_{dA}$ loading the system, NA, is primarily active current.

During run-up switch 60A is reversed to the operating set value $i^*_{dA}$, whereby the bypass controller is out of action. After the run-up function starts in FIG. 23 at time $t_{21}$ the control quantity controller 41B is activated and approximately at the end of the run-up function at the preset times $t_{22}$, $t'_{22}$ controlled by the lag circuit VZ, the operating automatic control signal is always connected so that normal operation can resume.

In normal operation thus both stations are released by the release signal QA=1, QB=1, while switch 61A and 61B are always positioned by the last firing pulse release signal QIZ=1 so that the control angles $\alpha_A$ and $\alpha_B$ are determined in the automatic control device by the addition of the projected model fault indication quantity and the respective preset angle, i.e., the angles determined by the quantities $\Delta x_B$ and $\Delta x_A$ shown in FIGS. 9 and 10, for normal operation. Similarly, reversing switches 60A and 60B are held in a position whereby the preset angle $\alpha_A^*$, and respectively, $\gamma_B^*$ is determined by the control quantity control projected for normal operation. For example, in accordance with FIG. 7, to generate $X_A$, the set value $i^*_{dA}$ of the current controller 41A in the station, A, is supplied by a superimposed controller such as active power controller 51, shown in FIG. 7, in accordance with the active power balance or other requirements of the undisturbed system, NA. In the station, B, $\Delta X_B$ is supplied in accordance with a set value $\gamma^*$, supplied either by an extinction angle controller such as 41B of FIG. 5), a reactive current controller, 41B', or voltage regulator, 41B'', with $\gamma^*$ derivable in the computer circuit 47 from the system requirement for reactive current or constant voltage.

Since for maintenance on the HVDC transmission line itself it might be necessary following a malfunction to deactivate the HVDC transmission line in terms of current and voltage, i.e., not undertaking any bypass operation, this situation will be considered first.

(b) Examples with Transmission Line Deactivated

In a typical sequence as shown by FIG. 24 the case in which the former station, B, at time $T_{10}$ faces a short circuit of system, NB, i.e., a breakdown of voltage $U_B$, is considered first. In the monitoring station the limit value alarm 711 issues the corresponding signal G711B. The HVDC transmission line, the converter reactance coil, LB, as well as the filter elements CFB and LFB discharge via the short circuit so that the currents $i_{dB}$, in other words, $i_{dLB}$, initially rise, leading to an inverter failure. At the same time, the malfunction signal QB=0 is set and the firing pulses of converter 1B are inhibited as indicated in FIG. 24 by the control angle: $\alpha_B=90°$.

Thereby the voltage $U_{dB}$ drops and the HVDC transmission line current extinguishes.

In the station, A, following the travel time Tts determined by the HVDC transmission line flow time there is a similar increase in the HVDC transmission line current $i_{dA}$, in other words $i_{dLA}$, which over the external malfunction warning pulse produces a malfunction signal and leads to QA=0 at time $t_{10'}$. Thereby this other station, A, is also shut down: $\alpha_A=90$.

FIG. 24 assumes that due to a short circuit on the side of the station, B, the HVDC transmission line has been practically completely discharged with the exception of slight oscillations in the HVDC transmission line, which is now locked on both sides. In this context it can be of particular advantage if with QA=0 the other converter 1A is not immediately locked, but rather the HVDC transmission line current and voltage dissipate fully down to the value zero over the controller of the station, A. Such a procedure is particularly advantageous if, for example, following a short-term interruption the HVDC transmission line is to be started up as rapidly as possible from the deactivated position.

In this restart, as soon as the voltage $U_B$ has attained a specific limit value i.e., time point $t_{20}$, and the limit value alarm 717 has activated in the one station following a certain lag time $T_{syn}$ which is necessary to synchronize the reference voltage generator as well as to generate the firing pulse release signal QIZ, the run-up function generator 66B is activated and the control angle $\alpha_B$ run up smoothly.

In order to then impress the HVDC transmission line with a defined voltage pulse which can release an external release pulse in the other station, A, it is preferrably foreseen to add an additional pulse $\Delta\alpha$ to the smooth run-up of the control angle $\alpha_B$ or to overlap said pulse, by means of which the converter 1B is temporarily operated in rectifier operation. FIG. 24 shows that the HVDC transmission line current $i_{dB}$ is thus rapidly excited and the HVDC transmission line voltage $U_{dB}$ becomes temporarily negative.

As a consequence, again at time $t_{20}$ determined by the HVDC transmission line travel time, a negative voltage vs. time waveform in the thus far locked station, A, and a signal QA=1 result, with which the run-up function generator inactivated during malfunction is activated there and the control angle $\alpha_A$ is run up smoothly.

In both stations during the malfunction inactivated run-up function generators supply during the run-up initially a substitute value for the model fault quantity, although one can recognize from the pattern of the control angles $\alpha_A$ and $\alpha_B$ that the smooth preset value supplied by the run-up function during the run-up is replaced by the pulsating model fault quantity as soon as the reversing switches 61A and 61B and also switches 60A and 60B are reversed and the undisrupted normal operation is resumed.

FIG. 25 depicts the case of a malfunction in the station, A. This assumes that in the system, NA, at the time $t_{10}$ only one of the phase voltages fails so that the voltage amplitude $U_A$ of this system shows a pulsating pattern. In this case the limit value alarm 711 also supplies a pulsating signal to one monitoring device which, however, is only shown by the broken line in FIG. 25 because, for example, the time constant of pulse shaper 713 can be set so that a constant signal suppressing these oscillations can be generated. In the case already mentioned, wherein no specific limit value alarm is designed to form the signal G711B, but the pulse generation is rather handled by the reference voltage generator which handles all the fluctuations of the a.c. voltage system anyway, the relevant constant signal for the total extent of the malfunction can be generated there easily.

In general, for such a malfunction another type of emergency operation is designed which is not the subject of this invention. The strategy designed for a malfunction of the rectifier with deactiviation of the HVDC transmission line will be explained, however, for this case as well.

The inhibiting of the firing pulses of converter 1A generated by QA=0 brings about the extinction of the HVDC current $i_{dA}$, although admittedly there is no necessary immediate discharge of the HVDC transmssion line. Such a discharge can be forced, as already explained in connection with FIG. 24, by a temporary firing angle shift in the undisturbed other station, B, which, however, is dispensed with in the example of FIG. 25. Rather, the firing pulses of converter 1B in the station, B, are inhibited following the lag time Tts by the collapsing HVDC transmission line current $i_{dB}$ or HVDC transmission line voltage $U_{dB}$ so that there, too, the current is discharged and the converter shut down. The HVDC transmission line then no longer conveys current, but still conveys voltage.

In such a case it is often not necessary following the return of the system, NA, i.e. time $T_{20}$, to begin the transition to normal operation with a temporary supplemental pulse $\Delta\alpha$ on the control angle. This applies, in particular, if the HVDC transmission line still retains a positive residual voltage as shown in FIG. 25, which when firing the thyristors in 1B, generates a current flow. The control angle can then be run up smoothly from approximately $\alpha_A=90°$.

In the situations of FIGS. 24 and 25 the design foresees in case of emergency operation during a malfunction a shutdown or deactivation of the HVDC transmission line at least to the extent that the HVDC transmission line current is equal to zero which is attained by having the HVDC transmission line separated from the a.c. voltage systems by a lock of both converters during the malfunction, i.e., before the resumption of normal operation.

The subsequent transition to normal operation is thus also suitable for the initial startup of the HVDC transmission line following installation or after a thorough maintennce.

The HVDC transmission line voltage at time $t_{20}$ rapidly changed by the resumption of normal operation is detected at the latter station, B, at time point $t'_{20}$, where it leads to the derived release signal QB=1 and similarly to the resumption of normal operation.

During a malfunction the switches 60, 61 and 67 of the stations in FIGS. 9 and 10 are in a position at which the deactivated controller 41 and the run-up function generator 66 set the control angle 90 degrees in accordance with the initial setting step of zero. The control angle is run up at time point $t_{20}$, in other words, $t'_{20}$ by activating the run-up function generator, whereby position P3 of switch 61 permits temporary connection of the supplemental pulse $\Delta\alpha$ during the system-synchronous start of the drive unit. If the controllers 41 are activated simultaneously with the run-up function generators 66, then the run-up is superimposed by the buildup of oscillations of the controller, while at time points $t_{21}$ and $t'_{21}$ it can be seen from the wave pattern of the automatic control voltage that now the control angle is being determined by the automatic control quantities $U_{dLA}$, in other words, $\alpha_{BV}$ which as the measurement value of the fault quantity replaces the model value generated and regulated by the run-up function generator.

(c) Examples with Bypass Operation

If, in the event of a malfunction in the former station, given undisturbed operation of the latter station, a bypass operation is specified due to the already mentioned advantages, then in the undisturbed station upon commencement of the malfunction the bypass thyristors selected for the bypass circuit are fired by the internal malfunction warning pulse, and the HVDC transmission line connections of this station are short-circuited. In the latter station the external malfunction warning pulse Fdf initiates a rectifier activity in this type of operation whereby any desired bypass current is supplied into the HVDC transmission line. This bypass current is preferrably derived in accordance with the requirements of the latter station, i.e., based upon the measured values of the a.c. voltage system available tin that station.

After the malfunction is over, the bypass circuit is interrupted again in the recuperated station by means of the internal release pulse Ffe and normal operation synchronous with the system resumed, resulting in the functioning other station in an external release pulse Fff by which the bypass current feed is discontinued and normal operation synchronous with the system resumes. FIGS. 26 and 27 depict advantageous types of designs of said malfunction operation with bypass current.

FIG. 26 assumes a malfunction of the rectifier operation for example, in the Station A.

The collapsing voltage $U_A$ of the system, NA, collapsing at time $t_{10}$ is again recorded in a station, A, by the internal malfunction warning pulse Fde and releases QA=0. Converter 1 is inhibited. The current $i_{dA}$ thus goes off, and the voltages $U_{dA}$ and $U_{dLA}$, respectively are caused to oscillate. Said oscillation is depicted by a broken line and is dependent on the further events in the station, B.

After a delay time $T_{ts}$, i.e., time $T'_{10}$, there is a corresponding drop in voltage $U_{dB}$, in other words, $U_{dLB}$ and in current $i_{dB}$ at the d.c. connections of station, B. Therefore, by monitoring the current $i_{dB}$, for example, an external malfunction warning pulse Fdf is generated at said location, resulting in $Q_B=0$.

If in the event of said malfunction, bypass operation is foreseen, then the functioning station, B, assumes rectifier operation with the external malfunction warning pulse, with the control angle being provided by a superimposed controller. If, for instance, the bypass operation is to serve to keep the voltage $U_B$ constant or to control the reactive load, then a voltage regulator or a reactive power controller is provided as a superimposed regulator for the bypass operation. The output signal of this bypass controller 68B, as shown in FIG. 9 forms value $\Delta X_B$, which corresponds to the set value $i^*_{dB}$ for the current to be taken from the functioning system and is connected with the control set as control angle $\alpha_B$ in the bypass operation via the switch 60B. The computing circuit 43B' is separated in this instance, e.g., by the switch 61B being switched to the output of the run-up function generator 66B which is inactivated during the malfunction.

In one configuration, at QB=0 at the point in time $t'_{10}$ first the firing commands of the converter are inhibited. It then depends on the phase position of the system, NB, if and when current $i_{dB}$ extinguishes. Subsequently, rectifier operation is commenced in the station, B, which results in a voltage reversal in the HVDC transmission line in accordance with the polarity of the converter thyristors.

The time $t'_{11}$ for commencing this rectifier operation (possibly with the pulse $\Delta\alpha$ being given) is practically freely selectable. The automatic control angle $\alpha_{Bv}$ is switched over to the run-up function generator which is inactivated during the malfunction, so that the control angle $\alpha_B$ is determined solely by the bypass controller which has now been switched on.

The bypass operation now taken up by the station, B, has the effect that an increase in the voltage $U_{dA}$ occurs at the d.c. connections in the malfunctioning the station, A, at time $t_{11}$, with the storage circuit 63A being able to recognize the bypass operation taken up by the functioning station by means of the simultaneous occurence of signal G711A and the internal malfunction warning pulse Fde, respectively, and the external release signal Fff derived from the voltage oscillation. As $i_{dA}=0$ at this time, it does not matter which converter thyristors of the station, A, connected in series are fired as the bypass circuit. Several parallel bypasses can be closed, for example. In the case at hand a selection of those bypass thyristors serving as bypass thyristors among the thyristors of converter 1A required for normal operation is pre-programmed and only a single bypass is foreseen.

The firing commands for this bypass circuit can be formed upon occurrence of the internal malfunction warning pulse or shortly thereafter; firing is, however, not effected until the voltage $U_{dA}$ due to the voltage impression by the bypass rectifier operation of the station, B, has changed polarity. Then a current $i_{dA}$ flows through the converter 1A and the HVDC transmission line, which, however, is separated from the malfunctioning network, NA.

The network, NA, resuming operation at time $t_{20}$ reaches at $t_{21}$ the preset limit value at which the internal release pulse is formed. After the time $T_{syn}$ required for the formation of the system-synchronous reference voltage of the drive unit, the malfunction memory QA=1, and the converter 1A is run up with the control angle $\alpha_A$ in a smooth fashion.

In order to avoid a short-circuit current to flow through converter 1B, which in bypass operation initially still operates as a rectifier, and converter 1A, which has already gone to normal rectifier operation, the run-up of the control angle $\alpha_A$ can be delayed as against an initially impressed voltage surge so that the station, B, can make the transition to inverter operation in a timely manner after recognition of this voltage surge.

Furthermore, at time $t_{20}$ the switch 61A is switched in such a manner tha the run-up function generator output signal forms the automatic control signal $U_{dAv}$. As this run-up generator is inactivated during the malfunction and not released again until the system resumes, the depicted pattern results for the voltage $U_{dAv}$, with a smooth increase upon occurrence of the leading release signal QA=1.

At a time $t_{22}$ allowed by the program circuit the voltage $U_{dLA}$ is again used as automatic control voltage by switching switch 61A. Therefore during normal operation the control angle $\alpha_A$ is practically given by $U_{dAv}=U_{dLA}$ as the case may be $U_{dLB}$ and is modified only slightly by the function of the current regulator. As the clamping circuit inhibits the firing commands of the drive unit STA derived from $\alpha_A$ during bypass operation, it is insignificant when in the interval between $t_{10}$ and $t_{20}$ the memory circuit switches from $U_{dAv}=U_{dLA}$ to the automatic control voltage supplied by the run-up function generator. Preferrably the current controller is inactive during this time and is not activated until after the return of the system via the program circuit, preferrably at the end of the smooth run-up or upon occurrence at time $t_{21}$ of the effects of the normal operation initiated by the other station.

In the station, B, the rectifier operation resumed by the station, A, in a smooth manner effects at $t'_{20}$ an increase in the voltage $U_{dB}$, or, as the case may be $U_{dLB}$, and in the current $i_{dB}$, thus triggering the release signal QB=1 derived here, with which the system is now switched from bypass current control to normal control, i.e., from bypass controller 68B to the extinction angle controller 41B in FIG. 9 by switch 60B. At the same time the run-up function generator is activated there with said external release signal of the station, B, which now supplies the automatic control angle $\alpha_{Bv}$ for the station, B, instead of element 43B'. As a consequence, the control angle $\alpha_B$ increases again in a smooth manner to the angle characteristic of normal inverter operation until at time $t'_{22}$ the switch 61B is again switched from the run-up function generator to the computing circuit 43B'.

The same principle can be implemented if the station, B, has a malfunction. FIG. 27 assumes this case.

In normal operation the converter 1B in the station, B, is operated as an inverter with a control angle $\alpha_B$ near the inverter step limit, which is formed by the extinction angle controller, a controller for the reactive power or another control quantity as the case may be and is controlled with the automatic control angle calculated from the inductive voltage drop. At time $t_{10}$ the voltage $U_B$ of the system, NB, collapses with the effect that via a corresponding signal G711B in the monitoring device of the station, B, the normal firing pulses are inhibited there.

This short circuit also results in the collapse of the d.c. voltage $U_{dB}$ and a rapidly increasing direct current $i_{dB}$ flowing into the short circuit so that the inverter 1B becomes unstable. The capacitance of the HVDC transmission line at the station, B, connection are thus discharged into the short circuit, resulting in a reversal of the voltage $U_{dLB}$ and finally in an extinction of the direct current $i_{dB}$. Meanwhile the limit value warning device has also effected condition QB=0 via the internal malfunction warning pulse, by which the normal commutation of the converter 1B is inhibited and the firing of the bypass thyristors initiated.

According to the line's distributed time delay, the d.c. current $i_{dA}$ increases in the station, A, and the d.c. voltages $U_{dA}$ and $U_{dLA}$ drop accordingly. Via the external malfunction warning pulse of the station, A, this results in condition QA=0 at which the operational current set value $i^*_{dA}$ is switched to a lower set value which is supplied by a superimposed bypass controller, e.g., the reactive power controller 68A or a voltage regulator for voltage $U_A$ (switch 60A in FIG. 10). The converter 1A therefore feeds only the reactive current into the HVDC transmission line which is required for as continuous an operation as possible of network, NA. Furthermore, the signal QA=0 triggers the switching of the automatic control voltage $U_{dAv}$ from the measuring value output for $U_{dLA}$ to the output of the run-up function generator by switch 61A switching at a preset later time $t_{12}$, for example.

As the station, A, continues to feed current into the HVDC transmission line, the end of said transmission line discharged through the system short circuit is recharged in the station, B. Thus the voltage $U_{dA}$ acquires positive values again i.e., at time $t_{12}$ so that upon attaining a preset positive limit value, certain thyristors fire in the station, B, which are selected for the formation of the bypass circuit and at which corresponding firing voltages arise at time $t_{12}$. Thus the bypass circuit is now closed and the bypass operation initiated during which the HVDC transmission line is operated as reactive impedance for the system, NA.

In the case depicted by FIG. 27 the inhibiting of the normal firing commands supplied by the drive unit took place at the time $t_{10}$ in the malfunctioning station B, with QB=0, whereby the current $i_{dB}$ initially continues to flow through the thyristors of converter 1B involved in the shutdown of converter 1B. Only after extinction of these thyristors the HVDC transmission line has been recharged with a current which at time $t_{12}$ leads to a positive response value of $U_{dB}$, while the station, A, has started the bypass operation, is the voltage applied to the thyristors selected for bypass operation, which voltage results in the firing of the bypass thyristors and thus in a recurring current $i_{dB}$. In this event the bypass thyristors can be selected independent of the thyristors involved in the inverter shutdown. However, as in the station, B, the thyristors involved in the shutdown can be selected as bypass thyristors independent of operation, a frequently undesirable complete extinction of the current $i_{dB}$ must not be waited for.

Particularly in the case depicted in FIG. 27 substantial negative values of $U_{dB}$ can result in the time interval between $t_{10}$ and $t_{12}$, which the users try to prevent in many cases when operating a HVDC transmission line.

This can be achieved if the control angle $\Delta_A$ of the station, A, is not immediately reduced to a value near zero corresponding to the bypass operation when the derived malfunction signal QA=0, but rather to a control angle which is initially shifted in the direction of a rectifier wide-open setting in order to recharge the HVDC transmission line as quickly as possible. This value can be given by the storage circuit 63A via the position P3 of switch 61A according to FIG. 10. If a network monitor 43A' is available, however, as explained in FIGS. 13 and 14, it is then possible to keep the current $i_{dB}$ almost constant, by controlling the substitute actual value $\tilde{i}_{dB}$ of the current regulator 41A' calculated by the network monitor to a set value supplied by the voltage regulator 68A serving to maintain a constant voltage $U_A$. If for normal operation, for example, a superimposed active power regulator 51 is provided, then through QA=0 this superimposed regulator is switched to a bypass controller, such as, voltage regulator 68A, while in the observer station the inverter shutdown of the malfunctioning station, B, is simulated by the closing of switch 77.

In order to convert from the bypass operation back to the system-synchronous normal operation upon the return of the network, NB, at time $t_{20}$ as shown in FIG. 7 and upon occurrence of the leading release signal QB=1, those thyristors are fired in the already described manner which have been pre-programmed with a pre-programmed bypass thyristor combination in order to initiate the system-synchronous operation while impressing a voltage surge, or those thyristors are fired which have been selected by the selector switch dependent on the operation, in accordance with the bypass thyristors fired dependent of operation.

FIG. 27 depicts the voltage $U_{dB}$ occurring after the time $T_{syn}$ required for synchronization of the reference voltage generator, which voltage is a function of the run-up of $\alpha_B$. At the time $t'_{20}$ then the release signal QA=1 occurs, with a corresponding increase of the angle $\alpha_A$ to the rectifier wide-open setting provided for normal operation and a corresponding pattern of voltage $U_{dA}$, with the bypass control now discontinued in the functioning station, A, and normal control being switched on via the current controller. At times $t_{22}$ and $t'_{22}$ switching from the automatic control value preset as a controlled run-up function to the measured fault quantity as a automatic control quantity takes place.

In this design the particular advantage is that during normal operation the two stations function independent of one another, i.e., that no information to be transmitted via remote control lines is required from the respective other station for the control of the two converters. Therefore both converters can be quickly controlled by corresponding automatic control without forcing a slow control pattern due to the delay time of remote control signal transmission. Even in the event of malfunction the transmission of corresponding malfunction signals is not effected via remote control lines, but via the HVDC transmission line itself so that in the event of a malfunction in the one station the necessary information on the malfunction is available in the other station as well within the shortest time possible. The resumption of the fault-free normal operation in the one station is communicated in the same way within the shortest possible time so that very short on-control times result for the resumption of normal operation. Furthermore, it is possible by said rapid control to utilize the HVDC transmission line itself to control or regulate the electrical quantities of the respective systems, e.g., for reactive current control; or during bypass operation to maintain a fault-free system constant, or to dampen other processes, e.g., balancing processes in the systems.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patents of the United States is:

1. A method for resuming normal operation of a High Voltage D.C. (HVDC) transmission line system including a first a.c. voltage transmission system providing power, a first station connected to the first a.c. voltage system, a first converter connecting to and associated with the first station, operating in normal operation as a system-synchronous rectifier and determining the current drawn from the first a.c. system and impressed on the HVDC transmission line, a HVDC transmission line system connected at one end to the first station, a second converter connecting to and associated with the second station operating in normal operation as a system-synchronous rectifier and determining the voltage of the HVDC transmission line, and a second a.c. voltage transmission system accepting power in normal operation; the method of resuming normal operation comprising the steps of:

forming a leading release signal in one of the stations, said one station being connected to an operating a.c. voltage system and being called a previously malfunctioning station;

triggering the start of system-synchronous normal operation of the converter-associated with said previously malfunctioning station;

impressing a voltage pulse across the HVDC transmission line by said previously malfunctioning station stimulated by a leading release pulse;

running up of a control angle in said previously malfunctioning station to the control angle of normal operation;

forming a derived release signal in the opposite, so-called continuously functioning station from monitoring the change of the electrical quantities such as HVDC transmission line voltage and/or current, in the continuously functioning station on the d.c. voltage side of the transmission line, by said impressed voltage pulse of the previously malfunctioning station effecting said functioning station;

triggering, by said derived release signal, the start of system-synchronous normal operation in said functioning station; and initiating the running up of the control angle of said functioning station from an approximate control angle of 90 degrees to a control angle providing for normal operation.

2. A method according to claim 1, whereby said run-up of the control angle of the previously malfunctioning station, and the run-up of the continuously functioning station being completed after approximately two a.c. voltage periods of the respective a.c. voltage system.

3. A method according to claim 1, further comprising the step of:

releasing the formed derived release signal only on the undisturbed condition of the a.c. voltage system associated with said functioning station indicated by a fault indication signal.

4. A method according to claim 1, further comprising the steps of:

forming said leading release signal in said previously malfunctioning station being conditioned on the undisturbed condition of the a.c. voltage system associated with said previously malfunctioning station as indicated by the non-presence of a fault indication signal; and running up of said control angles, in their respective converters, beginning at approximately 90 degrees, whereby the start of control angle run-up can be preceded by or superimposed with a temporary additional control angle shifting in the direction of the rectifier wide-open control setting.

5. A method according to claim 1, further comprising the step of pre-programming the run-up function for the running up of said previously malfunctioning station control angle and said functioning station control angle for compatibility with each other.

6. A method according to claim 1, further comprising the step of:

forcing the extinction of the HVDC transmission line current prior to the resumption of normal operation by inhibiting the firing pulses in both converters.

7. A method according to claim 1, further comprising the steps of:

inhibiting the operation of said previously malfunctioning converter prior to the resumption of normal operation; and adjusting the firing angle of said continuously functioning converter to reduce the HVDC transmission line current and voltage.

8. A method according to claim 1 further comprising the steps of:

forming a system-synchronous firing command sequence from a system-synchronous reference voltage and the converter control angle; and releasing said firing commanding sequence for the start of resumption of normal operation only after a firing command for a thyristor occurs which is contained in a pre-programmed selection of converter thyristors for the start-up.

9. A method according to claim 1, further comprising the steps of:

maintaining current conduction through bypass thyristors of the previously malfunctioning station during emergency operation until the resumption of normal operation; and maintaining emergency rectifier operation in the continuously functioning station until resumption of normal operation.

10. A method according to claim 9, further comprising the steps of:

forming a system-synchronous firing command sequence in the previously malfunctioning station from a system-synchronous reference voltage and the converter control angle; and releasing said firing command sequence to effect the start of normal operation only after a firing command for a thyristor occurs which is contained in a selection of converter thyristors derived from the firing of the bypass thyristors.

11. A method according to claim 9, further comprising the step of:

firing a combination of thyristors as bypass thyristors during emergency operation which during normal operation are controlled system-synchronous converter thyristors.

12. A method according to claim 9, further comprising the step of releasing a firing command sequence for the startup of normal operation of a station after a malfunction of the a.c. voltage system connected thereto, which is derived from a control angle and a reference voltage synchronized with said a.c. voltage system as soon as system synchronization of the reference voltage to within a phase error of less than 30 degrees occurs after the malfunction.

13. A method according to claim 1, further comprising the steps of:

monitoring at the respective station the electrical quantities of the a.c. system connected thereto and generating an internal warning pulse triggering a leading fault indication signal wherever said electrical quantities indicate an a.c. system malfunction;

monitoring, subsequent to the generation of the respective internal warning pulse, in the respective station of the electrical quantities of the a.c. system connected thereto and generating an internal release pulse triggering a leading release pulse whenever said electrical quantities indicate termination of a.c. system malfunction;

monitoring, in the respective station, of the electrical quantities on the d.c. voltage side of the HVDC transmission line connected thereto and generating an external warning pulse triggering a derived fault indication signal whenever a malfunction interrupts the normal operation of the station at the other end of the HVDC transmission line;

monitoring, subsequent to the generation of an external warning pulse, in the respective station, of the d.c. electrical quantities on the d.c. side of the HVDC transmission line connected thereto, and generating an external release pulse triggering a derived release signal whenever said d.c. electrical quantities indicate that the interruption in the station at the other end of the HVDC transmission line has been terminated; and terminating normal operation in each station and switching over the emergency operation in each station is effected as soon as a fault indication signal is triggered within each station, and terminating of emergency operation and resuming of normal operation is effected as soon as a release signal is triggered within each station.

14. A method in accordance with claim 1, further comprising the step of:

determining control angle for a converter by a control quantity controller at least subsequent to resumption of normal operation, and said control angle attaining its final value.

15. A method according to claim 14, further comprising the step of regulating the HVDC transmission line current in said first station with a current regulator and regulating said second station with a reactive power regulator or a voltage regulator such as an extinction angle controller.

16. A method according to claim 14, in which said derived release signals and said control quantities required for the regulators and controllers of both stations are formed from information available within each respective station without using remote control signals.

17. A method according to claim 14, further comprising the steps of:

determining a control angle for said functioning station from the output of said functioning station control quantity controller, and an automatic control signal formed from the HVDC line voltage of said functioning station, at least after attaining the control angle provided for normal operation; and determining a control angle for said previously malfunctioning station from the output of said previously malfunctioning station control quantity controller, and an automatic control signal formed from the HVDC transmission line current of said previously malfunctioning station, at least after attaining the control angle provided for normal operation.

18. A method according to claim 14, further comprising the steps of:

determining a control angle for said functioning station from the output of the functioning station control quantity controller and an automatic control signal derived from the HVDC transmission line current and the a.c. voltage connected to said previously malfunctioning station; and determining a control angle for said previously malfunctioning station from the output of the previously malfunctioning station control quantity controller and an automatic control signal derived from the HVDC transmission line current and the a.c. voltage of connected to said previously malfunctioning station after the control angles provided for normal operation have been attained.

19. An apparatus for High Voltage Direct Current, HVDC, transmission having a high-voltage d.c. transmission line; a first station connected to one end of the high-voltage d.c. transmission line; a first converter connected to the first station and normally operated in system-synchronous operation as a rectifier; a first a.c. system connected to the first converter; a second station connected to the other end of the high-voltage d.c. transmission line; a second converter connected to the second station and normally operated as a system-synchronous inverter, and a second a.c. system connected to the second converter; included in each station is a drive unit, controlled by a control and regulating device using a control angle and operated synchronously with the respective a.c. voltage system by a reference voltage generator, forming a sequence of system-synchronous firing commands for the respective converter, further included with each converter is a monitoring unit and a clamping circuit, whereby the clamping circuit being capable of inhibiting the respective firing commands when instructed to do so by the monitoring unit when a release signal is formed, or capable of being converted to providing firing commands for the converter thyristors, further comprising:

first monitoring means within and connected to the monitoring unit connected to the previously malfunctioning station forming a leading release signal whenever monitoring of the a.c. voltage network connected thereto indicates the existence of a normal condition of the a.c. voltage system;

second monitoring means within and connected to the monitoring unit connected to the continuously functioning station forming a derived release signal as soon as monitoring of the d.c. voltage side electrical quantities connected thereto detectably indicates the resumption of normal operation of the previously malfunctioning station;

means to inhibit the conductance of firing pulses whenever a fault indication signal occurs, connecting to each clamping circuit of the respective station said conductance inhibiting means being released by a respective leading or a derived release signal occurring; and a respective run-up function generator connected in each station with a pre-programmed run-up function, said generator being triggered by said respective release signal and after a set run-up time is approximately the same as the operating level of control of the respective converter, to preset the control angle upon resumption of normal operation.

20. An apparatus according to claim 19, further comprising:

each of said monitoring units in each station having said first monitoring means, and second monitoring means, a third monitoring means and a fourth monitoring means, for monitoring the respective a.c. systems connected to said stations and the electrical quantities of said station on the d.c. side of the converter, whereby;

said first monitoring means, during transition of the a.c. voltage system connected to the station from a malfunction condition to a functioning condition or upon a start signal, generates an internal release pulse as a leading release pulse;

said second monitoring means, upon occurrence of the effects of an HVDC transmission line voltage surge generated by the release of the firing pulses of the external station, generates an external release pulse as a derived release pulse;

said third monitoring means, in the event of an interruption of normal operation caused by a malfunction in any of the connections external to the station, generates an external release pulse as a derived release pulse and generates an external warning pulse;

said fourth monitoring means, upon transition of the internal a.c. voltage system into malfunctioning condition, generates an internal warning pulse; and a malfunction memory being connected to and associated with each of said monitoring units, respectively, said malfunction memory upon the occurrence of a release pulse activating a run-up function generator, and upon the occurrence of a warning pulse issuing a fault indication signal.

21. An apparatus according to claim 19, whereby: the formation of a release pulse in the station is delayed, after a malfunction of the a.c. voltage system connected to said station and subsequent return of said a.c. voltage system function, until preferrably after a set time, the reference generator generates a reference voltage which has a maximum phase shift of 30 degrees relative to the voltage fundamental of the returned a.c. system.

22. An apparatus according to claim 19, further comprising:

each said run-up function generators having a run-up function, beginning at approximately zero control setting, stored therein; and a means to temporarily shift the control angle, prior to or during the start of the run-up function, in the direction of rectifier operation connecting to each of said run-up function generators respectively provided.

23. An apparatus according to claim 19, further comprising:

an automatic control device connected to and preceding the respective drive unit to insert the respective control angle into the respective drive unit; and switching means, switchably connecting said respective automatic control device to one of three available signals:

the output signal of the run-up function generator;

a fault indication quantity of the voltage at the filtered side of subsequent choke coil opposite from the first converter in the first station; and a model fault indication voltage calculated from a HVDC transmission line current, an a.c. system voltage, and a present extinction angle in the second station.

24. An apparatus according to claim 23, wherein the control angle is determined by said run-up function generator during run-up and by the fault indication quantity after run-up and of being corrected by the output signal of a control quantity controller.

25. An apparatus according to claim 24, wherein said control quantity controller is capable of being deactivated prior to resumption of normal operation and being activated at least upon the start of the run-up function generator.

26. An apparatus according to claim 19, further comprising:

a memory and programming circuit being connected to each respective run-up function generator and to each respective clamping circuit in such a manner that on the occurrence of leading a release signal, the firing pulses of the previously malfunctioning converter are given and a positive voltage pulse is impressed in the current-flow direction of the continuously functioning converter.

* * * * *